United States Patent [19]
Murai et al.

[11] Patent Number: 6,154,487
[45] Date of Patent: Nov. 28, 2000

[54] SPREAD-SPECTRUM SIGNAL RECEIVING METHOD AND SPREAD-SPECTRUM SIGNAL RECEIVING APPARATUS

[75] Inventors: Hideshi Murai; Hisao Tachika, both of Tokyo, Japan

[73] Assignee: Mitsubishi Denki Kabushiki Kaisha, Tokyo, Japan

[21] Appl. No.: 09/078,580

[22] Filed: May 14, 1998

[30] Foreign Application Priority Data

May 21, 1997 [JP] Japan ..................................... 9-131047
Feb. 12, 1998 [JP] Japan ................................... 10-030004

[51] Int. Cl.[7] .................................................... H04L 27/30
[52] U.S. Cl. ........................................... 375/150; 375/152
[58] Field of Search ................................... 375/130, 136, 375/147, 137, 149, 150, 152; 370/203, 208

[56] References Cited

U.S. PATENT DOCUMENTS

| 4,313,170 | 1/1982 | Lewis et al. . | |
|---|---|---|---|
| 5,490,165 | 2/1996 | Blakeney, II et al. . | |
| 5,799,010 | 8/1998 | Lomp et al. | 370/335 |
| 5,960,028 | 9/1999 | Okamoto et al. | 375/130 |
| 5,999,561 | 12/1999 | Naden et al. | 375/142 |

FOREIGN PATENT DOCUMENTS

| 6 14008A | 1/1994 | Japan . |
| 7 095215A | 4/1995 | Japan . |
| 96 64716A1 | 2/1996 | WIPO . |

OTHER PUBLICATIONS

Kataoka, N. et al.—"Performance of Soft Decision Digital Matched Filter in Direct–Sequence Spread–Spectrum Communications Systems", IEICE Transactions, vol. E74, No. 5: May 1991: pp. 1115–1121.

Chung, B–Y., et al.—"Performance Analysis of an All–Digital BPSK Direct–Sequence Spread–Spectrum IF Receiver Architecture", IEEE Journal on Selected Areas in Communications, vol. 11, No. 7: Sep. 1993: pp.1096–1107.

Gaudenzi, R, et al.—"Decision–Directed Coherent Delay–Lock Tracking Loop for DS–Spread–Spectrum Signals", IEEE Transactions on Communications, vol. 39, No. 5: May 1991: pp. 758–765.

Gaudenzi, R. et al.—"A Digital Chip Timing Recovery Loop for Band–Limited Direct–Sequence Spread–Spectrum Signals", IEEE Transactions on Communications, vol. 41, No. 11: Nov. 1993: pp. 1760–1769.

Kataoka, N. et al.—"Digitalized Code Tracking Method using Soft Decision Digital Matched Filter in Spread Spectrum Communication Systems", Electronics Information and Communication Convention, RCS91–4: May 1991: pp. 23–30.

Cessna, J. et al.—"Phase Noise and Transient Times for a Binary Quantized Digital Phase–Locked Loop in White Gaussian Noise", IEEE Transactions on Communications, COM–20, No. 2: Apr. 1972: pp. 94–104.

(List continued on next page.)

*Primary Examiner*—Stephen Chin
*Assistant Examiner*—Lenny Jiang

[57] ABSTRACT

A spread-spectrum signal receiving method and apparatus in which a correlation operation is performed for obtaining a correlation between a base-band component of a received spread-spectrum signal and a spread code, so as to demodulate the received signal. In the method, a correlation operation between the spread code and the base-band component, and a correlation operation at a timing equal to a timing difference between the spread code and the base-band component in the former correlation operation step, the timing difference being ½ of a spread-code interval, are performed. Then, based on results obtained in these correlation operations, a correlation operation result at the timing point where a timing difference between the spread code and the base-band component is less than ½ of the spread-code interval, is estimated.

26 Claims, 33 Drawing Sheets

OTHER PUBLICATIONS

Takakusaki, K. et al.—"Development of Digital Controlled Clock Oscilator for Delay Lock Loop", Electronics Information and Communication Convention, B–371: Mar. 1996: pp. 372.

Hamamoto, N. et al.—"PN–SS Equipment for Satellite Communications with Data Demodulation by Matched Filter", Electronic Communication Society Thesis Magazine, vol. 69–b, No. 11: pp. 1540–1547.

Sawahashi, M. et al.—"Decision–Directed Coherent Delay Locked Loop for DS–CDMA", The Institute of Electronics, Information and Communication Engineers, Technical Report of IEICE, RCS94–150: 1995.02: pp. 13–18.

Turin, George—"Introduction to Spread–Spectrum Antimultipath Techniques and Their Application to Urban Digital Radio", Proceedings of the IEEE, vol. 68, No. 3: Mar. 1980: pp. 328–353.

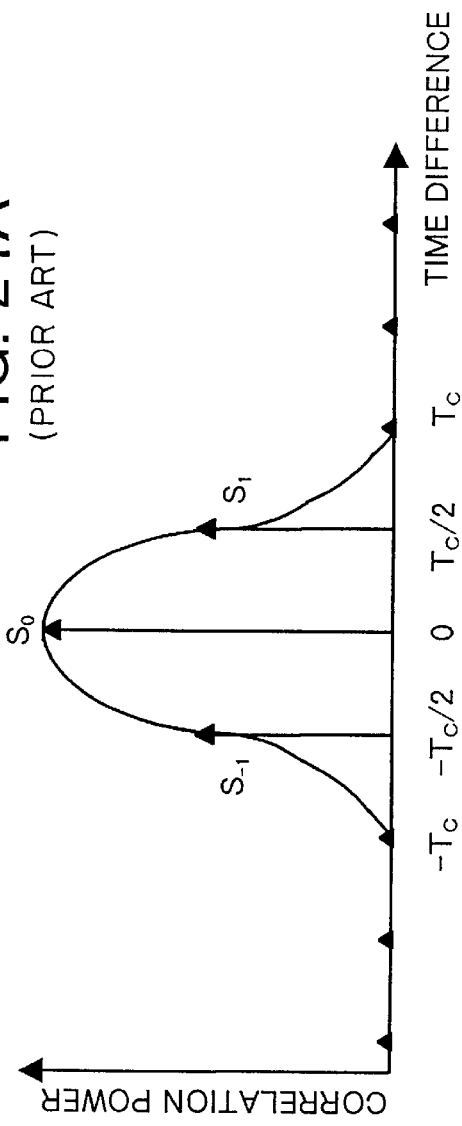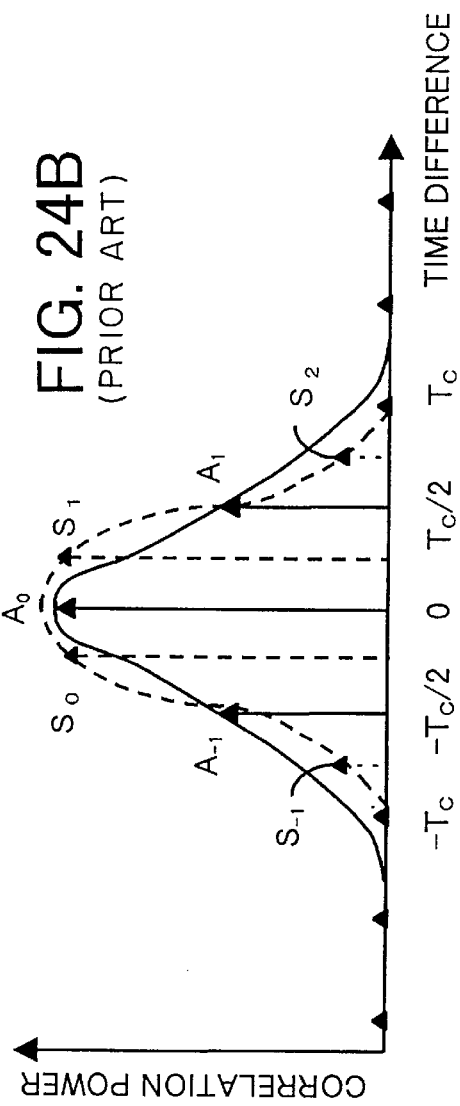

SPREAD-SPECTRUM SIGNAL RECEIVING METHOD AND SPREAD-SPECTRUM SIGNAL RECEIVING APPARATUS

BACKGROUND OF THE INVENTION

1. Field of the Invention

This invention relates to a spread-spectrum signal receiving method which is used, for example, in a communications system utilizing a direct-sequence spreadspectrum communication method (DS-CDMA) and to an apparatus thereof.

2. Description of the Prior Art

Spread-spectrum communication method is a method in which the spectrum of information signal is spread into a broad band and transmitted, by using a spreading code. The method is broadly divided into Direct Sequence (DS), Frequency Hopping (FH) and Time Hopping (TH) methods. The Direct Sequence method performs a spectrum spreading by calculating a product of pseudo-noise code and information signal. Spreading ratio of the spectrum is determined by a ratio of a spreading code rate to an information signal rate. This ratio is called a spreading rate or a processing gain (the value of a spreading rate in dB).

Communications using the spread-spectrum communication method have various advantages such as resistance to interference, a low interception rate or a low interference, resistance to a multi-path fading, ability of performing multiple access, etc. Since these advantages are particularly preferable for mobile communication, investigations have been made to adopt the spread-spectrum communication method into the mobile communication and this kind of mobile communication has been put into practical use. For connecting a mobile station and a base station, the spread-spectrum communication employs a method of discriminating these stations based on pseudo-noise codes used for the spread spectrum. This method of making a connection between the mobile station and the base station is called a Code Division Multiple Access (CDMA) method.

FIGS. 15 and 16 show arrangements of a conventional communications apparatus used in a direct-sequence spread-spectrum (DS-SS) communication which was presented by B. Y. Young et al. in IEEE Journal of Selected Areas in Communications, vol. 11, No. 7, pp. 1096–1107, entitled "Performance Analysis of An All-Digital BPSK Direct-Sequence Spread-Spectrum IF Receiver Architecture". FIG. 15 illustrates a transmission part and FIG. 16 indicates a reception part. In some cases, a signal processing part which is coherent to the spread spectrum is composed of an analog circuit. However, in light of reliability, no adjustment, hardware scale, mass-productivity (i.e. a production cost), and other requirements of the circuit, the signal processing part is in most cases realized by a digital circuit, like the traditional apparatus mentioned above.

The transmission part shown in FIG. 15 will be explained below. Data which is equivalent to information data, is input to a data spreader 1 of the transmission part. In the data spreader 1, a data encoder 2 performs data encoding such as a voice encoding, error-correction encoding, framing processing, etc., then outputs encoded data as a symbol. A spreader 3 makes a product of this encoded data and pseudo-noise codes given by a pseudo-noise code generator (PN Generator) 4. The product becomes a data spreader output which is then input to a modulator 5. In the modulator 5, a multiplier 7 multiplies this input and a carrier-wave signal provided by a local oscillator (RF OSC) 6, so as to perform carrier modulation. Output from the multiplier 7 is amplified in power by an amplifier (AMP) 9 after its modulated component is extracted by a band-pass filter (BPF) 8. Then, the amplified signal is transmitted from an antenna 10 as a high-frequency output signal (RF Output).

It should be noted that encoded data is hereinafter referred to as "a symbol", so as to distinguish data coded by a coding device 2 from the information data. The symbol takes a form of bi-phase digital phase shift keying (BPSK), quadrature digital phase shift keying (QPSK), quadrature amplitude modulation (QAM) or the like, in accordance with a carrier modulation method.

The reception part shown in FIG. 16 will be explained below. Antenna 11 receives a high-frequency signal which will become a high-frequency input (RF Input), and a band-pass filter (BPF) 12 extracts a received signal component from the RF input. Multiplier 13 multiplies the extracted signal and a carrier-wave signal provided by a local oscillator (RF OSC) 14, to obtain a product, and a low-pass filter (LPF) 15 extracts a low-frequency component from the product, then a base-band received signal on which a quasi-synchronous detection has been performed is provided. The quasi-synchronous detection indicates a detection in which the base-band received signal contains a residual deviation component, because of the fact that there is a deviation between a carrier signal given by the local oscillator 14 and a carrier signal in a received signal. Typically, the local oscillator 14 used in the reception part has an accuracy which can sufficiently be compensated by a signal processing, and the deviation affects to a degree that, in many cases, a quasisynchronous detection signal rotates slowly enough, compared with a symbol interval. In that case, a synchronous detection can be done that detects a phase difference between carrier-wave signals and performs a phase compensation.

In the next stage, gain control is performed on the quasi-synchronous detection signal by an automatic gain controller (AGC) 16, so that an average power of the signal remains constant. Then the signal is converted into a digital signal through an analog to digital (A/D) converter 17. The base-band received signal which has been A/D converted is input to a spread-spectrum IF receiver 18 which acts as a demodulator. The spread-spectrum receiver 18 comprises a demodulator 19, a synchronization acquisition unit (PN Acquisition Loop) 20, a synchronization tracking unit (PN Tracking Loop) 21 and a data decoding unit (Data Decoder) 22. The spread-spectrum communication utilizes pseudo-noise codes which are individually different for each channel in order to isolate and identify a signal from other channel signals. For demodulation of the spread-spectrum signal, it is necessary to multiply pseudo-noise code which is the same as the pseudo-noise code used in a transmitting side and to extract a desired component. Furthermore, the timing of multiplying the pseudo-noise code needs to match that of a received signal.

For that purpose, the spread-spectrum receiver 18 initially acquires a synchronization timing in the synchronization acquisition unit 20 that detects the synchronization timing by changing the phase of the pseudo-noise code. After that, a synchronization tracking unit 21 keeps track of the synchronization timing obtained by the synchronization acquisition unit 20. More specifically, the synchronization tracking unit 21 controls the timing of the pseudo-noise code so that it coincides with the timing of the received signal. This kind of timing tracking is necessary to cope with time-variant fluctuations of a communication path or deviations between transmission and reception of a clock used to generate the pseudo-noise code. The demodulator 19 multiplies the base-band received signal and the pseudo-noise code (which is the same as that used in the transmitting side), in accordance with the timing provided by the synchronization tracking unit 21. The demodulator 19 then integrates the multiplied results over a symbol-duration time. In accordance with the integration result, the symbol is therefore demodulated by a method which corresponds to a respective carrier modulation method. The demodulator 19 also estimates and compensates a transmission and reception carrier-frequency deviation (a phase difference) contained in the base-band received signal. The demodulated symbol is decoded by the data decoder 22 for restoration of transmission information. The restored information is sent out as an output data. This decoding includes frame division, error-correction decoding and voice decoding.

Multiplication of the pseudo-noise code and received signal in the demodulator 19 is called an inverse spread, and calculation extended to include the integration over the symbol-duration time is called a correlation operation. A circuit that executes the correlation operation is referred to as a correlator. In the CDMA method, because a desired signal component is obtained from correlation characteristic of the code, the correlation operation is used not only in the demodulator 19 but in the synchronization acquisition unit 20 and the synchronization tracking unit 21. Accordingly, the correlation operation is a basic operation in a demodulation process of the spread-spectrum signal. Generally, the method of executing this correlation operation is broadly divided into an active correlation method and a passive correlation method. The difference between these two methods depends on their way of giving the pseudo-noise code to be multiplied, that is, one is active while the other is passive.

FIGS. 17 and 18 show conventional arrangements related respectively to an active correlation method and a passive correlation method. FIG. 17 is a block diagram showing a conventional construction of a symbol demodulator comprising sliding correlators, that is, FIG. 17 describes a conventional arrangement of the active correlation method shown in "Digital Communications" by J. G. Proakis, chapter 8 of the second edition, 1989, McGraw Hill Corp. In FIG. 17, the portion surrounded by a dotted line corresponds to a correlating unit (a correlator) 25. In the active correlation method, a base-band received signal (Rx Baseband Signal) and pseudo-noise code generated by a pseudo-noise generator (PN Generator) 26 are multiplied and a correlation operation is executed by integrating the multiplied results over a symbol-duration time (Tb). Thus, the correlator 25 is also called a sliding correlator. Pseudo-noise code to be input to a multiplier 27 is given in time-sequential manner and integration time of an integrator 28 coincides with the symbol-duration time. The integrated symbol is output via a sampler 30 at the timing of a clock from a sample rate clock 31. Generation timing of the pseudo-noise code is controlled by a chip-rate clock 29. Although the circuit configuration shown in FIG. 17 is simple, only one correlation value is provided within each symbol-duration time, that is, the correlation value is output at a symbol interval.

FIG. 18 is a block diagram showing a conventional construction of a symbol demodulation circuit (a matched filter) employing the passive correlation method. The circuit is particularly called a digital matched filter (DMF) if implemented with digital circuitry. In FIG. 18, the portion surrounded by a dotted line corresponds to a correlating unit (a correlator) 35. In the matched filter, a base-band received signal (Rx Baseband Signal) is sampled at a pseudo-noise code rate (i.e. the chip rate) and the sampled signal is input to a shift register 36. The base-band received signals stored in each stage of the shift register 36 are respectively input to multipliers 37, each of which multiplies the base-band received signal and pseudo-noise codes (PN1 to PN7) 38 which are stored in fixed fashion. The result of this multiplication is input to an adder 39 and summed with other multiplied results.

As far as the pseudo-noise code is concerned, it is fixed at least during one data duration time, unlike the case in the active correlation method. As illustrated in FIG. 18, one data is spread by the seven-chip pseudo-noise codes (PN1 to PN7) in the correlation operation. The pseudo-noise code to be multiplied by the first shift-register sample is always the pseudo-noise code PN7 which is the seventh chip. In the configuration using matched filters, one correlation-operation result is output every time a reception sample is input, i.e. at a chip interval. This makes operation speed higher compared with that of a sliding correlator. Therefore, the longer the series length is, the higher the operation efficiency becomes. However, in the above configuration, power dissipation and hardware scale increase, thereby impacting signal quality and system cost. These tendencies are conspicuous when the length of pseudo-noise code for spreading a transmission symbol becomes longer, or a spread efficiency becomes higher.

As explained above, there are primarily two types of correlator for performing correlation operation at the receiving side receiving spread spectrum signals. Either of these types is selected according to circuit scale, power dissipation and operation speed factors. The arrangement of the demodulator 19 for demodulating a symbol as shown in FIG. 16 is the same as shown in FIGS. 17 and 18. In the demodulator 19, the output of the correlator 35 is sampled at the timing when the correlating-operation result is obtained. The synchronization acquiring unit 20 and the synchronization tracking unit 21 execute synchronization acquisition and tracking, respectively, by utilizing the time correlation characteristics of a pseudo-noise code.

The time correlation characteristics of a pseudo-noise code are as follows. The correlation operation produces a higher degree of correlation when the pseudo-noise code timing to be multiplied in the correlation operation coincides with the timing of pseudo-noise code contained in base-band received signal. However, if there is no coincidence between these two timings, the degree of correlation is lower. FIG. 19 indicates the time correlation characteristics of a pseudo-noise code and FIG. 20 shows an enlarged part of such characteristics. In FIGS. 19 and 20, the abscissa is time and the ordinate is a correlation value, and the characteristics show the state when no data modulation is applied. When a symbol modulation is executed by a BPSK modulator, the polarity of a correlation value changes in conformity with the polarity of a transmission symbol.

In FIG. 19, a correlation value exists in the vicinity where a time difference is "0". Needless to say, this characteristic depends on the nature of a pseudo-noise code and a correlation value of small level may exist at positions where a time difference has a value other than "0". Generally, a pseudo-noise code which can be considered to have an average value of "0" is used. In FIG. 19, Tp is the series period of a pseudo-noise code. In a case where a pseudo-noise code having a correlation characteristic shown in FIG. 19 is used, the synchronization acquiring unit 20 performs correlation operation by assuming the timing of a pseudo-noise code. As shown in FIG. 19, if the timing is properly assumed, a higher correlation value is provided. If it is not, no correlation value is provided. Therefore, it is possible to detect a timing in accordance with the magnitude of a correlation value.

FIG. 20 shows an example of correlation characteristic of a pseudo-noise code at a nearby region where a time difference is "0". If the pseudo-noise code is sufficiently random, the correlation characteristic of this region is generally equal to an impulse response given by combined characteristics of a transmission/reception-waveformreshaping filter. That is, when Nyquist transmission is performed for a chip waveform, the impulse response of a Nyquist waveform has a correlation characteristic which is equal to the characteristic at a nearby region where the time difference is "0". Accordingly, as the timing difference increases, the correlation value decreases. When the timing difference is one chip-interval (Tc) apart, the resulting output correlation value is "0". The synchronization tracking unit 21 executes synchronization tracking so that a correlation value for symbol demodulation is maintained at a maximum. In other words, synchronization tracking is performed to make the timing error small.

Configuration of the synchronization acquiring unit 20 will be explained below. A sliding correlator which is based on a conventional synchronization-acquisition method, for example, has a configuration shown in FIG. 21. This method is disclosed in WO96/04716 (PCT/US95/08659) of PCT International Publication. In FIG. 21, the portion surrounded by dotted line is a correlation operation unit 41. This example shows a synchronization acquiring circuit which performs synchronization acquisition for a signal whose transmission symbol is QPSK-spread modulated at the transmission side by using two kinds of pseudo-noise code, i.e., in-phase-axis pseudo-noise code and orthogonal-axis pseudo-noise code. Namely, a base-band transmission signal Tx is given by $$Tx = d \cdot (Pi + jPq)$$

where d is a transmission symbol; Pi, in-phase-axis pseudo-noise code; Pq, orthogonal-axis pseudo-noise code, and j is an imaginary unit. It should be noted that both the transmission symbol and the pseudo-noise code are functions of time, especially, the transmission symbol which is a function of time that changes at every symbol interval and the pseudo-noise code which is a function of time that changes at every chip interval. Details of these functions are omitted here.

A base-band received signal coming through an antenna 42 and a receiver 43 may be expressed as a quasi-synchronization-detection signal Rx as shown below, in the form which contains the phase difference $\phi$ of the carrier wave.

$$Rx = d \cdot (Pi + jPq) \cdot \exp(j\phi)$$

$$= d \cdot (Pi + jPq) \cdot (\cos \phi + j \sin \phi)$$

Here, a real component of Rx is an in-phase-axis received signal and an imaginary component is an orthogonal-axis received signal. These components are input to the correlation operation unit 41. In a QPSK despreader 41A, a multiplier and adder/subtractor are configured such that $Rx \cdot (Pi' - jPq')$ should be obtained, where Pi' and Pq' are codes obtained by assuming the timing of Pi and Pq for the quasi-synchronization-detection signal Rx (these Pi and Pq are both input from a PN generator 44). In digital integrators (Coherent Accumulators) 41B and 41C, the real component and the imaginary component are respectively integrated over the symbol interval, and each integration result is square-summed by a square-sum unit 45, thus outputting correlation power. In other words, if the timing of Pi and Pq and that of Pi' and Pq' match, Pi=Pi' and Pq=Pq' are obtained. Therefore, outputs of the QPSK despreader 41A are the real component and the imaginary component of $d \cdot (\cos \phi + j \sin \phi)$. If these components are square-summed, $d^2$ which is a reception symbol power, is provided. Moreover, when there is no match in the above timings, a correlation power having a small level is provided, because the pseudo-noise code is random in nature.

As shown above, because the timing of a pseudo-noise code is unknown at the stage of acquiring synchronization, the timing is assumed at the receiving side, thus providing correlation power associated with a received signal in accordance with the assumed timing. It is determined that the synchronization acquisition of a pseudo-noise code is completed when the power level output exceeds a prescribed level. The reason for using the correlation power for detecting synchronization acquisition is as follows:

(1) it is difficult to grasp a phase $\phi$ of a carrier wave at the synchronization acquisition stage.

(2) when a signal is data-modulated, modulation data causes the correlation-power amplitude of the received signal to change randomly in polarity at every correlation value, which can be offset by an averaging operation.

Generally, in order to reduce effect of noise, the correlation powers obtained at the same timings are, in many cases, averaged and the average correlation power is used to determine the completion of synchronization acquisition. In FIG. 21, an averaging unit (Non-Coherent Accumulator) 46 integrates correlation power which is obtained at every symbol interval, for a predetermined duration of time (i.e., a predetermined number of times) so as to average the power, and thereby reduce the effect of noise. After that, a comparator (Threshold Comparator) 47 compares the average power with a threshold level and sends the result to a control unit (Search Controller) 48 to determine synchronization-acquisition detection. If it is determined that the synchronization acquisition has been achieved, synchronization tracking and symbol demodulation are performed. If, on the other hand, the synchronization acquisition is incomplete, another timing different from the previous one is assumed and the operations mentioned above are repeated.

Though the method using a sliding correlator requires a simply-configured circuit, only one correlation value is provided at each symbol-interval. This requires an unacceptably long time for acquiring synchronization. To avoid this, some measures are taken such as implementing a synchronization-acquisition circuit which has a several systems for shortening the synchronization-acquisition time. For example, by setting the number of integrations for averaging and using plural threshold levels, primary evaluation may be accomplished based on a short integration time and a low threshold level, and secondary evaluation may be executed based on a longer integration time, only in a case where there is a high possibility that the reception timing matches.

If the reception timing is changed at a chip interval, only a correlation value having an accuracy related to the chip interval is provided. As understood from the characteristic shown in FIG. 20, when an appropriate reception timing is, for example, (n+0.5) chip, only the correlation power conforming to a correlation value obtained at the timing which is shifted 0.5 chip ([½] Tc) away from the proper timing, is provided at chip phases n and n+1. This causes degradation of acquisition performance. That is, even when the timing is close to the appropriate timing, a low correlation value makes timing detection difficult. To cope with this problem, detection of synchronization acquisition is executed, in most cases, by changing the reception timing with an accuracy of 0.5 chip-interval, that is, by changing the assumed timing by a step of 0.5 chip-interval.

A synchronization-acquiring circuit related, for example, to a digital matched filter is shown in FIG. 22. The configuration shown in FIG. 22 is disclosed in Journal of Institution of Electronics and Communications Engineers, Vol. 69-b, No. 11, pp. 1540–1547, entitled "Spread-spectrum communications apparatus for satellite communication, which directly performs data demodulation by a matched filter", by Hamamoto et al. Each output of the digital matched filter, which will give the correlation-operation result for the in-phase-axis signal and the orthogonal-axis signal, is squared by squarers 50A and 50B, respectively. The result is then summed by an adder 51, thus providing the correlation power.

The synchronization-acquiring unit shown in FIG. 21 outputs the correlation power at every symbol interval, while, the synchronization-acquiring circuit shown in FIG. 22 outputs the correlation power at [½] chip-interval. (Note that the method of giving two of the power, instead of one, at every chip-interval will be described later.) For example, if the period of the pseudo-noise code matches the symbol-duration time, the correlation power can be obtained with a resolution of [½] chip-interval in the synchronization-acquiring unit, by observing square-sums of the symbol-interval as shown in FIG. 21.

In the synchronization-acquiring unit shown in FIG. 22, a recursive integrator 52 executes an averaging operation using recursive addition, which will reduce the effect of noise. The recursive integrator 52 comprises an adder 52A to which the square-sums are input, a frame memory 52B for storing one pseudo-noise frame and a multiplier 52C which multiplies the output of the frame memory 52B by a predetermined coefficient.

The recursive addition is realized by feeding the output of the multiplier 52C to the adder 52A. By storing in the frame memory the result of the recursive addition that is performed in a symbol-period unit on the correlation power provided at every [½] chip-interval, the averaging operation may be executed without confusing the correlation power between different code-phase timings. The point in the frame memory 52B, at which the maximum averaged-correlation power is provided, is held by a maximum-value hold unit 53 and this point will be considered as the reception timing.

Similar to the sliding correlator and for the purpose of preventing degradation of the synchronization-acquiring performance caused by a correlation-value test with a chip-interval accuracy, the configuration shown in FIG. 23 may be adopted as the digital matched filter in the circuit shown in FIG. 22. In FIG. 23, the same references are used as in FIG. 18 to denote the corresponding parts and references with a suffix A denoting similar parts.

In FIG. 23, the portion surrounded by a dotted line corresponds to a correlating unit 35A. The input to a digital matched filter is sampled at a rate twice as high as that of PN clock; that is, it is over-sampled by two at each chip. Correspondence is then made between the PN code 38 to be multiplied by an input signal and the successive two samples for one chip. In this way, one sample of a correlation value is output at every [½] chip, thus preventing degradation of synchronization-acquiring accuracy.

FIGS. 24A and 24B show the results of correlation performed by the unit shown in FIG. 23. FIG. 24A depicts the result of an ordinary correlation operation. Assuming that $S_0$ is the correlation-operation result at the most suitable sampling timing, correlation-operation results $S_{-1}$ and $S_1$ at sampling timings adjacent to the timing of $S_0$, are small compared with $S_0$. In the configuration shown in FIG. 23, since a reception sample is input at a rate twice as high as the chip rate, the correlation-operation result is also obtained twice as fast as the chip rate. However, the pseudo-noise code whose sign bit is the same over two samples is multiplied and then summed together, therefore, as shown in FIG. 24B, the result of correlation operation executed twice as fast as the chip rate shows a value which is equal to that obtained by adding adjacent samples together. It should be noted that FIG. 24B shows the case in which the obtained result is divided by 2 and averaged. In other words, the maximum correlation value $A_0$ is a value obtained by adding correlation values $S_0$ and $S_1$, where $S_0$ is a sample input [¼] Tc prior to the synchronization timing and $S_1$ is a sample input [¼] Tc after that timing.

The theoretical analysis of such a method, including the effect of a transmission/reception-waveform reshaping filter is disclosed in "Performance of Soft Decision Digital Matched Filter in Direct-Sequence Spread-Spectrum Communication Systems" by Kataoka et al., IEICE Transactions, Vol. E74, No. 5, pp. 1115–1122, May 1991. According to this paper, degradation occurs at the most suitable sampling point in view of the signal to noise ratio, however, the degree of the degradation is very slight (0.06 dB in case of a root Nyquist filter having 40% of a transmission/reception equally-divided roll-off rate). According to this theoretical analysis, it can be recognized that at a portion where a timing error is large (approximately [½] Tc), the amount of degradation of the signal to noise ratio caused by the timing error is negligible.

The configuration of a conventional synchronization-tracking unit will be explained below. The synchronization-tracking unit basically comprises an element called a delay locked loop (DLL). FIGS. 25 and 26 show a conventional delay locked loop comprising a sliding correlator. FIG. 25 indicates configuration called an asynchronous DLL, while FIG. 26 depicts configuration called an inverse-modulation-type synchronous DLL. In FIGS. 25 and 26, portions surrounded by dotted lines are correlating units 58, 59, 70, 71 and 72.

The asynchronous DLL shown in FIG. 25 is disclosed in "A Digital Chip Timing Recovery Loop for Band-Limited Direct-Sequence Spread-Spectrum Signals" by R. D. Gaudenzi, IEEE Transactions on Communications, Vol. 41, No. 11, pp. 1760–1769, Nov. 1993. In FIG. 25, a complex base-band received signal (an in-phase-axis received signal and an orthogonal-axis received signal) is reshaped in waveform by a low-pass filter (LPF) 55, and sampled by a sampler 56 at an oversampled-by-two rate per chip. The result is fed into a serial/parallel converter (S/P) 57.

The output of the S/P 57 is divided into the following samples: a sample O (On Timing) used for symbol demodulation and samples E and L (Early and Late Timings) used for detection of a timing error for a synchronization tracking. In other words, a base-band received signal which is shifted in [½] chip-interval from the symbol demodulation timing, is used for detecting the timing error.

In FIG. 25, sample E (one of the input samples to a timing-tracking system) is directly subjected to a correlation operation by a multiplier 59A, while another sample, sample L, is subjected to a correlation operation by a multiplier 58B after it is delayed by a delay 58A by the amount of one chip. Hb(z)'s are low-pass filters corresponding to digital integrators. These correlation-operation results passing through the two systems are respectively squared by squarers 60A and 60B for removing effects of a carrier-wave phase, a symbol modulation, etc. and thereby changed to correlation power. An error signal is then generated by calculating a difference of the correlation powers with a subtracter 61. The error signal is input into a numerical control clock (NCC) 62. In the NCC 62, an averaging operation is performed on the error signal to reduce the effects of noise components and the like, then a sample clock of a received signal is controlled so that the error signal is reduced to 0.

FIGS. 27A and 27B show a correlation-power characteristic and an error characteristic, respectively. In FIG. 27A, the ordinate is correlation power and the abscissa is a time difference. This characteristic is called an autocorrelation characteristic of a spread-spectrum signal. It shows a typical curve of the characteristic, as shown in FIG. 20. If the effect of noise is small enough, the correlation power of a symbol has a maximum value, provided that the symbol is sampled at an appropriate timing (a time difference is 0). Furthermore, the correlation power will be reduced as the time difference becomes large.

In FIG. 25, a timing for the sample E is set [½] chip-interval earlier than that for the sample O which is used for a symbol demodulation. Accordingly, the sample E and the sample L whose sampling time is delayed one chip-interval from the timing of the sample E, exhibit the correlation power as shown in FIG. 27A. In this case, if the timing of the sample O is ideal, the correlation characteristic becomes symmetrical. This makes the correlation power of the samples E and L equal and an error signal becomes 0. If the timing of the sample O lags a little behind the appropriate timing, the correlation power of the sample E is greater than that of the sample L. As a result, the error signal becomes negative in value.

FIG. 27B shows a relationship between the error signal and a timing shift from an appropriate timing, with respect to the sample O. In FIG. 27B, the abscissa is a time difference and the ordinate is the error signal. That is, FIG. 27B shows that if the error signal is negative, the timing lags, however, if it is positive, the timing leads.

The configuration shown in FIG. 25 requires a squaring operation after the correlation operation in order to use a symbol modulation signal. However, it is not necessary to implement squarers 60A and 60B if, for example, a synchronous detection is ideal and the error signal is generated from a pilot signal and the like on which no symbol modulation is executed. In that case, the squarers 60A and 60B in FIG. 25 are omitted, and the configuration without these squarers is called a synchronous DLL. Therefore, enhancement of synchronization-tracking performance can be expected. Even in a case where a symbol-modulated spread-spectrum signal is used, an ideal synchronous detection realizes a DLL of a synchronous type by returning the polarity of the symbol modulation to the original one. The DLL configuration owing to such operation is called an inverse-modulation-type synchronous DLL.

FIG. 26 shows a conventional configuration of DLL called an inverse-modulation-type synchronous DLL, which is the configuration disclosed by Sawahashi et al., in The Technical Report of Institution of Electronics, Information and Communications Engineers, RCS94-50, pp. 13–18, Febuary 1995, entitled "An inverse-modulation-type coherent DLL in DS-CDMA". In FIG. 26, the portions surrounded by a dotted line are correlating units 70, 71 and 72; the portion surrounded by alternate long and short dash line is a synchronization-tracking unit 68; and the portion surrounded by alternate long and two short dashes line is a symbol-demodulati on unit 69.

The voltage-controlled pseudo-noise code generator (VCCG) 78 that is included in a correlator is a pseudo-noise generator whose generation timing is controlled by a voltage controlled signal, that is, an error signal. While the DILL shown in FIG. 25 executes synchronization tracking by controlling the sampling timing of an input sample, the DLL shown in FIG. 26 does the synchronization tracking by controlling the generation timing of the spread-spectrum code.

As far as the timing control is concerned, the configuration shown in FIG. 25 and that in FIG. 26 provide a similar performance, provided that the relative timing relationship between a received signal and a pseudo-noise code is controlled. The performance does not depend upon the difference between an asynchronous DLL and an inverse-modulation-type synchronous DLL. It is advantageous to adopt a method of controlling the generation timing of the pseudo-noise code when a RAKE receiver (which will be mentioned later) shares an analog-to-digital converter, independently performs synchronization tracking of the timing of the reception-path signal and executes demodulation. Note that when a DMF (which will be also mentioned later) is used, a method of controlling an input-sample timing is adopted so that a timing of peak value, for example, comes to the center position, because the code phase is fixed.

In FIG. 26, after a quasi-synchronous detection is performed on a received signal (a spread signal) in a QPSK quasi-synchronous detector (Quasi-quadrature Detector) 65, the signal is sampled by a sampler 67 at a rate which is integral multiples of a chip-interval, and the sampled signals are input into a symbol demodulator 69 and a synchronization-tracking unit 68, respectively. The symbol demodulator 69 performs a correlation operation with a pseudo-noise code which has a timing synchronized with the received signal. It should be noted that there remains the effect of a carrier-wave phase-difference $\phi$ in the quasi-synchronous detection signal. Assuming that a symbol is d, this effect is expressed by $d \cdot \exp(j\phi)$. $\phi$ is estimated in a carrier-wave phase estimation unit (Carrier Phase Estimator) 79 and $\exp(-j\phi')$ is generated from the estimation result $\phi'$. The product of the generated result and the correlation-operation result is then used for a symbol demodulation.

The synchronization-tracking unit 68 performs a correlation operation between a pseudo-noise code with a timing which is leading a symbol timing and a pseudo-noise code which is lagging behind the symbol timing, and provides a difference between the two operation results. Other than error signal component, the correlation-operation result includes effects of a modulation symbol d and a carrier-wave phase difference $\phi$. These effects can be described as $\epsilon \cdot d \cdot \cos(\phi)$, where $\epsilon$ is an error signal.

The modulation symbol d and the carrier-wave phase difference $\phi$ are removed by using d' estimated in the symbol demodulator (Data Decision) 81 and a phase difference $\phi'$ estimated in the carrier-wave phase estimation device 79, thus providing an error signal $\epsilon'$. The operation for removing the effect of d by using d' is an inverse modulation. $\epsilon'$ is input into a loop filter 76 and averaged to reduce effects of noise. After that, the averaged $\epsilon'$ is input into a voltage-controlled pseudo-noise code generator (VCCG) 78 as $\epsilon$, so as to control its timing. In this way, with the adoption of the inverse modulation, a square-sum circuit for removing effects of the carrier-wave phase difference and the modulation symbol is not required. This brings about no multiplying loss (Squaring Loss), therefore, it is possible to reduce the effects of noise components and furthermore, to improve performance of the synchronization tracking.

FIG. 28 shows an example of a timing-tracking unit using a digital matched filter. Configuration of this filter was presented by Kataoka et al. as "A digital synchronization method for use in a spread-spectrum communication, using a soft decision matched filter" in The Technical Report of Institution of Electronics, Information and Communications Engineers, RCSS91-4, pp. 23–30, May 1991. In the part shown in FIG. 28, outputs of two low-pass filters (LPFs) 87A and 87B, which are a quasi-synchronous detection signal, are A/D converted by A/D) converters 88A and 88B at a rate twice as high as the chip rate, and the converted signals are input into digital correlators 89A and 89B by the same clock.

The basic configuration of the digital correlator of FIG. 28 is the same as that of FIG. 23. The digital correlators 89A and 89B output the correlation-operation result at an interval twice as fast as the chip-interval. Outputs of the two correlators 89A, 89B are fetched at a symbol timing, and a reception symbol is demodulated if a phase compensation is executed. Then, effects of a carrier-wave phase and a modulation symbol are removed from outputs of the two correlators by squaring circuits 90A and 90B and an adder 91. Thus, the correlation power is provided. The correlation power is then divided into two parts, one of them is delayed by a delay circuit 92 having one chip interval. After that, a difference between the delayed power and the correlation power which has by-passed the delay circuit 92 is calculated by a subtracter 93. The subtracter outputs an error signal. When the digital matched filter shown in FIG. 28 is used, a subtracter output which has a timing containing a significant error signal (a symbol timing), is extracted by a latch circuit 94.

The error signal is averaged by a loop filter 95 to reduce effects of noise and this signal is input into a voltage-controlled oscillator (VCO) 96, so that a reception timing of a quasi-synchronous detection signal is controlled. Note that the relationship between the symbol timing of a correlation value and the timing which gives an error signal is similar to that described in FIGS. 25 and 27. That is, the timing when the error signal is latched corresponds to the next sample of a symbol timing (½ chip-interval later).

In the example shown in FIG. 28, the voltage-controlled oscillator (VCO) 96 comprises analog circuits and output of the VCO 96 is A/D converted. However, in view of miniaturization of an apparatus and its productivity, the VCO is preferably composed of digital circuits. In this case, it is conceivable that the apparatus has a configuration in which clock control is performed in a digital manner, similar to the configuration shown in FIG. 25.

FIG. 29 shows a conventional digitally-controlled clock generator presented by Takakusaki et al., entitled "Development of a digital-controlled clock generator for use in DLL", at the conference of communication society of the Institution of Electronics, Information and Communications Engineers, B-371, March 1996. A typical voltage-controlled oscillator (VCO) directly changes output frequencies by using an analog-controlled voltage. The generator shown in FIG. 29 directly changes the phase of an output clock by a digitally-controlled signal 98, with arrangement of a fixed clock 97 faster than the chip rate. In other words, the generator employs a method in which the delay time of a programmable delay element 99 is changed in accordance with a control value of the digitally-controlled signal 98, thus changing the phase of the clock. Through a divider circuit, clock control is performed in a digital manner on an output signal whose delay time has been controlled. In this case, because the units that update the timing are discrete, it is necessary to provide a clock as a basic clock which is faster than the chip rate, so as to realize a synchronization-tracking characteristic with higher accuracy. For example, if the fixed clock 97 is n times faster than the chip rate, the unit of controlling the chip timing is a 1/n chip-interval.

The chip rate is considerably higher than the symbol rate and is usually designed to have a spread rate ranging from a few 10 times to a few 100 times higher than the symbol rate, which requires a high-speed operation. Furthermore, it is required that the control unit of FIG. 28 operate at a rate n times higher than the chip rate, so as to realize a synchronization-tracking characteristic with high accuracy. Power dissipation of a digital circuit greatly depends on operation speed. Accordingly, a digital synchronization-tracking unit has a problem to solve such that an operation rate should be reduced without deteriorating the synchronization-tracking characteristic.

FIG. 30 shows another example of a conventional digitally-controlled clock generator. The concept of this generator is disclosed in "Phase Noise and Transient Times for a Binary Quantized Digital Phase-Locked Loop in White Gaussian Noise" by Cessna et al., IEEE Transaction on Communication, COM-20, No. 2, pp. 94, 1972. In FIG. 30, the timing of a free-running clock 100 which has a rate of chip-interval multiplied by integer, is controlled by a timing control signal in a pulse insertion/decimation circuit 101. To increase the timing, pulses are inserted into the clock signal. Digital circuits, for example, operate at a rising edge of the pulse; therefore, when pulses are inserted, the timing relatively leads. To lag the timing, clock pulses of a clock signal are decimated. If the free-running clock 100 has a rate n times higher than the chip rate, the timing controlled by insertion/decimation of one pulse is equal to [1/n] chip-interval.

In a circuit shown in FIG. 30 which is small in circuit scale compared with that of FIG. 29, the pulse-insertion operation needs to be faster than the free-running clock. Accordingly, in view of lowering power dissipation, a digital synchronization-tracking unit also has a problem to solve that operation speed should be reduced without deteriorating the synchronization-tracking characteristic.

In mobile communications, multi-path fading exerts a negative influence. As a result, a received signal comprises a multiple of reception-path signals having different timings, which vary their carrier-wave phase and magnitude independently. Because a spread-spectrum signal makes use of time-correlation characteristic caused by pseudo-noise code, the reception-path signals can be received separately and discriminately if the arrival-time difference of the reception-path signals is more than one chip-interval. Furthermore, reception characteristic can be improved by combining the separately-discriminated reception-path signals. Such a reception method is referred to as a RAKE reception.

FIG. 31 illustrates construction of a conventional RAKE receiver which is disclosed in U.S. Pat. No. 5,490,165. The RAKE receiver shown in FIG. 31 comprises a searcher element 105, a plurality of demodulation elements 106, a symbol combiner 107 and a controller 108. The searcher element 105 searches for a transmission signal from peripheral base stations and time-variant reception conditions such as timing and signal power of received multi-path signals. The demodulation elements 106 perform a synchronization tracking and, at the same time, perform symbol demodulation on each of the reception-path signals. The symbol combiner 107 combines symbol demodulation results of each of the demodulation elements 106. The controller 108 controls allocation of the reception-path signals which the demodulation elements 106 should demodulate, in accordance with searching result of the searcher element 105, result of the synchronization tracking and the demodulation symbol power of the demodulation elements.

In FIG. 31, a signal search executed by the searcher element 105 is a synchronization-tracking-like operation, and is realized by the configuration shown in FIG. 21, with respect to an apparatus construction. It should be noted that the configuration of FIG. 31 is slightly different from that of FIG. 21 in that the configuration of FIG. 31 executes a search for the reception-path signals while doing the synchronization tracking and the symbol demodulation. That is, there is a need to search for a new reception-path signal and re-allocate it to the demodulation elements 106 so as to avoid a complete step out, before all of the signals associated with synchronization tracking and symbol demodulation by the demodulation elements 106 become unable to be demodulated due to fluctuation of level caused by multi-path fading.

Therefore, it is necessary for the searcher element 105 to search for signals in a short period of time and with high accuracy. In particular, in order for the demodulation elements 106 to operate shortly after allocating a reception-path signal to the demodulation elements 106, the synchronization time needs to be shortened. At the time of a synchronization acquisition, accuracy in time is required. In such a case, a sliding correlator may have a lot of correlators connected in parallel to measure correlation power simultaneously, though at different timings. However, this raises a problem that as the number of correlators connected in parallel increases, the resulting hardware increases in both cost and size.

FIG. 32 shows in detail an arrangement of the demodulation elements 106 of FIG. 31, which is disclosed in U.S. Pat. No. 5,490,165. In FIG. 32, the portion surrounded by a dotted line is a correlating unit 110. Filters 110B and 110C extract a non-modulated pilot signal contained respectively in an in-phase-axis reception signal and an orthogonal-axis reception signal and then average those signals. Only spread modulation is performed on this pilot signal. The conventional arrangement shown in FIG. 32 illustrates a RAKE receiver for the pilot signal on which the information signal is code-division multiplexed at a transmission side. The non-modulated pilot signal and the information signal are code-division multiplexed by an orthogonal code (Walsh Function). That is to say, since the pilot signal and the information signal are multiplexed by the codes which are orthogonal to each other, the pilot signal is separated from the information signal only by performing integration as follows.

Outputs from a QPSK despreader 110A and from an orthogonal-code generator (Walsh Function Generator) 111 are multiplied by multipliers 110D and 110E. The multiplied results are output through accumulators 110F and 110G. This enables channel estimation. To realize a RAKE reception with a maximum-ratio compound, a weighting phase-compensation unit (Data Scale Phase Rotation) 112 estimates the phase difference of a carrier wave and amplitude of a received signal. It also implements a phase compensation and, at the same time, performs a weighting by the estimated amplitude, thus outputting a weighted synchronization-detection symbol. The symbol is input into a symbol storage register (FIFO) 113 and the timing is adjusted so that the symbol is output to a symbol combiner 107 (FIG. 31) at the same timing as other reception-path signals.

The following is a quantitative explanation. Assuming that, in descending order of reception timings, three reception-path signals have reception amplitudes, $\rho_0, \rho_1, \rho_2$; carrier-wave phases, $\phi_0, \phi_1, \phi_2$; and delay times, $0, t_1, t_2$ indicating a delay time from the fastest reception timing, a base-band reception signal MRx is expressed as follows.

$$MRx = \rho_0 \cdot d(t) \cdot \exp(j\phi_0) + \rho_1 \cdot d(t+t_1) \cdot \exp(j\phi_1) + \rho_2 \cdot d(t+t_2) \cdot \exp(j\phi_2)$$

Output of each demodulation element 106 (FIG. 31), which has been phase compensated and weighted, is $\rho_0^2 \cdot d(t)$, $\rho_1^2 \cdot d(t+t_1)$ and $\rho_2^2 \cdot d(t+t_2)$, respectively. When storage time of a symbol storage register 113 is respectively set to $\tau_0$, $\tau_0-t_1$ and $\tau_0-t_2$ ($\tau_0 \geq t_2$), output of the demodulation element 106 is $\rho_0^2 \cdot d(t+\tau_0)$, $\rho_1^2 \cdot d(t+\tau_0)$ and $\rho_2^2 \cdot d(t+\tau_0)$, respectively. If these outputs are combined by the symbol combiner 107 (FIG. 31), a symbol weighted with the power ($\rho^2$) is obtained.

The synchronization tracking unit shown in FIG. 32 also has a DLL configuration. That is, after a timing adjusting unit (Time Skew) 115 adjusts the timing of a pseudo-noise code given by a pilot pseudo-noise code generator (Pilot PN Generator) 114 so as to obtain an error signal, a correlator 116 comprising a QPSK despreader 116A and an integrator 116B performs a correlation operation. This correlation operation results in producing the error signal. A timing controller (Time Tracking) 117 averages the error signal to mitigate effects of noise, then the synchronization tracking unit executes a synchronization tracking so that the demodulation timing becomes appropriate.

In order to obtain prescribed timing accuracy similar to that obtained in the timing controller shown in FIG. 29 or FIG. 30, it is necessary for the timing controller 117 to operate at a higher rate which exceeds the chip rate. There is also a need for the timing controller 117 to operate so as to make power dissipation as low as possible, without deteriorating the accuracy. Furthermore, since the RAKE receiver of FIG. 31 has a plurality of demodulation elements 106, each of which contains a timing controller that requires a high-speed operation, low power dissipation is particularly a major subject for the RAKE receiver. In FIG. 32, the timing adjusting unit 113 for combining a symbol has an FIFO configuration, which raises a problem that the scale of the FIFO and its power dissipation become large as the operation speed becomes higher.

FIG. 33 shows configuration of a RAKE receiver using digital matched filters in the multi-path fading environment. This is a construction reported by G. L. TURIN in PROCEEDING OF THE IEEE, Vol. 68, No. 3, March 1980, entitled "Introduction to Spread-Spectrum Antimultipath Techniques and Their Application to Urban Digital Radio". In the receiver, an output signal of correlator on which synchronous detection has been performed is input into a delay circuit (Delay Line) 118, in which a timing adjustment is performed on multi-path received signals so that their combined timings coincide. The timing-adjusted signals are subjected to a weighting which corresponds to a reception amplitude of the multi-path received signals, then these signals are added in an addition unit (Summing Bus) 119. It is possible to prevent intrusion of unrequited noise by making the weighting 0 which corresponds to the timing when no multi-path signal is detected.

In the example shown in FIG. 33, an input signal to the RAKE receiver is a synchronous detection signal. However, it may have a configuration such that a correlation-operation output in which a carrier-wave phase difference remains is input, and at the same time a phase compensation is performed at a portion where the weighting is applied. For the weighting and the phase compensation, estimation of a reception amplitude $\rho$ and a carrier-wave phase $\phi$ is accomplished in a similar manner as shown in FIG. 26 or in FIG. 32.

In a case where the digital matched filter is used, a correlation value or correlation power is given at every interval of providing an input sample to the digital matched filter, i.e., at a rate faster than the chip rate. This makes synchronization acquisition and synchronization tracking relatively easy, however, only a correlation value associated with the time difference of equal interval can be detected. When raising the timing accuracy, it can be considered to expand the construction of FIG. 23 to that of FIG. 34 (in which the same numerals are used as in FIG. 23 to denote the same parts, while numerals with a different suffix denote similar parts). However, because a high accuracy requires expanding the circuit scale and increasing power dissipation, the construction becomes difficult and costly. Accordingly, an input-sample rate is limited by itself and it is also difficult to acquire a high-accuracy timing. This results in a continuing problem in that a timing error lowers signal power.

By taking the above problem into consideration, there reported construction as shown in FIG. 35, which is disclosed in Japanese laid-open publication No. 7-95125. In this publication, n digital matched filters 121 are arranged in parallel to realize low power dissipation. This construction is similar to a construction in which sliding correlators are operated in parallel, and reduces an operation speed by the number of parallel-arranged filters. In FIG. 35, a plurality of digital matched filters 121 are provided, which operate by a clock 122 same as the chip clock, though different in phase to each other. These filters respectively output a correlation value or correlation power to a multiplexer 123, and the multiplexer 123 outputs the value in a series manner. In this way, a high timing accuracy is obtained, while an operation speed of the digital matched filters 121 is kept to the chip rate.

However, an increase in a hardware scale due to parallel arrangement of the digital matched filters 121 is enormously large and the parallel arrangement also increases the amount of power dissipation, in spite of the fact that the maximum operation speed can be kept low. Accordingly, there still remains a problem that both hardware scale and power dissipation are unacceptably large.

SUMMARY OF THE INVENTION

This invention has been made to solve the above-mentioned problems. It is an object of the present invention to provide a method of receiving a spread-spectrum signal and a receiving apparatus of a spread-spectrum signal, for realizing miniaturization of the apparatus and power dissipation, without deteriorating the symbol (or data) demodulation characteristic, the synchronization acquisition characteristic or the synchronization tracking characteristic.

According to one aspect of the invention, a spread-spectrum signal receiving method is disclosed in which a correlation operation is performed for obtaining a correlation between a base-band component of a received spread-spectrum signal and a spread code, so as to demodulate the received signal. This method may be achieved by providing the following steps:

a first correlation operation step for performing a correlation operation between the spread code and the base-band component;

a second correlation operation step for performing a correlation operation at a timing equal to a timing difference between the spread code and the base-band component in said first correlation operation step, said timing difference being ½ of a spread-code interval; and an estimation step for estimating, based on results obtained in said first and second correlation operation steps, a correlation operation result at the timing point where a timing difference between the spread code and the base-band component is less than ½ of the spread-code interval.

According to a further aspect of the invention, a spread-spectrum signal receiving method in which a correlation operation is performed for obtaining a correlation between a base-band component of a received spread-spectrum signal and a spread code, so as to demodulate the received signal, the method including the steps of:

a first correlation operation step for performing a correlation operation on the spread code and the base-band component;

a second correlation operation step for performing a correlation operation on the base-band component and a spread-code which has been offset by ½ of a spread-code interval of said spread code;

an estimation step for estimating a correlation operation result at the center point of two timings where said first and second correlation operations have been performed, by adding the results of said first and second correlation steps;

a first weighting step for weighting the result of said first correlation operation step with a first predetermined weight;

a second weighting step for weighting the result of said second correlation operation step with a second predetermined weight; and a high-accuracy acquiring step for acquiring a highly accurate correlation timing in accordance with results of said estimation step and said first and second weighting steps.

According to a still further aspect of the invention, a spread-spectrum signal receiving method in which a correlation operation is performed for obtaining a correlation between a base-band component of a received spread-spectrum signal and a spread code, so as to demodulate the received signal, the method including the steps of:

a first correlation operation step for performing a correlation operation on the spread code and the base-band component;

a second correlation operation step for performing a correlation operation on the base-band component and a spread-code which has been offset by ½ of a spread-code interval of said spread code;

an estimation step for estimating a correlation operation result at the center point of two timings where said first and second correlation operations have been performed, by adding the results of said first and second correlation steps;

a first weighting step for weighting the result of said first correlation operation step with a first predetermined weight;

a second weighting step for weighting the result of said second correlation operation step with a second predetermined weight; and an optimum-timing selection step for selecting a correlation operation result or an estimation result at an optimum timing, in accordance with results of said estimation step, and said first and second weighting steps.

According to a further aspect of the invention, a spread-spectrum signal receiving method in which a correlation operation is performed for obtaining a correlation between a base-band component of a received spread-spectrum signal and a spread code, so as to demodulate the received signal, the method including the steps of:

a first correlation operation step for performing a correlation operation on the spread code and the base-band component when synchronization acquisition is executed by a correlation operation with a spread code which is assumed to be a base-band component of the received spread-spectrum signal;

a second correlation operation step for performing a correlation operation on the base-band component and a spread-code which has been offset by ½ of a spread-code interval of said spread code;

a first power calculation step for calculating correlation power from the result of said first correlation operation step;

a second power calculation step for calculating correlation power from the result of said second correlation operation step;

a first average-correlation-power calculation step for calculating first average correlation power, by performing an averaging operation on the calculation result of said first power calculation step;

a second average-correlation-power calculation step for calculating second average correlation power, by performing an averaging operation on the calculation result of said second power calculation step;

an average-power estimation step for estimating average correlation power at the center point of two timings where said first and second average correlation power have been calculated, by adding the results of said first and second average-correlation-power calculation steps;

a first weighting step for weighting the calculation result of said first average-correlation-power calculation step with a first predetermined weight;

a second weighting step for weighting the calculation result of said second average-correlation-power calculation step with a second predetermined weight; and a synchronization-acquisition detection step for executing a synchronization-acquisition detection by using the calculation result of said average-power estimation step and weighting results of said first and second weighting steps.

According to a further aspect of the invention, a spread-spectrum signal receiving method in which a correlation operation is performed for obtaining a correlation between a base-band component of a received spread-spectrum signal and a spread code, so as to demodulate the received signal, the method including the steps of:

a first code-interval shifting step for shifting a spread code by ½ times a code interval when synchronization tracking is executed by a correlation operation with a spread code which is assumed to be a base-band component of the received spread-spectrum signal;

a second code-interval shifting step for shifting a spread code by one code interval when synchronization tracking is executed by a correlation operation with a spread code which is assumed to be a base-band component of the received spread-spectrum signal;

a third code-interval shifting step for shifting a spread code by 3/2 times the code interval when synchronization tracking is executed by a correlation operation with a spread code which is assumed to be a base-band component of the received spread-spectrum signal;

a correlation operation step for performing a correlation operation on the spread code and the base-band component;

a first shift-correlation calculation step for performing a correlation operation on the spread code obtained in said first code-interval shifting step and said base-band component;

a second shift-correlation calculation step for performing a correlation operation on the spread code obtained in said second code-interval shifting step and said base-band component;

a third shift-correlation calculation step for performing a correlation operation on the spread code obtained in said third code-interval shifting step and said base-band component;

a first correlation-power calculation step for calculating a first correlation power from result of said correlation operation step;

a second correlation-power calculation step for calculating a second correlation power from correlation operation result of said first shift-correlation calculation step;

a third correlation-power calculation step for calculating a third correlation power from correlation operation result of said second shift-correlation calculation step;

a fourth correlation-power calculation step for calculating a fourth correlation power from correlation operation result of said third shift-correlation calculation step;

a first average-correlation-power calculation step for calculating an average correlation power by performing an averaging operation on said first correlation power obtained in said first correlation-power calculation step;

a second average-correlation-power calculation step for calculating an average correlation power by performing an averaging operation on said second correlation power obtained in said second correlation-power calculation step;

a third average-correlation-power calculation step for calculating an average correlation power by performing an averaging operation on said third correlation power obtained in said third correlation-power calculation step;

a fourth average-correlation-power calculation step for calculating an average correlation power by performing an averaging operation on said correlation power obtained in said fourth correlation-power calculation step;

a first estimated-average-correlation-power calculating step for estimating an average correlation power at the midpoint of timings where said calculation results have been obtained, by adding calculation results of said first and second average-correlation-power calculation steps;

a second estimated-average-correlation-power calculating step for estimating an average correlation power at the midpoint of timings where said calculation results have been obtained, by adding calculation results of said second and third average-correlation-power calculation steps;

a third estimated-average-correlation-power calculating step for estimating an average correlation power at the midpoint of timings where said calculation results have been obtained, by adding calculation results of said third and fourth average-correlation-power calculation steps; and a synchronization tracking step for performing synchronization tracking by using calculation results of said first, second, third and fourth average-correlation-power calculation steps and calculation results of said first, second and third estimated-average-correlation-power calculating steps.

According to a further aspect of the invention, a spread-spectrum signal receiving apparatus in which a correlation operation is performed for obtaining a correlation between a base-band component of a received spread-spectrum signal and a spread code, so as to demodulate the received signal, the apparatus including:

spread-code generation means for generating spread codes;

delay means for delaying the spread codes generated by said spread-code generation means and outputting the delayed spread-codes;

first correlation-operation means for performing a correlation operation between said spread codes and said base-band component;

second correlation-operation means for performing a correlation operation between said delayed spread-codes and said base-band component;

timing adjustment means for adjusting output timings of said first and second correlation-operation means;

high-accuracy-timing acquiring means for obtaining correlation-operation result at the midpoint of said output timings, from results of said first and second correlation-operation means whose output timings have been adjusted; and selection means for outputting a correlation value designated by the correlation-operation result which has acquired the high-accuracy-tining.

According to a further aspect of the invention, a spread-spectrum signal receiving apparatus in which a correlation operation is performed for obtaining a correlation between a base-band component of a received spread-spectrum signal and a spread code, so as to demodulate the received signal, the apparatus including:

spread-code generation means for generating spread codes;

delay means for delaying the spread codes generated by said spread-code generation means and outputting the delayed spread-codes;

first correlation-operation means for performing a correlation operation between said spread codes and said base-band component;

second correlation-operation means for performing a correlation operation between said delayed spread-codes and said base-band component;

square-sum calculation means for calculating respective correlation powers from correlation-operation results of said first and second correlation-operation means;

averaging means for obtaining average correlation power by respectively averaging said respective correlation powers;

high-accuracy-timing acquiring means for estimating average correlation power at the midpoint of timings which correspond to said respectively obtained average correlation power, from said respectively obtained average correlation power; and a controller for performing a synchronization-acquisition detection by comparing output of said high-accuracy-timing acquiring means and a predetermined threshold level.

According to a further aspect of the invention, a spread-spectrum signal receiving apparatus in which a correlation operation is performed for obtaining a correlation between a base-band component of a received spread-spectrum signal and a spread code, so as to demodulate the received signal, the apparatus including:

serial/parallel conversion means for converting said base-band component, which has been input at a rate twice as high as a chip rate, into first and second parallel output signals having the same rate as the chip rate;

a first matched filter for inputting the first output signal of said serial/parallel conversion means and outputting at said chip rate a correlation value between said base-band component and the first output signal;

a second matched filter for inputting the second output signal of said serial/parallel conversion means and outputting at said chip rate a correlation value between said base-band component and the second output signal;

square-sum calculation means for calculating first and second correlation powers from correlation values of said first and second matched filters, respectively;

averaging means for respectively averaging said first and second correlation powers and outputting first and second averaged correlation powers;

continuous high-accuracy acquiring means for estimating average correlation power at the midpoint of timings which correspond to said first and second averaged correlation powers and time-sequentially outputting the estimated average correlation power; and reception-path detection means for detecting the timing of a received signal by observing an output level of said continuous high-accuracy acquiring means and performing synchronization acquisition.

According to a further aspect of the invention, a spread-spectrum signal receiving apparatus in which a correlation operation is performed for obtaining a correlation between a base-band component of a received spread-spectrum signal and a spread code, so as to demodulate the received signal, the apparatus including:

spread-code generation means for generating spread codes;

delay means for delaying the spread codes in plural stages;

a plurality of correlation operation means for performing a correlation operation on said base-band component, said generated spread codes and said spread codes delayed in plural stages;

a plurality of square-sum calculation means for calculating respective correlation powers from correlation-operation results of said correlation operation means;

a plurality of averaging means for obtaining average correlation power by respectively averaging said calculated respective correlation powers;

timing adjustment means for adjusting timings for obtaining said plurality of average correlation powers;

first high-accuracy-timing acquiring means for estimating average correlation power at the midpoint of timings which correspond to said average correlation power;

timing control means for performing a timing control based on said estimated average correlation power, by using said plurality of average correlation power whose timings have been adjusted;

clock control means for controlling a spread-code clock in accordance with a control result of said timing control means; and second high-accuracy-timing acquiring means for selectively outputting the maximum correlation operation result from among a plurality of correlation operation results and estimated correlation-operation values at the midpoint timing, said values having been estimated from said operation results, in accordance with the control result of said timing control means.

According to a still further aspect of the invention, a spread-spectrum signal receiving apparatus in which a correlation operation is performed on a base-band component of the received spread-spectrum signal and a spread code, so as to demodulate the received signal, the apparatus including:

pilot spread-code generation means for generating pilot spread codes;

delay means for delaying said pilot spread codes in plural stages;

a plurality of correlation operation means for performing a correlation operation on said base-band component, said pilot spread codes and said spread codes delayed in plural stages;

a plurality of square-sum calculation means for calculating respective correlation power from correlation-operation results of said correlation operation means;

a plurality of averaging means for obtaining average correlation power by respectively averaging said calculated respective correlation powers;

timing adjustment means for adjusting timings for obtaining said plurality of average correlation powers;

first high-accuracy-timing acquiring means for estimating average correlation power at the midpoint of timings which correspond to said average correlation power;

timing control means for performing a timing control based on said estimated average correlation power, by using said plurality of average correlation power whose timings have been adjusted;

clock control means for controlling a spread-code clock in accordance with control result of said timing control means;

second high-accuracy-timing acquiring means for selectively outputting a maximum correlation operation result from among a plurality of correlation operation results and estimated correlation-operation values at the midpoint timing, said values have been estimated from said operation results, in accordance with the control result of said timing control means; and synchronization detection means for performing a channel estimation and a phase compensation by using outputs from said second high-accuracy-timing acquiring means.

According to a further aspect of the invention, a spread-spectrum signal receiving apparatus in which a correlation operation is performed for obtaining a correlation between a base-band component of a received spread-spectrum signal and a spread code, so as to demodulate the received signal, the apparatus including:

spread-code generation means for generating spread codes;

delay means for delaying the spread codes in plural stages;

a plurality of correlation operation means for performing a correlation operation on said base-band component, said generated spread codes and said spread codes delayed in plural stages;

a plurality of delay means for respectively delaying said plurality of correlation-operation results by the time required for a channel estimation;

a plurality of synchronization detection means for respectively performing a phase compensation and a weighting by using values associated with said channel estimation;

a plurality of inverse modulation means for respectively performing an inverse modulation by using data which has temporarily been judged for said synchronization detection means;

averaging means for performing an averaging operation on said plurality of inverse-modulated results;

first high-accuracy-timing acquiring means for estimating average correlation-operation result at the midpoint of timings which correspond to said average correlation-operation results, by using said plurality of average correlation-operation results whose timings have been adjusted;

timing control means for performing a timing control based on said estimated average correlation-operation result;

clock control means for controlling a spread-code clock in accordance with the control result of said timing control means;

second high-accuracy-timing acquiring means for selectively outputting the maximum correlation operation result from among a plurality of correlation operation results and estimated correlation-operation values at the midpoint timing, said values have been estimated from said operation results, in accordance with the control result of said timing control means;

channel estimation means for estimating a channel by using correlation-operation results given by said second high-accuracy-timing acquiring means; and third high-accuracy-timing acquiring means for selectively outputting synchronization-detection result by which a maximum synchronization detection level is obtained, from among a plurality of synchronization-detection results and estimated synchronization detection values at the midpoint timing, said values have been estimated from said synchronization-detection results, in accordance with the control result of said timing control means.

According to a further aspect of the invention, a spread-spectrum signal receiving apparatus in which a correlation operation is performed for obtaining a correlation between a base-band component of a received spread-spectrum signal and a spread code, so as to demodulate the received signal, the apparatus including:

serial/parallel conversion means for converting said base-band component, which has been input at a rate twice as high as a chip rate, into first and second parallel output signals having the same rate as the chip rate;

a first matched filter for inputting the first output signal of said serial/parallel conversion means and outputting at said chip rate a correlation value between said base-band component and the first output signal;

a second matched filter for inputting the second output signal of said serial/parallel conversion means and outputting at said chip rate a correlation value between said base-band component and the second output signal;

square-sum calculation means for calculating first and second correlation powers from correlation values of said first and second matched filters, respectively;

averaging means for averaging said first and second correlation powers and outputting first and second averaged correlation power, respectively;

first continuous high-accuracy acquiring means for estimating average correlation power at the midpoint of timings which correspond to said first and second averaged correlation powers and time-sequentially outputting the estimated average correlation power;

phase compensation means for phase-compensating outputs of said first and second matched filters;

second continuous high-accuracy acquiring means for estimating a synchronization-detection signal at the midpoint of timings from said phase-compensated synchronization-detection signals and time-sequentially outputting the estimated synchronization-detection signals; and RAKE synthesizing means for multiplying and synthesizing outputs of said first continuous high-accuracy acquiring means weighted by the average correlation power and outputs of said second continuous high-accuracy acquiring means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 24A and 24B respectively show normal correlation characteristic curve and a curve provided for explaining procedures for obtaining a correlation value at the center point based on values at adjacent points;

DETAILED DESCRIPTION OF THE PREFERRED EMBODIMENT

Embodiments according to this invention will be explained with reference to accompanying drawings.

First Embodiment

Figure 34:
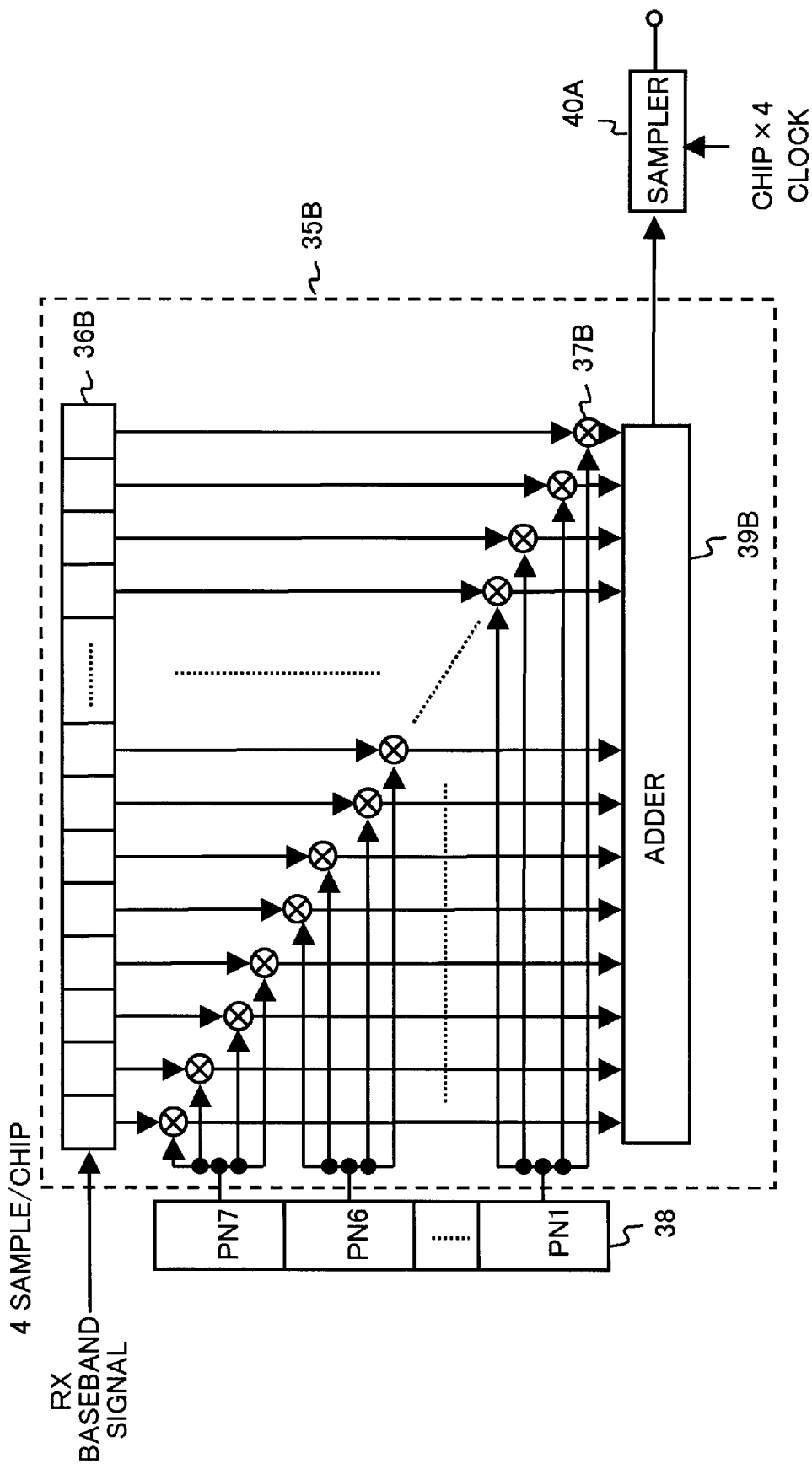
FIG. 34 is a block diagram showing a conventional construction for realizing a high-accuracy timing matched filters.

FIGS. 1A to 1D are diagrams for describing a principle for obtaining a high-accuracy timing according to this invention. In FIGS. 1A to 1D, the illustrated curves show a correlation value or correlation-power characteristic of an SS signal. Though the following description can be applied to the correlation value and correlation power, here it is assumed that the description is only associated with the correlation value. In the following description, a sampling indicates an oversampling-by-two, which means the sampling rate is twice as fast as the chip rate. In FIGS. 1A to 1D, arrows $S_{-1}$, $S_0$, $S_1$ and $S_2$ show results of correlation operation performed on sampled values which are obtained at respective sampling timing. $A_{-2}$, $A_{-1}$, $A_0$ and $A_1$, which correspond to correlation values associated with the digital matched filters as explained with reference to FIG. 23, FIG. 34 and other figures, are correlation values obtained by adding values acquired at the neighboring sampling timings and these correlation values correspond to the midpoint of those sampling timings.

Figure 1A:
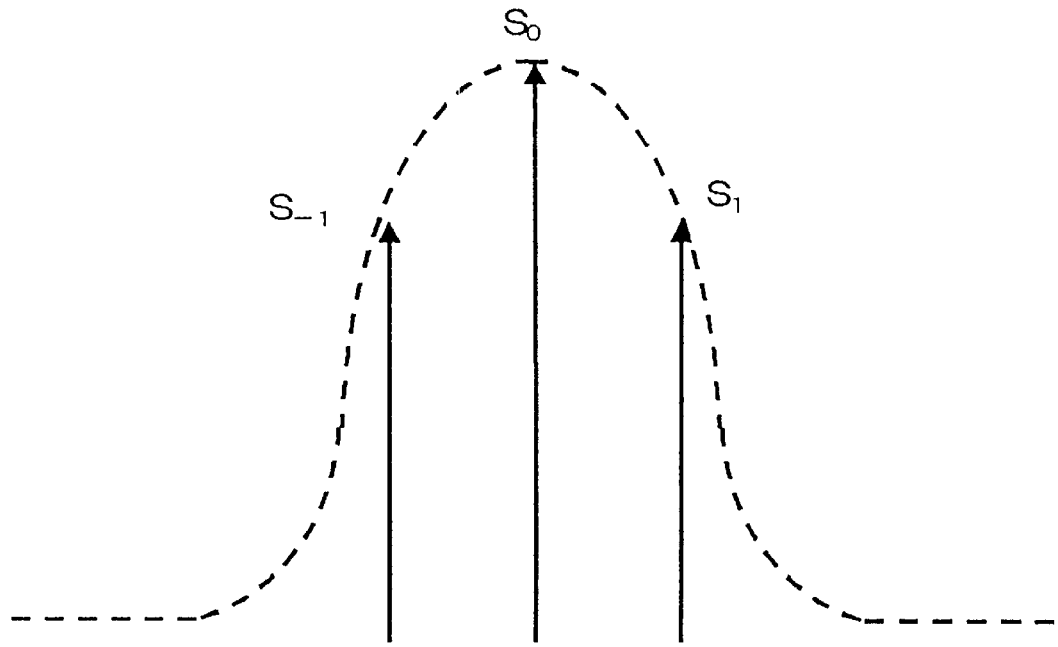
FIGS. 1A to 1D show signal waveforms used for description of a principle of this invention.
Figure 1B:
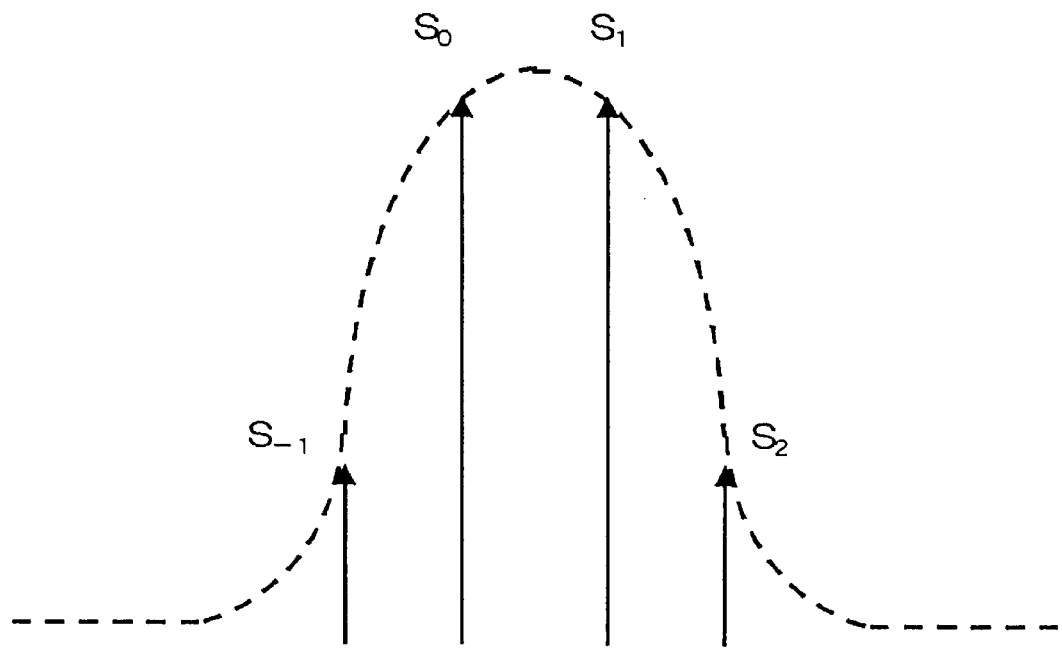
Figure 1C:
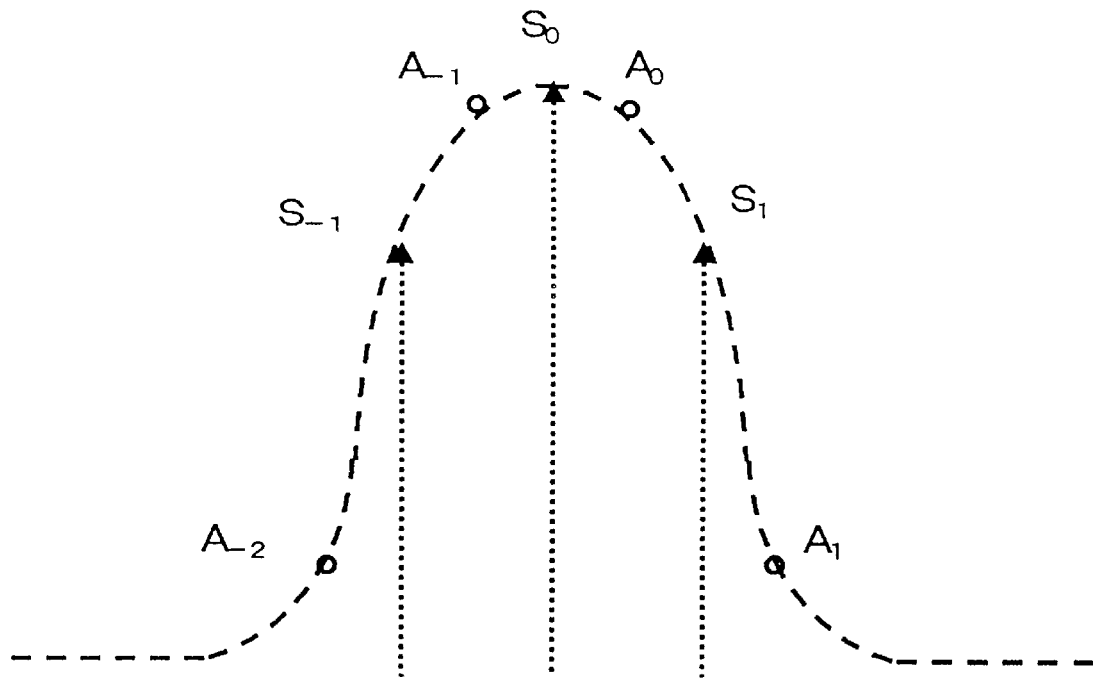
Figure 1D:
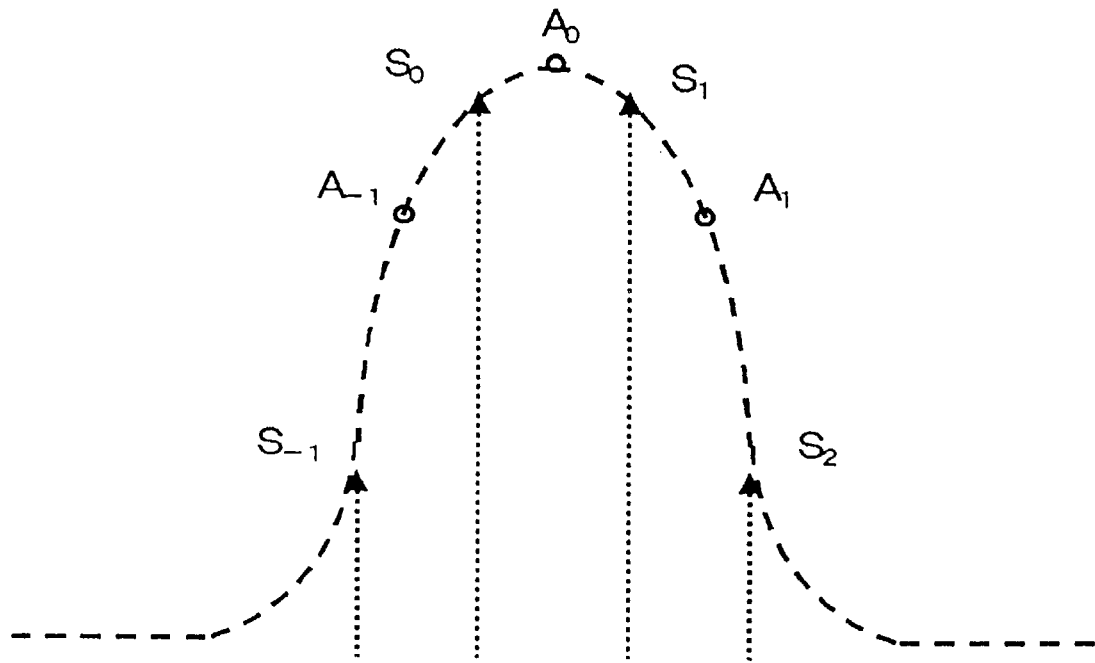

FIG. 1A shows that $S_0$ is the maximum correlation value which is provided at the appropriate sampling timing. FIG. 1B indicates that neither $S_0$ nor $S_1$ exceed the maximum correlation value, since the appropriate sampling timing is located in the midpoint of sampling timings which respectively correspond to correlation values $S_0$ and $S_1$. FIG. 1C, on the other hand, illustrates that the appropriate sampling timing exists in the midpoint of sampling timings which correspond respectively to correlation values $A_{-1}$ and $A_0$. These values are obtained by the construction shown in FIG. 23, thus both $A_{-1}$ and $A_0$ are smaller in value than the maximum correlation value. FIG. 1D shows that $A_0$ is provided as the most suitable correlation value.

Comparing FIG. 1A and FIG. 1C, it is understood that a state in which a correlation value is provided at the appropriate sampling timing as shown in FIG. 1A corresponds to a state in which a correlation value is obtained by adding neighboring correlation values at the inappropriate timings as shown in FIG. 1C.

In contrast, by comparing FIG. 1D and FIG. 1B, it is understood that a state in which a correlation value is obtained by adding neighboring correlation values at the appropriate timing as shown in FIG. 1D corresponds to a state in which a correlation value is provided at the inappropriate sampling timings as shown in FIG. 1B. This suggests that the states shown in FIG. 1A and FIG. 1C have a relationship that can be interpolated with each other, and the same is true for the relationship between the states in FIG. 1D and FIG. 1B. In other words, if a correlation value obtained by performing an oversampling-by-two is considered to be a basic correlation value and, if necessary, a correlation value at the midpoint timing between sampling timings (at which the neighboring samples are obtained) is estimated from addition result of these neighboring samples, then a correlation value is obtained which corresponds in pseudo-fashion to an accuracy of time provided by an oversampling-by-four.

This invention is based upon the above-mentioned principle, and with respect to time, this invention realizes a higher demodulation accuracy, a higher synchronization-tracking accuracy and a higher synchronization-acquisition accuracy with fewer calculations. $S_0$ of FIG. 1B and $A_{-1}$ of FIG. 1C are correlation values corresponding to the same timing, however, they are different in value. This requires a correction coefficient which depends upon the response characteristic of a waveform-shaping filter. Furthermore, when dealing with a correlation value and correlation power, it is necessary to independently set up a coefficient for the amplitude and a coefficient for the power. Correction coefficients with respect to the correlation values (amplitude) may be determined experimentally or by a computer simulation, or the like, so that the average error-rate or the timing error is minimized. For example, it may be determined, as shown below, in conformity with a characteristic of the correlation value.

Assuming that the chip-impulse response (a combined impulse response of a transmission/reception waveform-reshaping filter) is h(t), which is an average correlation value at the time difference t, a sample center-point g(t) is provided by the following equation in which correlation values of neighboring samples are added.

$$g(t)=h(t-Tc/4)+h(t+Tc/4)$$

This equation is based on the fact that a correlation value for a sample at the center point is obtained by correlation values corresponding to a sample at Tc/4 anterior to the center point and to a sample at Tc/4 posterior to the center point. As shown in FIG. 1, as far as the relationship between a timing error and a correlation value is concerned, it is adequate to use a correlation value itself if a timing error related to $S_0$ is less than Tc/8, and to use added correlation values if the timing error is within a range of Tc/8 to Tc/4. Therefore, a correction coefficient $G_A$ for the correlation value may be set as follows.

$$G_A \cdot h(Tc/8)=g(Tc/8)$$

Similarly, a correction coefficient $G_P$ for the correlation power may be set as follows.

$$G_P \cdot h^2(Tc/8)=g^2(Tc/8)$$

If the chip-impulse response is symmetric and has a shape gradually decreasing according to the timing error, a timing accuracy similar to that obtained by an oversampling-by-four can be realized by using these correction coefficients $G_A$ and $G_P$.

Second Embodiment

Figure 2:
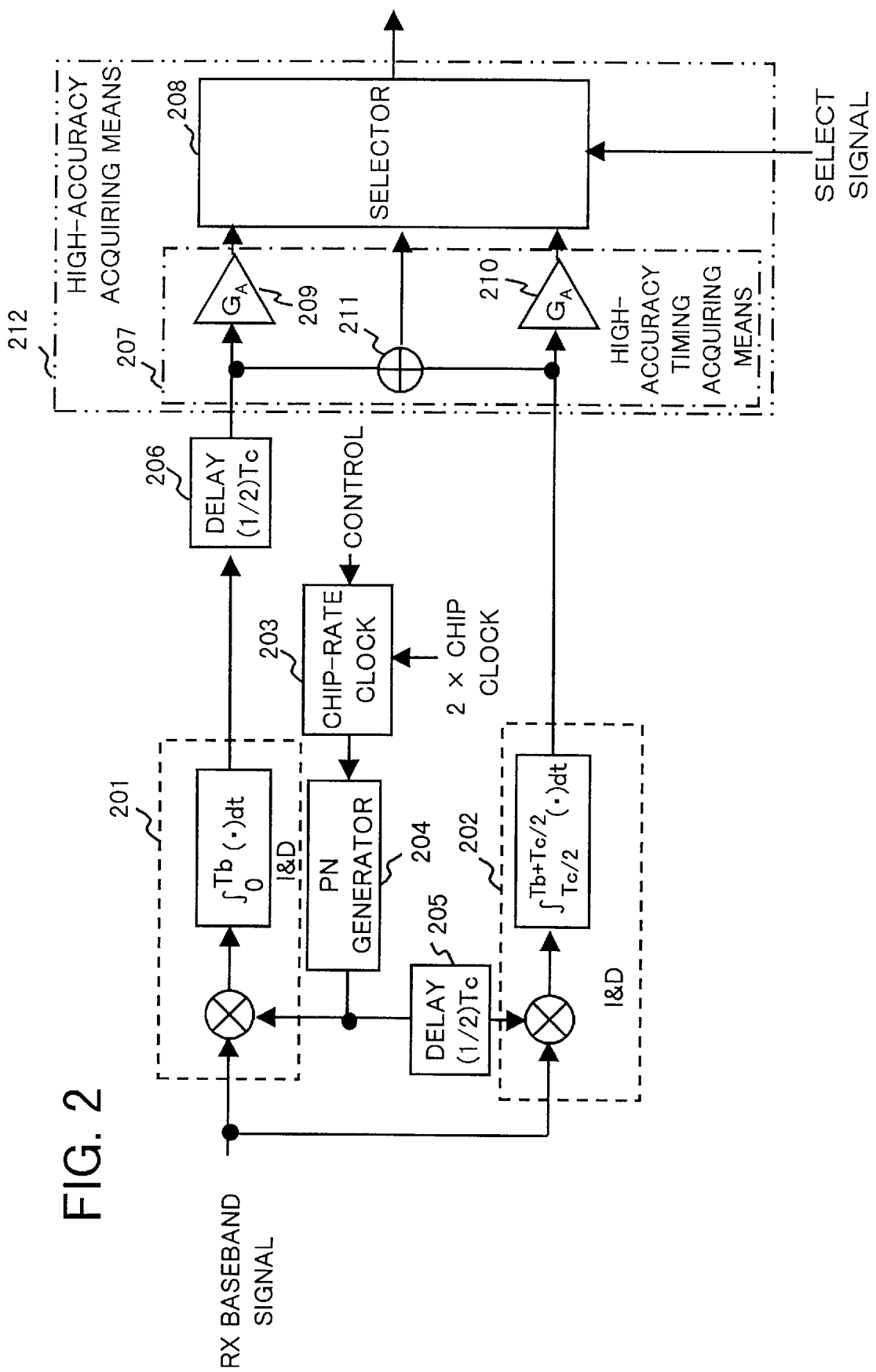
FIG. 2 is a block diagram showing construction of a symbol demodulator comprising a sliding correlator according to this invention.
Figure 17:
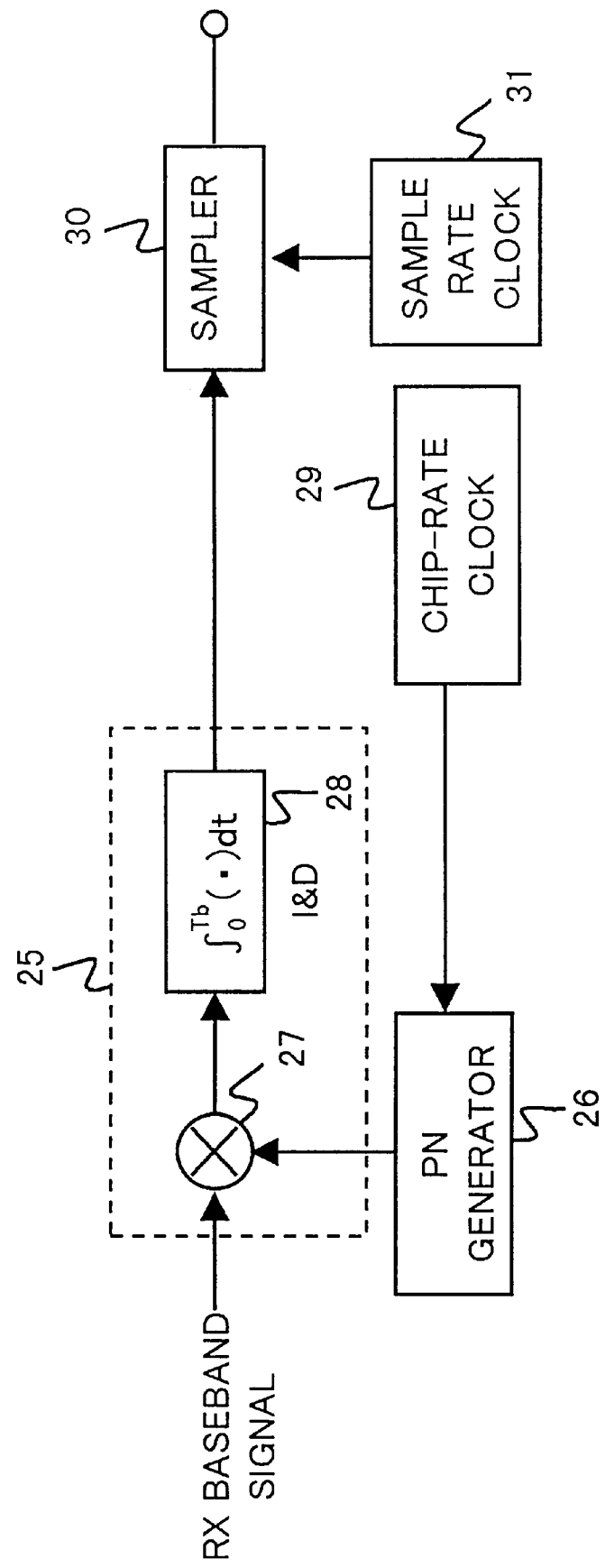
FIG. 17 is a block diagram showing conventional construction of a symbol demodulator comprising sliding correlators.
Figure 18:
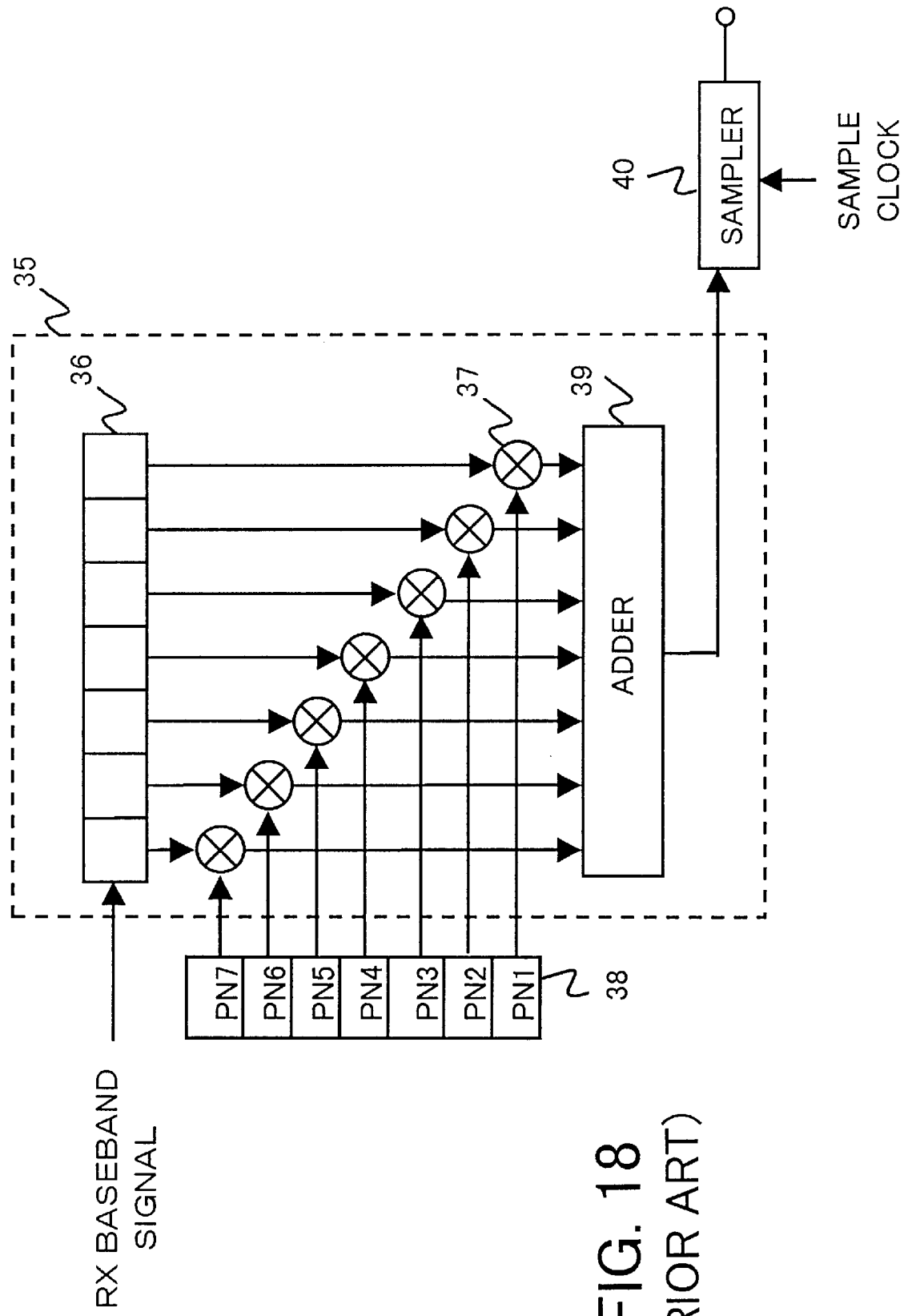
FIG. 18 is a block diagram showing conventional construction of a symbol demodulation circuit comprising digital matched filters.
Figure 19:
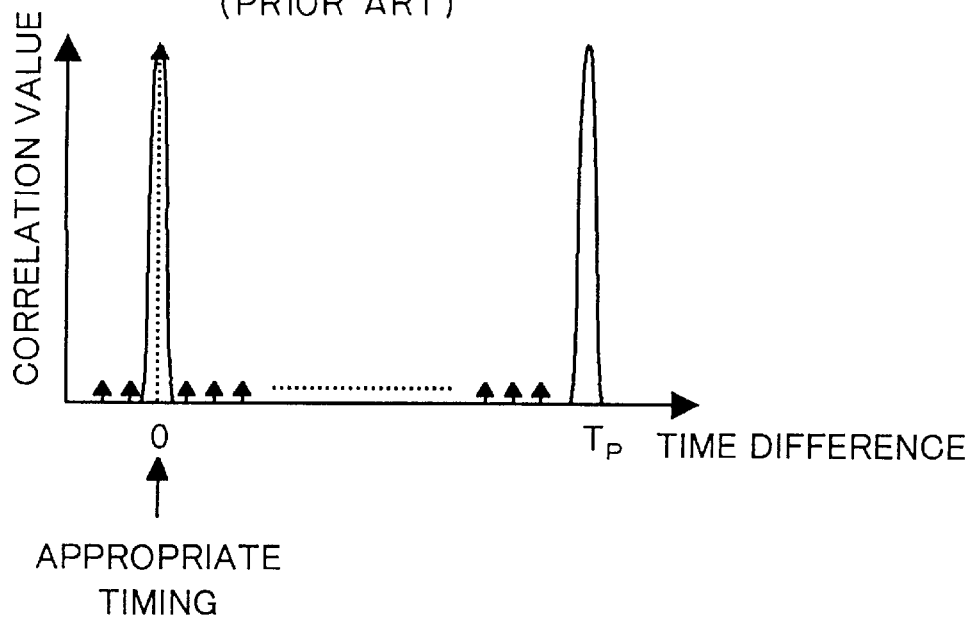
FIG. 19 is a diagram showing time correlation characteristics of spread-spectrum code.
Figure 20:
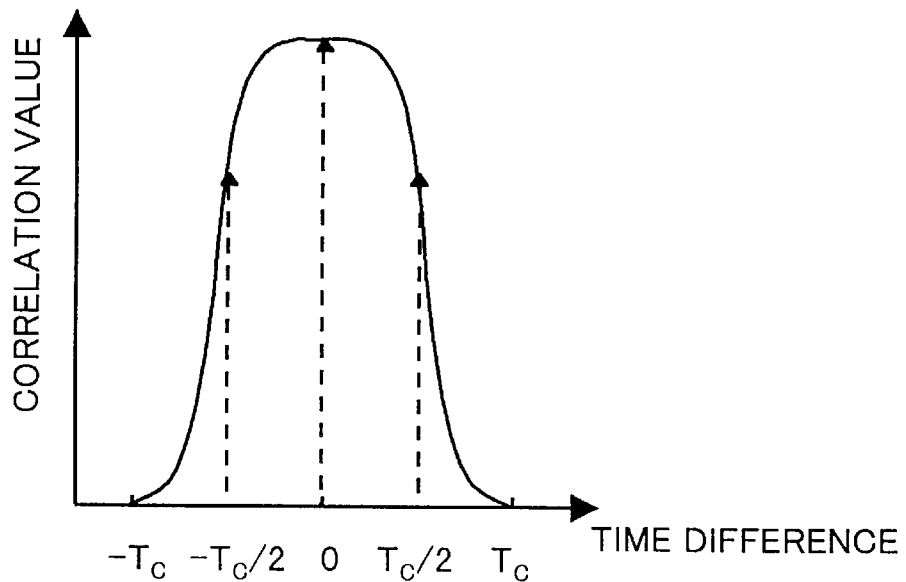
FIG. 20 is a diagram showing time correlation characteristics of spread-spectrum code.

FIG. 2 shows an example of a symbol demodulator utilizing sliding correlators, according to this invention. FIG. 2 corresponds to FIG. 17. In FIG. 2, portions 201 and 202 surrounded by dotted lines are a sliding correlator, the portion surrounded by alternate long and short dash line is a high-accuracy-timing acquiring unit 207 and the portion surrounded by alternate long and two short dashes line is a high-accuracy acquiring unit 212. Clock (Chip-rate Clock) generator 203 drives a pseudo-noise code generator (PN Generator) 204. The generator 203 inputs a free-running clock having a rate twice as high as the chip rate and controls the timing of the generator 204 in a ½ chip-unit in accordance with a timing control signal (Control). Pseudo-noise codes output from the generator 204 are divided into two parts. In the sliding correlator 201, a correlation operation is directly performed on one part of the divided pseudo-noise codes with a received base-band signal. Delay circuit 205 delays another part of the divided pseudo-noise codes by [½] chip-interval ([½] Tc), then a correlation operation with the received base-band signal is executed in the sliding correlator 202.

The correlation operation is performed in synchronism with the spreading codes. Therefore, the integration initialization/termination time of the correlation operation in the sliding correlator 202 is delayed by [½] Tc, compared with that of the correlation operation in the sliding correlator 201. For the purpose of absorbing this delay, a correlation value output from the correlator 201 is delayed by a delay circuit 206 only by [½] Tc, then sent to the high-accuracy acquiring unit 212.

It should be noted that the sliding correlators 201 and 202 are operated in a chip-unit and their timings are mutually shifted by a [½] chip-interval. Accordingly, it may be possible to have an arrangement in which a seria/parallel conversion (the number of parallel stages is two) is performed on a received base-band signal, then one converted output is sent to the sliding correlator 201 and another output to the sliding correlator 202. In this case, the delay circuits 205 and 206 can be omitted. This method is applied to all constructions using a sliding correlator which will be described in the following embodiments.

The high-accuracy acquiring unit 212 improves the timing accuracy of a correlation value, that is, a correlation value with a double-timing-accuracy becomes a correlation value with a quadruple-timing-accuracy.

Improvement in the timing accuracy can be accomplished as follows. In the high-accuracy-timing acquiring unit 207, the above-mentioned correlation values are amplified by amplifiers 209 and 210 respectively, in accordance with a correction coefficient GA with respect to an amplitude of a correlation value. The correlation value at the center point of timing is obtained by adding the correlation values with an adder 211. Selector 208 selects one of three correlation values conforming to a selection signal, and outputs the selected value. The selection signal is a signal which corresponds to the appropriate timing determined by a synchronization tracking unit which will be described later. With such a configuration, a correlation value having a quadruple-timing-accuracy can be obtained, in spite of the fact that the symbol demodulator operates at the maximum speed of a double chip-clock and has units of control [½] Tc. This arrangement realizes low power dissipation without deteriorating timing accuracy. The construction shown in FIG. 2 has more correlators than the construction of FIG. 17, however, these correlators are shared by the synchronization tracking unit. Therefore, if the synchronization tracking unit is taken into account, the construction of FIG. 2 does not lead to an increase in hardware scale or cost.

Figure 3:
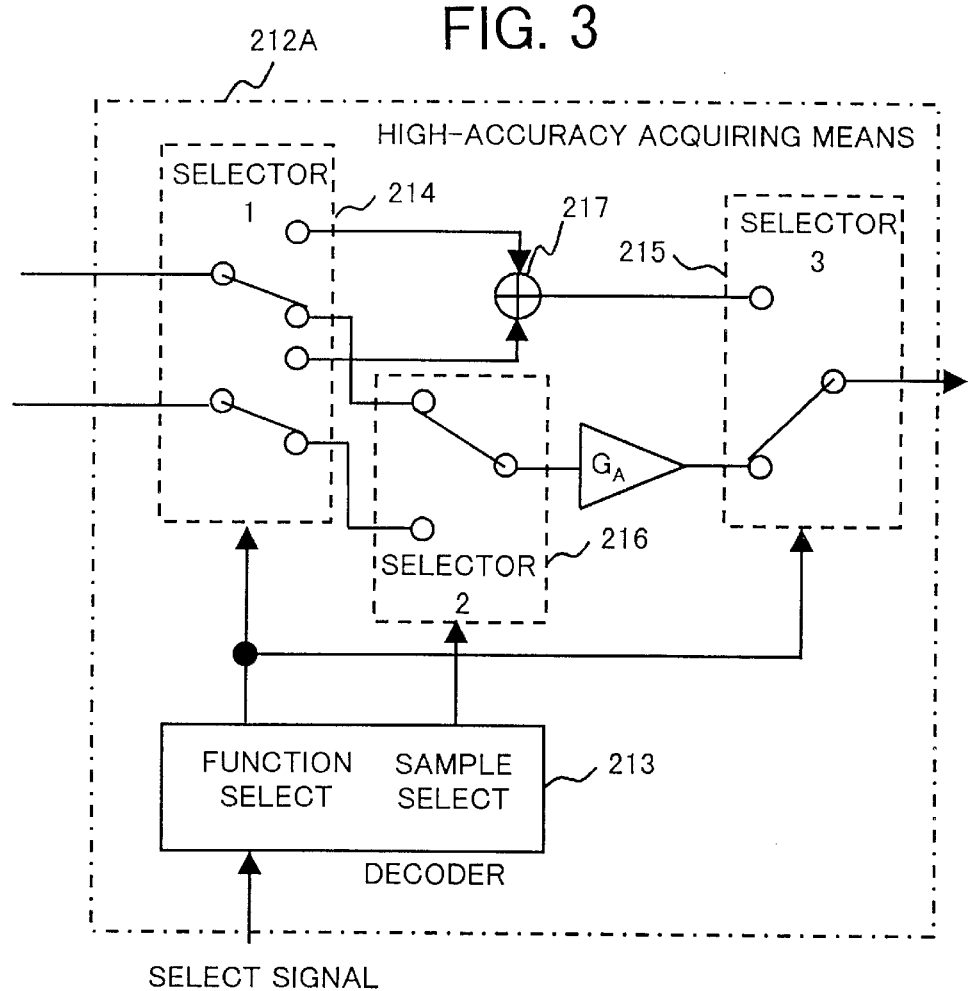
FIG. 3 is a block diagram showing construction of unit for acquiring high accuracy according to this invention.

FIG. 3 is a modified embodiment of the high-accuracy acquiring unit 212 of FIG. 2. In FIG. 3, the portion 212A surrounded by alternate long and short dash line corresponds to the high-accuracy acquiring unit 212. In the embodiment shown in FIG. 2, a correlation value at the center point of timing is calculated from two input correlation values, then one of the correlation values is selected by the selector 208. However, the embodiment of FIG. 2 has redundancy in its processing, because only one correlation value is really required. Because amplification of one correlation value or addition of two correlation values is required as a calculation function, a decoder 213 decodes a selection signal and divides it into two signals. One is a finction selection signal (Function Select) for selecting either the amplification or the addition. The other is, when the amplification is selected, a sample selection signal (Sample Select) for selecting which of the correlation operation results, output of the correlator 201 or that of the correlator 202 of FIG. 2, should be amplified. Selector 1 (214) and selector 3 (215) are used for a selection of the calculation function, and in case of the amplification, selector 2 (216) selects a correlation value.

Because the functions performed by the decoder 213 and the circuit configuration of the selectors 214, 215 and 216 are simple, and furthermore, the selector 1 (214) and selector 3 (215) are sequentially operated, the circuit scale can be reduced and low power dissipation owing to the omission of a redundant calculation can be realized. It should be noted that if the improvement of a timing accuracy by the high-accuracy acquiring units 212 and 212A is directed to correlation power instead of a correlation value (amplitude), a correction coefficient $G_A$ is changed to a correction coefficient $G_P$.

Third Embodiment

Figure 4:
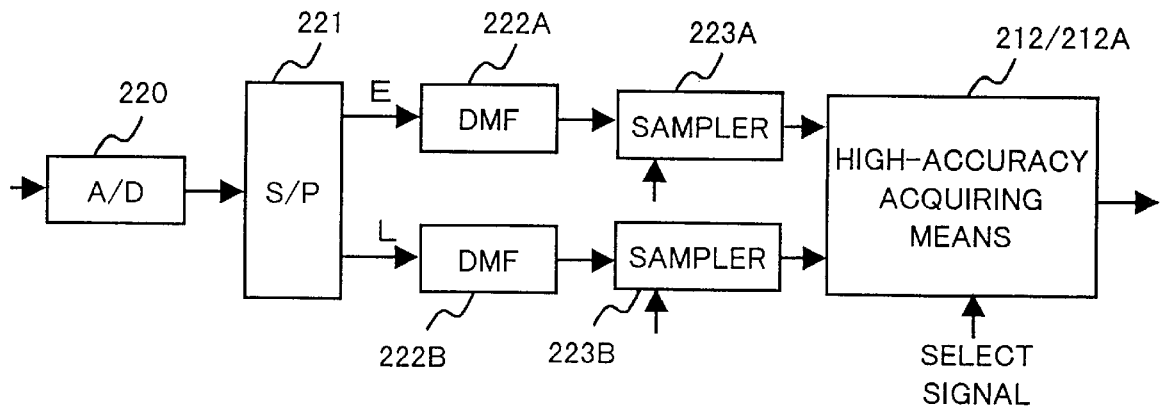
FIG. 4 is a block diagram showing construction of symbol demodulator comprising digital matched filters, according to this invention.
Figure 35:
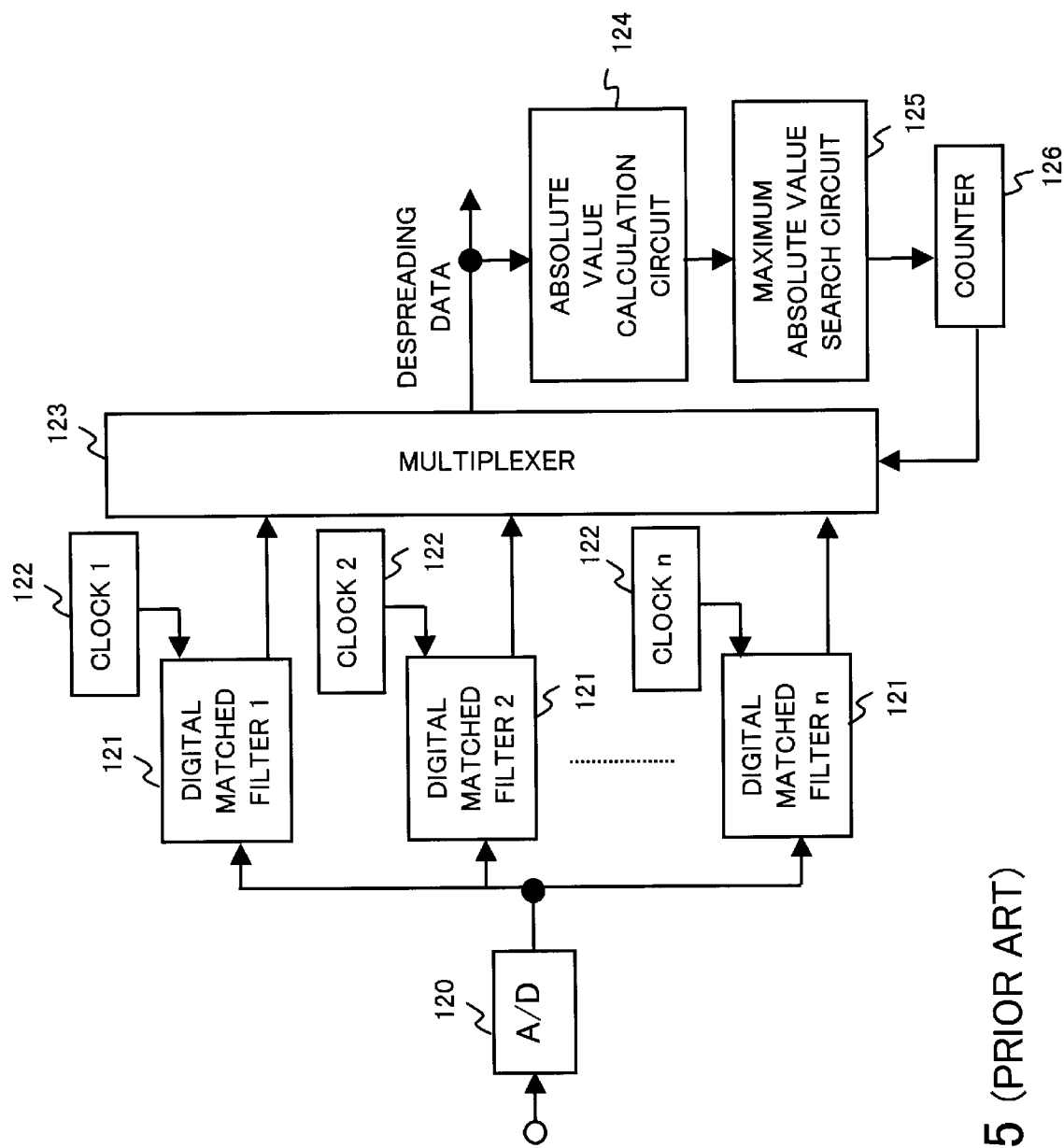
FIG. 35 is a block diagram showing a conventional construction for realizing a high-accuracy timing of a matched filter by paralleled-arrangement of digital matched filters.

FIG. 4, which corresponds to the construction shown in FIG. 35, shows one of the embodiments of a symbol demodulator utilizing digital matched filters, according to this invention. In FIG. 35, if the number of the digital matched filters (DMF) is 4, received signals input at a rate of oversampled-by-four are sent to four DMFs by the clocks with different timing phases and each DMF is operated at the chip rate. In the demodulator of FIG. 4, DMFs 222A and 222B are respectively operated at the chip rate, which are shifted in timing by [½] Tc for signals input at a rate of oversampled-by-two.

More precisely, A/D converter 220 converts a received base-band signal into a digital signal at double the chip-rate, then the digital signal is divided into two samples by a serial/parallel converter 221, which are relatively phase-shifted by [½] chip at the chip rate. These samples are respectively input to the DMFs 222A and 222B, and each of the DMFs outputs one correlation value at every chip. Among correlation values, only a correlation value at a sampling timing which corresponds to a neighboring data timing is extracted by samplers 223A and 223B. Outputs from these samplers 223A and 223B are input into the high-accuracy acquiring unit 212 or 212A.

Upon reception of a selection signal, the high accuracy acquiring unit 212 or 212A selects and outputs a correlation value whose timing accuracy has been improved to an oversampled-by-four accuracy. In this embodiment, $G_A$ is used as a correction coefficient to improve amplitude accuracy. Therefore, it is possible, at a maximum rate of oversampled-by-two, to obtain a correlation value with an oversampled-by-four accuracy from two systems of the DMFs which are operated at the chip rate.

Compared with FIG. 35, both circuit scale and power dissipation of the demodulator as shown in FIG. 4 can be reduced to a large extent. The demodulator of FIG. 4 is the same as the construction shown in FIG. 23 in their circuit scales, however, the DMFs of FIG. 4 are operated at a rate (a chip rate) half of that in FIG. 23. Furthermore, the demodulator of FIG. 4 can obtain a received correlation value with a highly-accurate timing, i.e., an oversampled-by-four accuracy, while FIG. 23 simply gives an oversampled-by-two accuracy.

Fourth Embodiment

Figure 5:
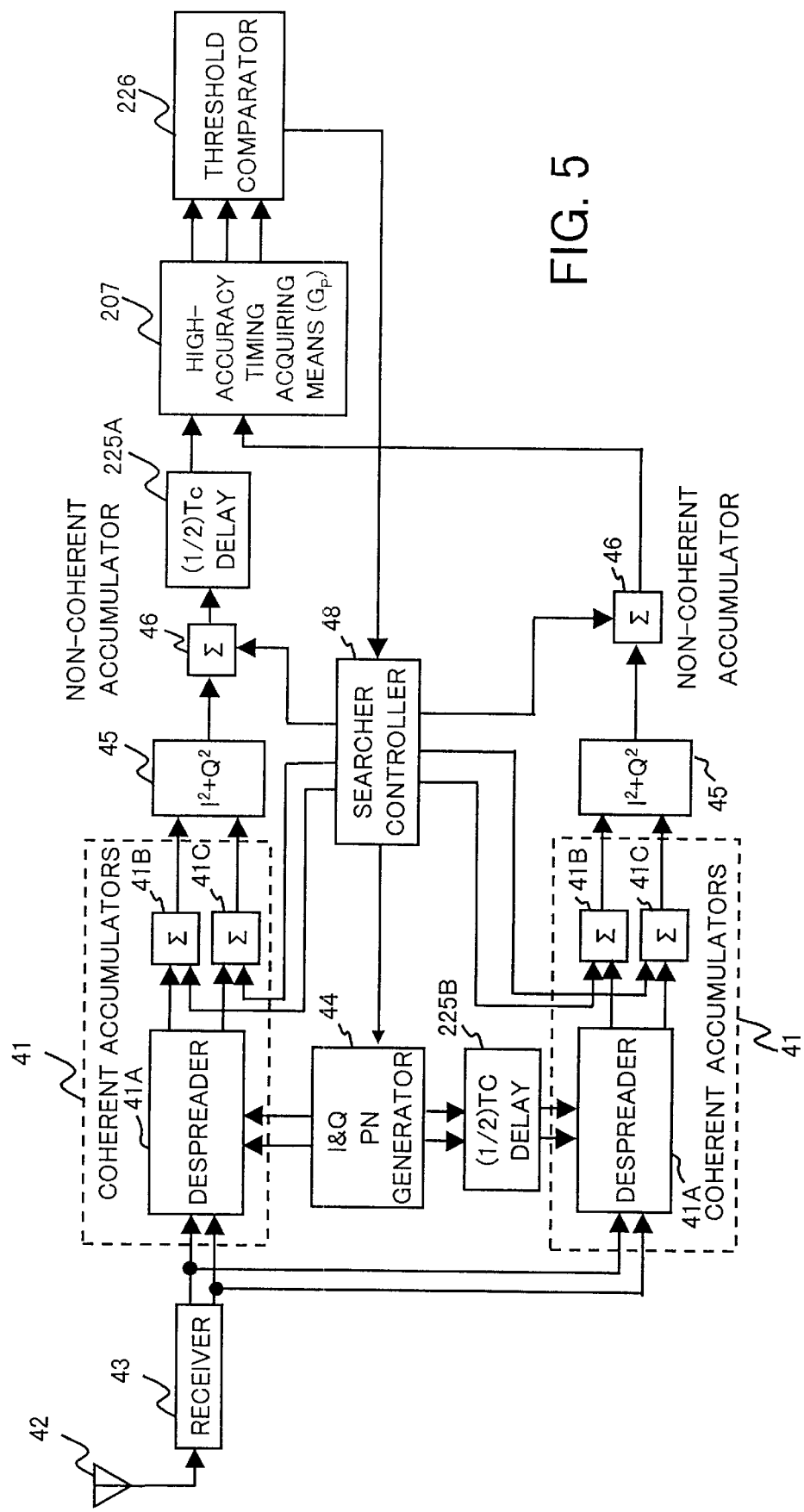
FIG. 5 is a block diagram showing construction of a synchronization-acquisition unit comprising sliding correlators, according to this invention.
Figure 21:
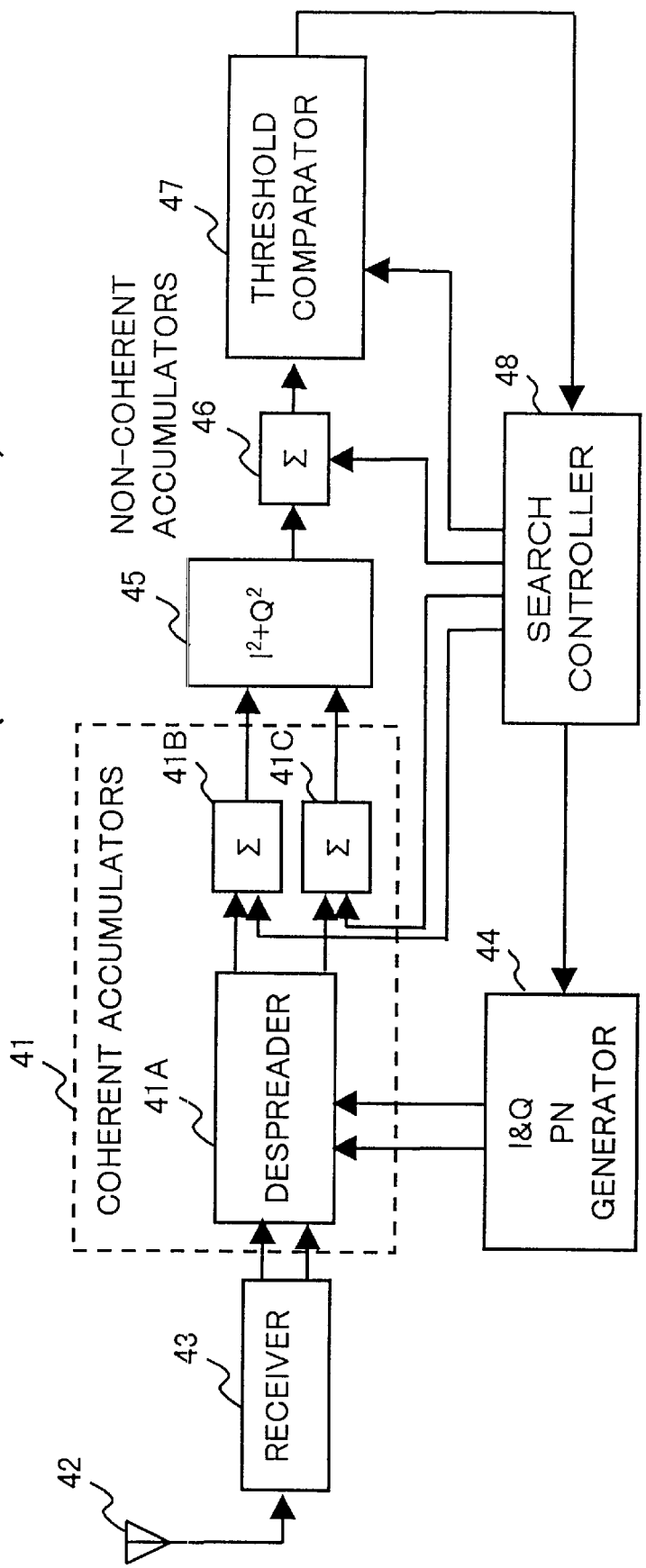
FIG. 21 is a block diagram showing configuration of a conventional synchronization-acquisition unit comprising a sliding correlator.
Figure 31:
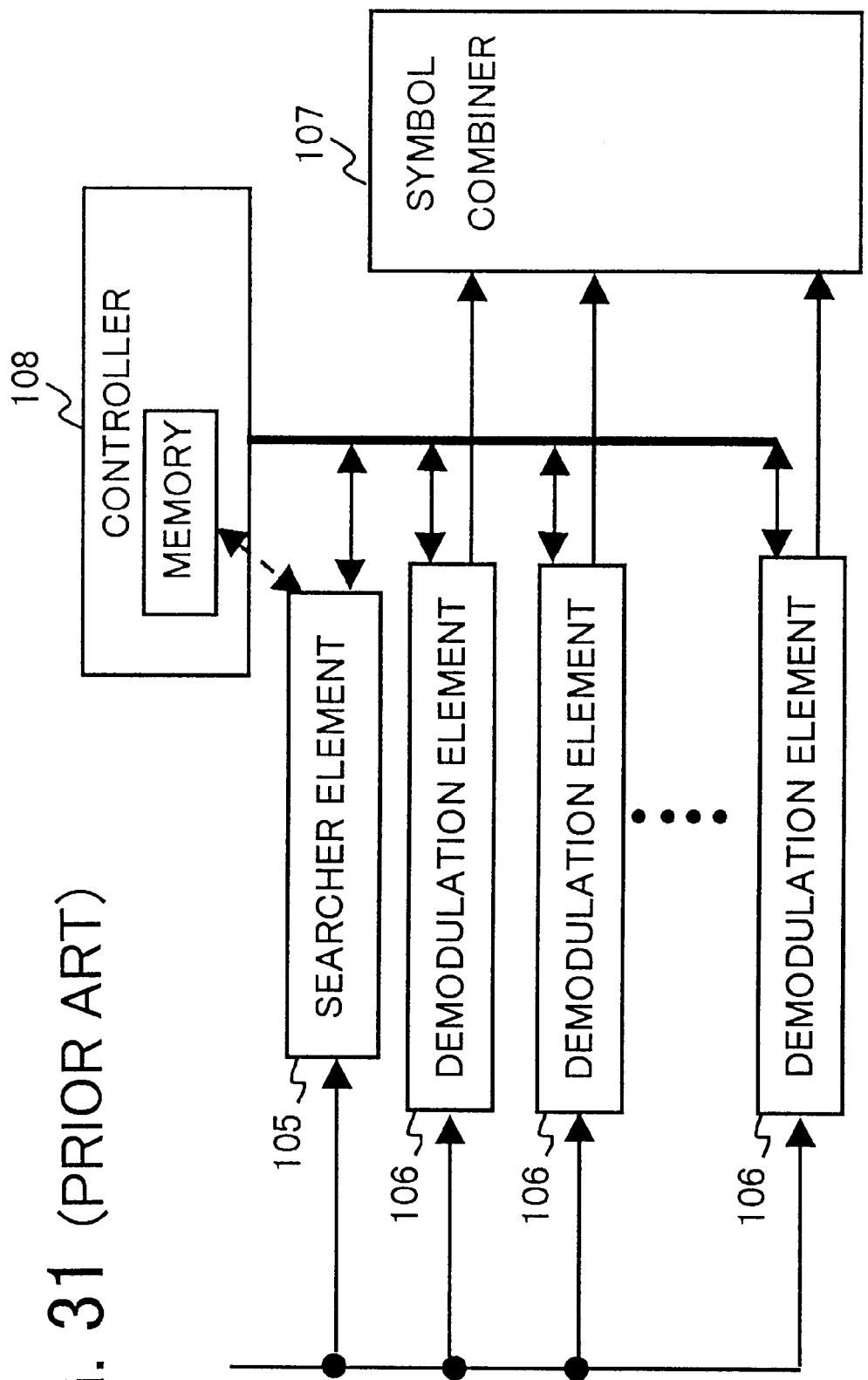
FIG. 31 is a block diagram showing a conventional RAKE receiver.

FIG. 5 shows one of the embodiments of a synchronization-acquisition unit or a searcher unit using sliding correlators, according to the present invention, which correspond to the searcher unit of FIG. 21 or FIG. 31 (the same reference numerals are used to denote the same parts in these FIGS). In FIG. 21, the searcher unit has only one system of sliding correlator; however, there are two systems of sliding correlators in this embodiment. Accordingly, in this embodiment, comparison is made as if there are two systems of correlators in FIG. 21, so as to equalize circuit scale and performance conditions. Effects achieved by this invention are also explained below.

In FIG. 5, despreaders 41A, digital integrators (Coherent Accumulators) 41B and 41C, square-sum calculators 45 and averaging unit (Non-Coherent Accumulators) 46 operate in the same way as those shown in FIG. 21. As explained above with reference to FIG. 21, for shortening the acquisition time and for improving acquisition performance by using two systems of correlator, it is preferable that a difference of the timing between those systems should be [½] Tc. FIG. 5 also shows such a case with [½] Tc.

Arrangement of the searcher as shown in FIG. 5 differs from the searcher shown in FIG. 21 adopting two systems of correlators in its operation. In FIG. 5, the average correlation power with an oversampled-by-four accuracy is obtained by a high-accuracy-timing acquiring unit 207 and then compared with a threshold level. For the leading system that operates fast in terms of timing, a delay circuit 225 having a [½] Tc delay is provided, so that the timing for obtaining the average correlation power is adjusted to the other system whose timing is slow. The unit 207 outputs the average correlation power with an oversampled-by-four accuracy as described above, and synchronization detection is performed while comparing the average correlation power against a threshold with comparator 226. Though the high-accuracy-timing acquiring unit 207 has the same construction as that shown in FIG. 2, the unit of FIG. deals with correlation power, which requires $G_P$ as a correction coefficient corresponding to the power.

By adopting these correlators which correspond to those having a timing accuracy of oversampled-by-two, it is capable of performing a synchronization-acquisition detection with a timing accuracy of oversampled-by-four, thus mitigating effects caused by deterioration of a signal-to-noise ratio due to a timing error and improving acquisition performance. The high-accuracy-timing acquiring unit 207 processes the average correlation power obtained with an oversampled-by-two accuracy, which requires exceptionally fewer calculations than processing data obtained with an oversampled-by-four accuracy.

With this arrangement, it is also possible to improve the synchronization-acquisition timing, thus shortening the initial pull-in time by the synchronization tracking unit when the processing is transferred to a synchronization tracking operation and improving synchronization tracking performance.

In particular, in a multi-path fading environment in which the level of a received signal changes frequently, improvement in signal-detection performance and a shortening of the pull-in time are very effective for maintaining a synchronism, i.e., for lowering probability of occurrence of a pull-out in synchronization, as a unit of detecting a signal for a RAKE reception.

The embodiment shown in FIG. 5 includes two systems of correlators corresponding to those shown in FIG. 21. However, even when only one system of correlator is provided in the embodiment, the same effect as that shown in FIG. 21 can be achieved. This results from the following reasons. In a case where there is one system of correlator, the timing assumed when doing a synchronization-acquisition detection, is changed at the interval of [½] Tc. In the embodiment shown in FIG. 5, a similar interval can be applied, and at the stage that each average correlation power is obtained, the high-accuracy-timing acquiring unit 207 can estimate average correlation power from average correlation power at adjacent timings at the midpoint of these adjacent timings.

Fifth Embodiment

Figure 6:
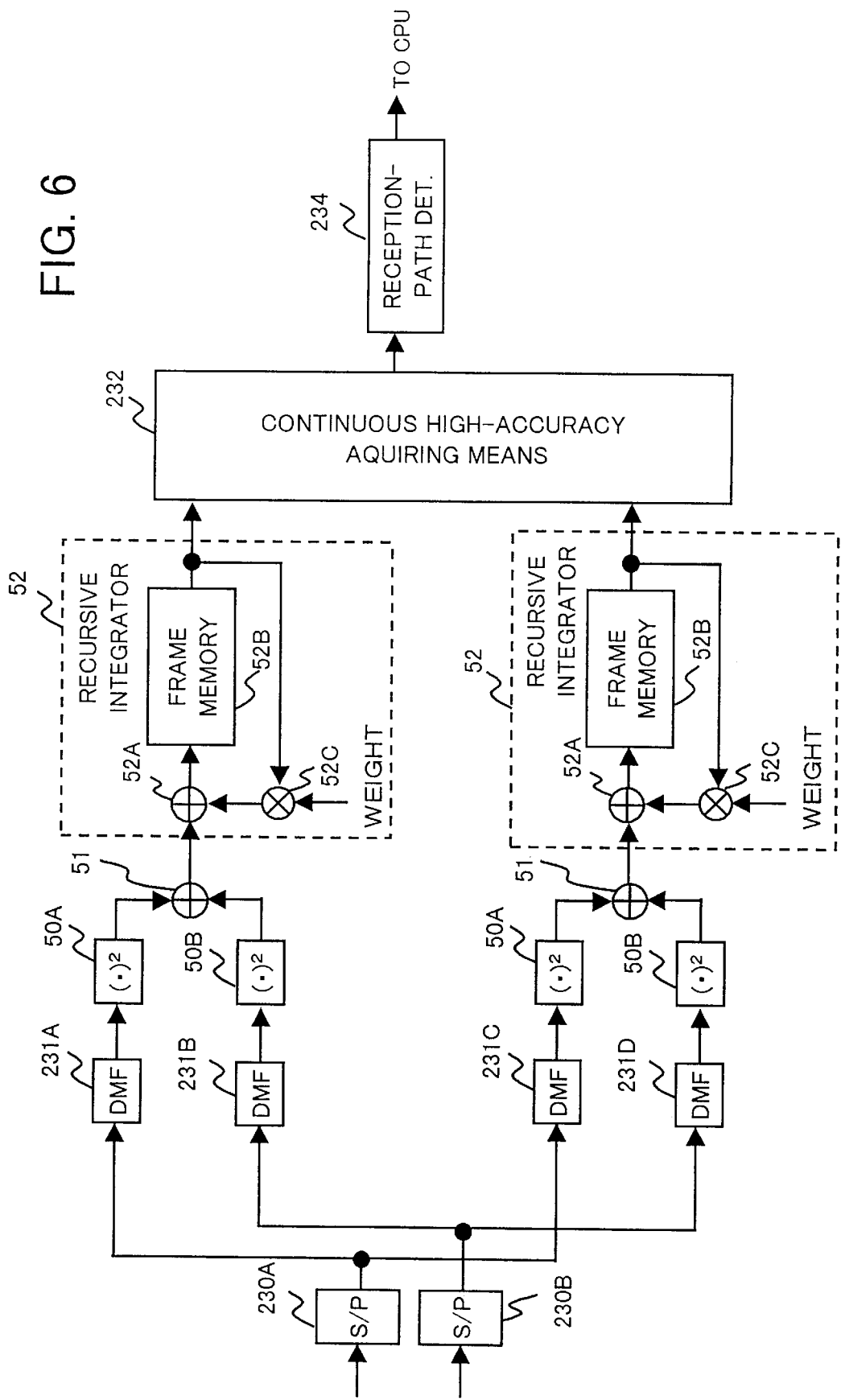
FIG. 6 is a block diagram showing construction of a synchronization-acquisition unit comprising digital matched filters, according to this invention.
Figure 22:
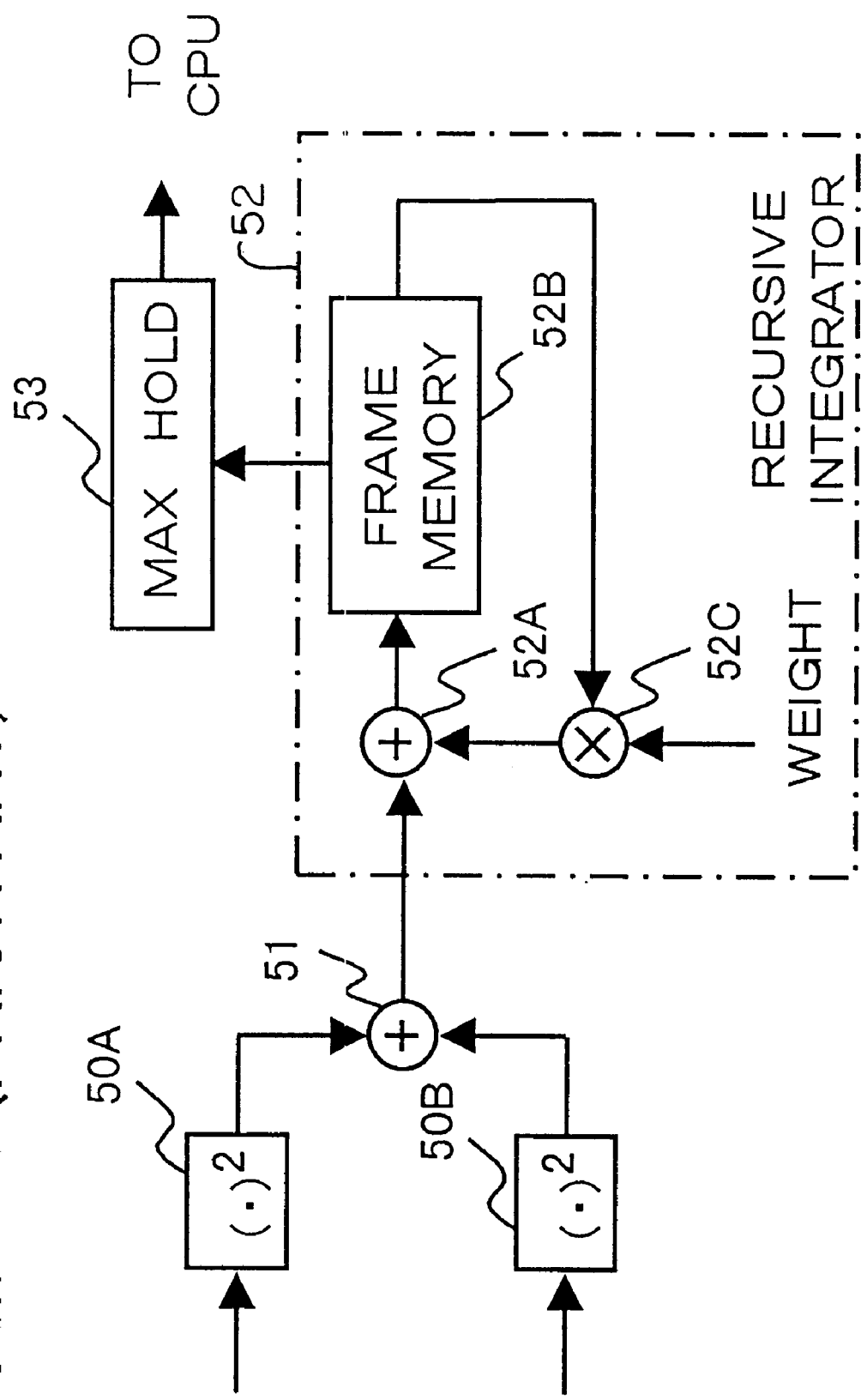
FIG. 22 is a block diagram showing configuration of a conventional synchronization-acquisition unit related to a digital matched filter.

FIG. 6 shows one of the embodiments of a synchronization-acquiring unit or a searcher unit using DMFs, according to this invention, which corresponds to the configuration shown in FIG. 22 (the same reference numerals are used to denote the same parts in these FIGS).

Figure 23:
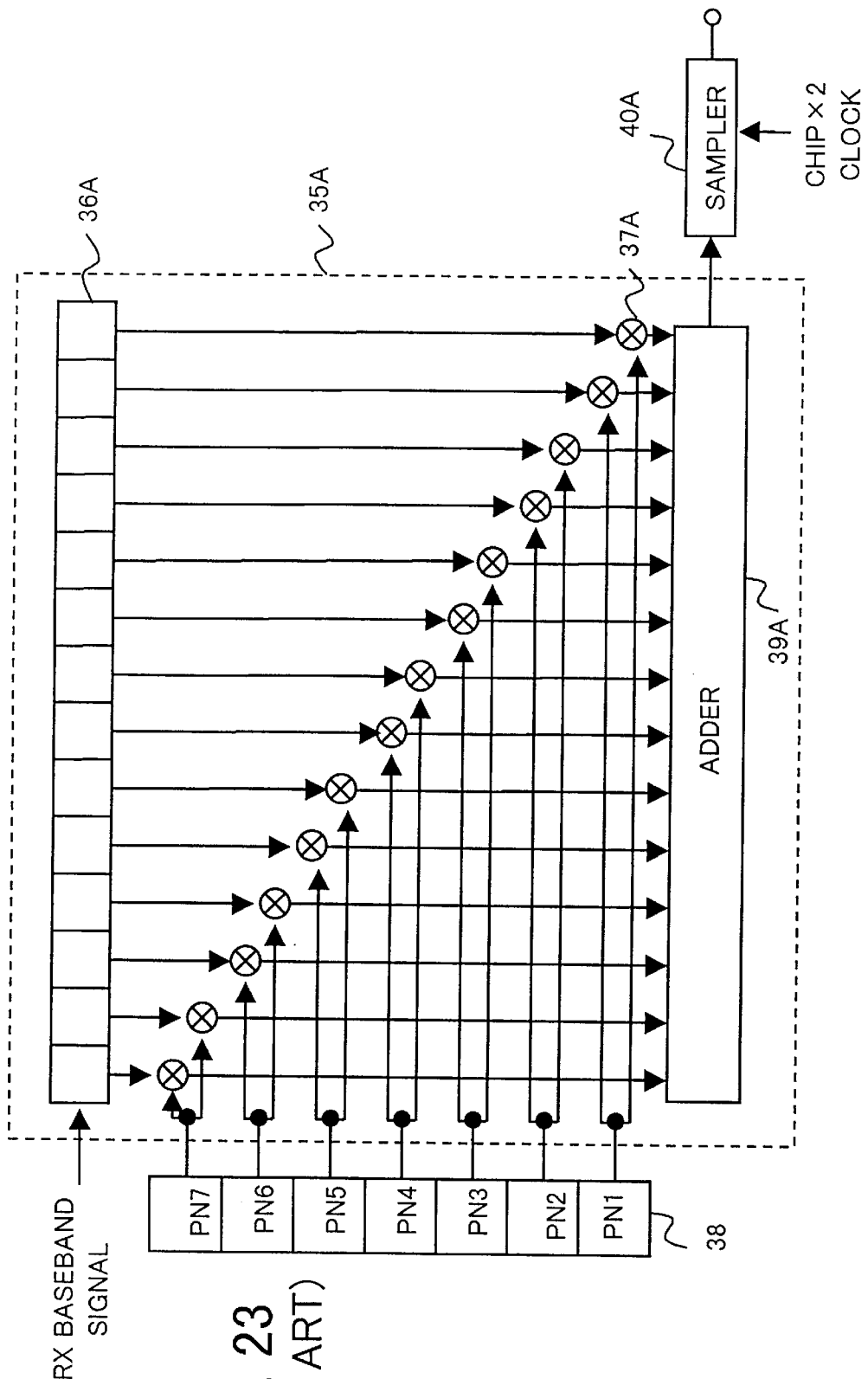
FIG. 23 is a block diagram showing configuration of a conventional digital matched filter with a oversampled-by-two.
Figure 25:
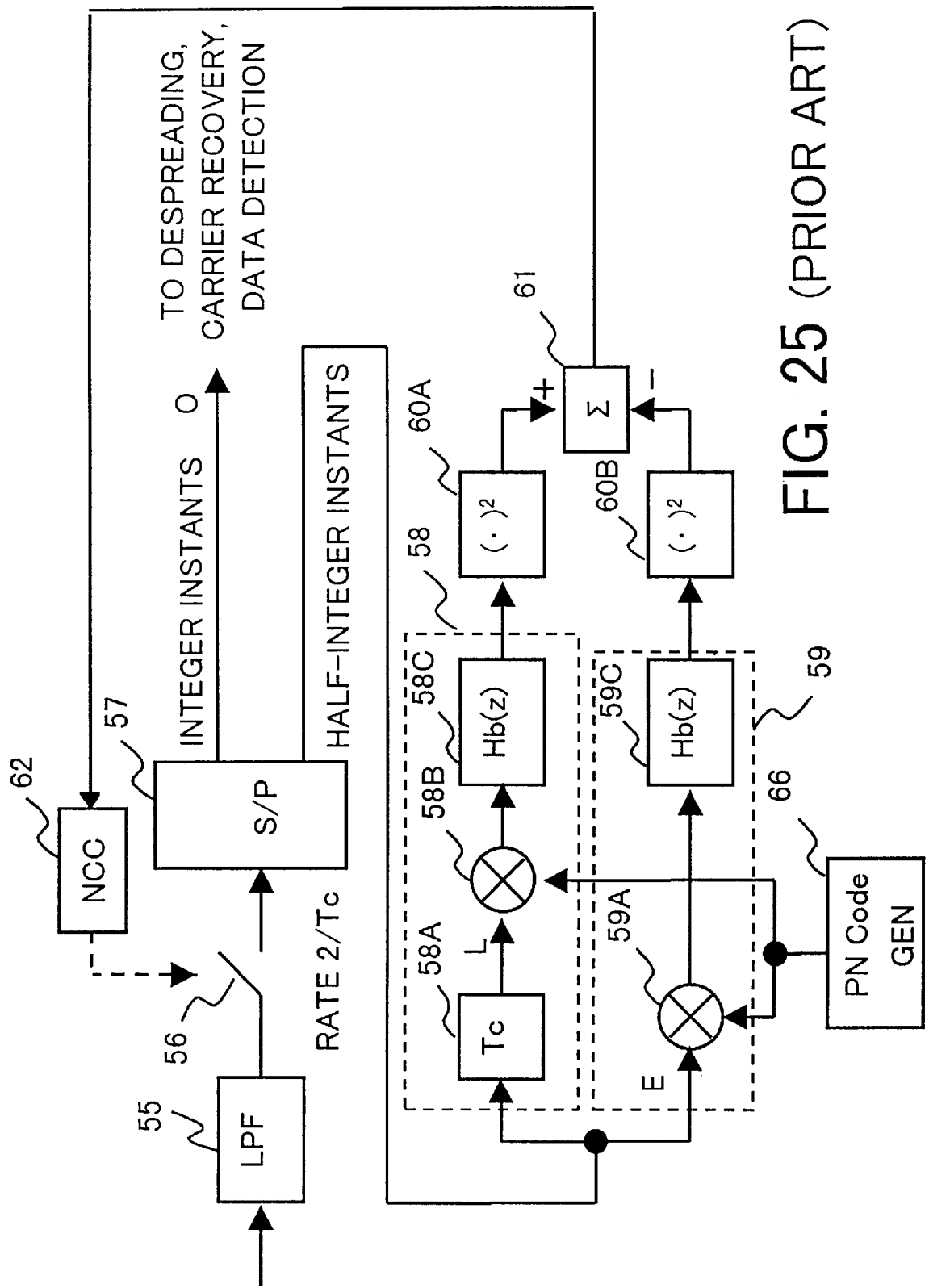
FIG. 25 is a block diagram showing configuration of a conventional symbol demodulator and synchronization tracking unit comprising a sliding correlator.

The synchronization-acquiring unit of FIG. 22 calculates correlation of a received signal (which is input with an oversampled-by-two accuracy as shown in FIG. 23) with the pseudo-noise code by repeating the same code twice. This unit uses one system of digital matched filter which outputs a correlation value with an oversampled-by-two accuracy, and then performs a synchronization-acquisition detection in accordance with addition results of correlation power obtained at positions which are effectively adjacent each other.

On the other hand, in order to estimate correlation power at the midpoint between adjacent points where samples are provided, by using directly obtained correlation power, this invention has basically a two-system-DMF configuration. In that configuration, timings of oversampled-by-two signals are shifted by serial/parallel converters by a [½] chip with one another so as for the reception samples having a chip rate to be processed.

In FIG. 6, an in-phase-axis signal and an orthogonal-axis signal on which quasisynchronous detection has been performed, are input to serial/parallel converters 230A and 230B at an oversampled-by-two rate, where the signals are divided into two kinds of signals having the chip rate and their timings are shifted by [½] Tc with respect to each other. Correlators 231A and 231B perform a correlation operation on even samples at the chip rate, then correlation power is output in every chip unit through squarers 50A and 50B and an adder 51. Similarly, correlation power associated with odd samples is output in every chip unit via correlators 231C and 231D. An averaging operation is performed on each correlation power in averaging units 52 by using a recursive addition, and the average correlation power at a chip interval is stored in frame memories 52B. Continuous high-accuracy acquiring unit 232 causes the average correlation power to have an oversampled-by-two accuracy, thus outputting average correlation power with a timing accuracy of oversampled-by-four, by using amplification or an addition operation. Reception-path detection unit 234 implements a reception-path detection and the detection result is sent to a control unit (Central Processing Unit). Note that a correction coefficient for the continuous high-accuracy acquiring unit 232 is $G_P$, because the unit deals with correlation power.

Figure 7:
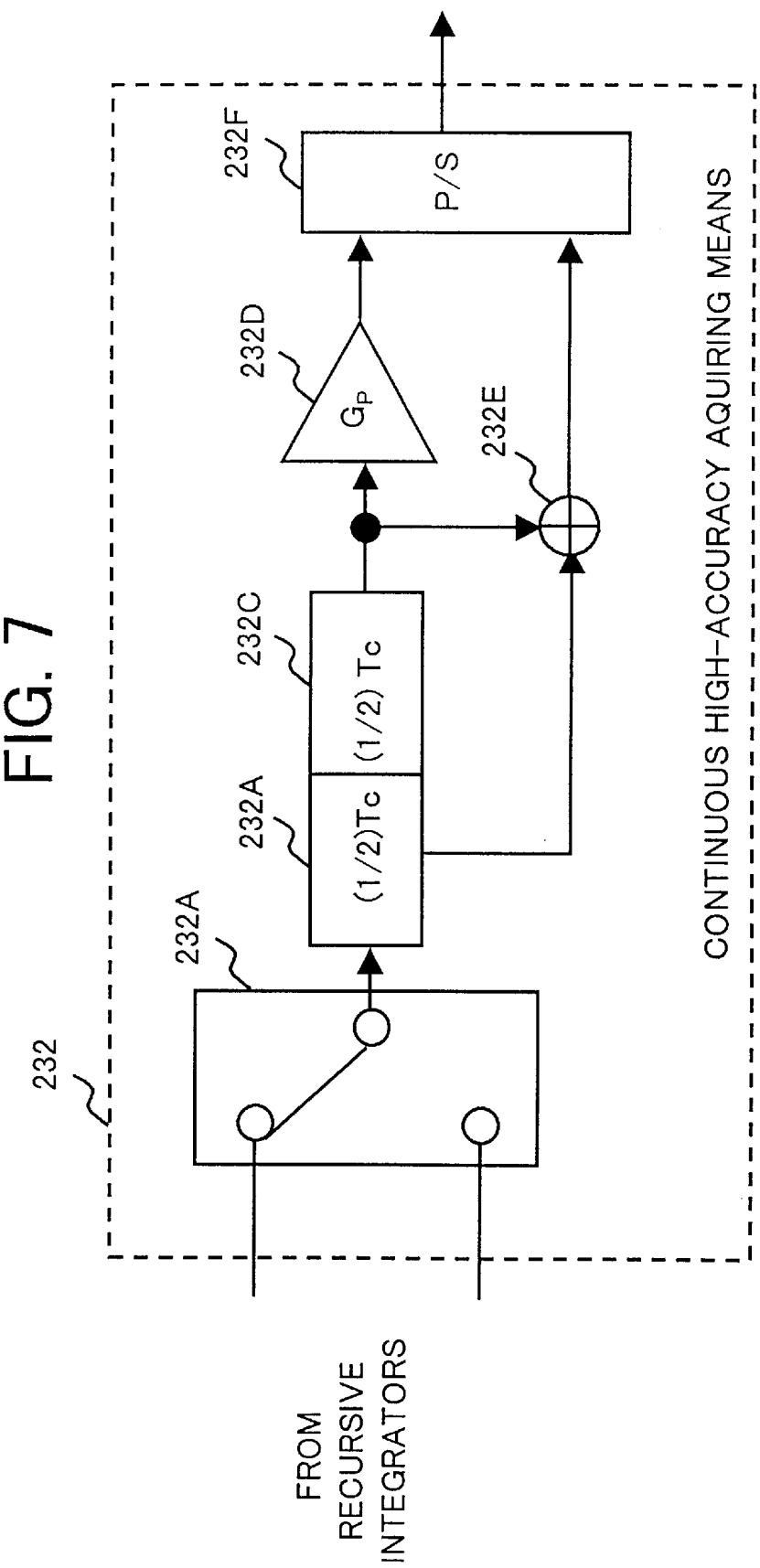
FIG. 7 is a block diagram showing construction of a continuous high-accuracy acquiring unit, according to this invention.

FIG. 7 shows in detail construction of the continuous high-accuracy acquiring unit 232 of FIG. 6. The averaging units 52 respectively input average correlation power to the unit 620 of FIG. 7 in chip unit. Accordingly, if a switch 232A is changed over at a rate twice as fast as the chip rate, the outputs from the averaging units 52 can be input alternately. At the output of the switch, average correlation power with a timing accuracy of oversampled-by-two is provided. If the unit 620 has no additional configuration, it provides essentially the same performance as one shown in FIG. 22. However, the unit 620 continuously outputs average correlation power with a timing accuracy of oversampled-by-four with the help of construction following after the delay circuit 232B.

Delay circuits 232B and 232C are connected to an amplifier 232D and an adder 232E as shown in FIG. 7, and the amplifier 232D amplifies output (average correlation power) of the delay circuit 232C all the time, thus outputting the amplified result to a parallel/serial converter 232F. At the same time, the adder 232E continuously sums the output (average correlation power) of the delay circuit 232B and the output (average correlation power) of the delay circuit 232C, then outputs the added result to the converter 232F. If the converter 232F outputs the amplified result and added result alternately at four-times the rate of the chip clock, the amplified average correlation power and average correlation power at the midpoint which has been estimated by the addition result are output continuously in time. Thus, the average correlation power is output with a timing accuracy of oversampled-by-four.

In the continuous high-accuracy acquiring unit of FIG. 7, the process of acquiring a high accuracy which is performed on the average correlation power requires extremely fewer calculations than obtaining correlation power with an oversampled-by-four accuracy from the beginning of the processing. Furthermore, since processing which follows the processing with an oversampled-by-four accuracy is equal to the rate at which the averaging units perform an output processing, i.e., once every time a recursive integration is performed, both the amount of operation and its rate become small. Accordingly, the increase in the amount of the above-mentioned operation is also small compared with the amount of processing executed by the overall construction of FIG. 6.

With the construction of FIG. 6, it is possible to perform a synchronization acquisition with a timing accuracy of oversampled-by-four, while maintaining substantially the same amount of operation and a hardware scale required when acquiring an oversampled-by-two accuracy. In that case, similar to the synchronization-acquisition unit comprising sliding correlators as shown in FIG. 5, it is also possible to lower probability of occurrence of a pull-out in synchronization owing to improvement of synchronization acquisition performance by an enhanced timing accuracy and to a shorten the pull-in time entailed by a transition from synchronization acquisition to synchronization tracking.

Sixth Embodiment

Figure 8:
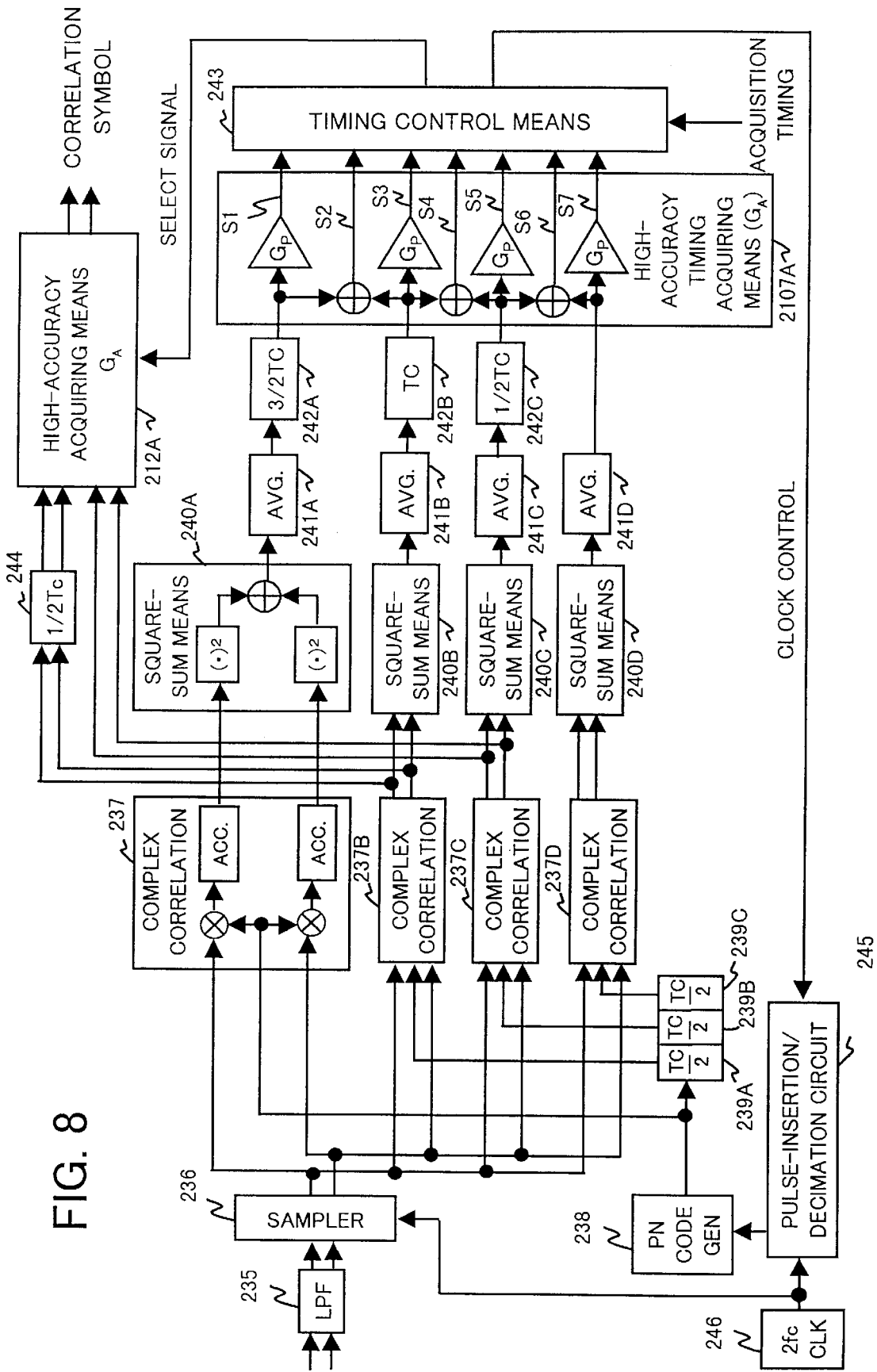
FIG. 8 is a block diagram showing construction of a synchronization tracking unit and a symbol demodulator for RAKE receiving, using sliding correlators, according to this invention.
Figure 9:
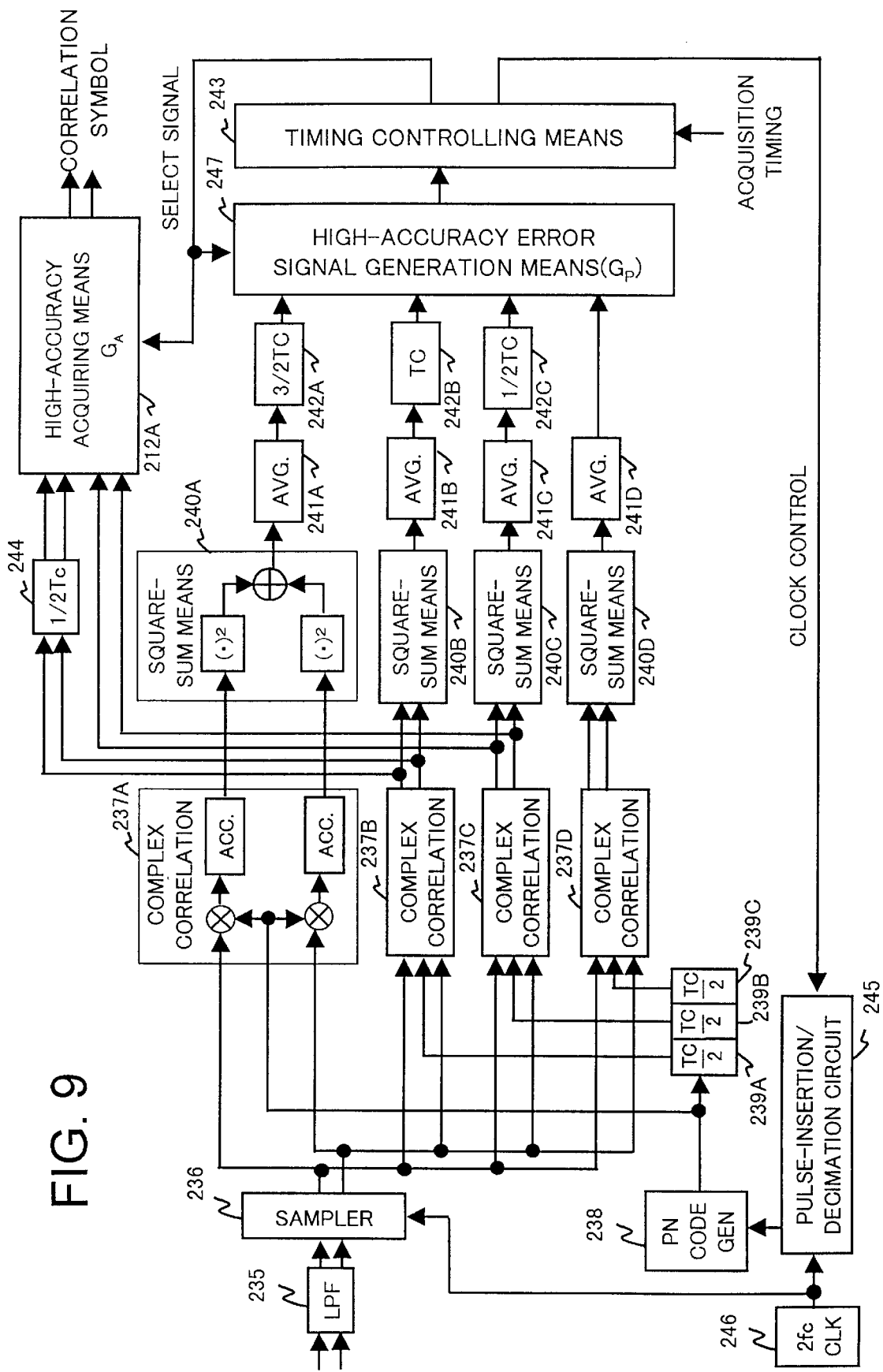
FIG. 9 is a block diagram showing another construction of a symbol demodulation unit and a synchronization tracking unit of RAKE reception, comprising sliding correlators according to this invention.

FIGS. 8 and 9 show a synchronization tracking unit and a symbol demodulator using sliding correlators, according to an embodiment of this invention. Both FIG. 8 and FIG. 9 illustrate a case in which a symbol demodulation and a synchronization tracking are performed on a signal obtained by spread-modulating a BPSK information symbol by a BPSK. The symbol demodulator shown in FIG. 2 requires two systems of correlator, which originally needed one system, to acquire a high accuracy. However, as explained above, the redundant system is shared by a synchronization tracking unit. FIGS. 8 and 9 illustrate the possibility of sharing with a synchronization-tracking unit, and realize a synchronization-tracking characteristic with an oversampled-by-four accuracy from a correlation value with an oversampledby-two accuracy.

In FIG. 8, a received base-band signal on which quasi-synchronous detection has been performed is waveform-shaped by a waveform-shaping filter (LPF) 235, and the waveform-shaped signal is sampled by a sampler 236 by a free-running clock having a rate twice as fast as the chip clock (fc). The sampled signals received are divided into four parts to be input to complex correlators 237A to 237D. In case of a signal which is dealt with by the construction in FIG. 8, complex correlators are a type of correlator in which a received in-phase axis signal and a received orthogonal-axis signal are respectively multiplied by the same pseudo-noise code, and the result is integrated throughout a symbol interval. At the same time, pseudo-noise codes generated by a pseudo-noise code generator 238 are input to the complex correlators 237A to 237D.

Note that each of the pseudo-noise codes is delayed by a different delay time by delay circuits 239A to 239C. The delayed codes are input to the correlators 237A to 237D, in the order from the code with a short delay time to the one with a long delay time. The delay time has a delay time of [½] Tc. Outputs from these four complex correlators 237A to 237D are respectively square-summed in square-sum unit 240A to 240D to produce correlation power, then averaging unit 241A to 241D averages the power in order to mitigate the effects of noise.

Furthermore, since an integration timing of the complex correlators 237A to 237D depends upon input pseudo-noise code, input timings of four systems of the average correlation power for a high-accuracy-timing acquiring unit 207A are adjusted to coincide with each other by delay circuits 242A to 242C, so as to absorb these time differences. The high-accuracy-timing acquiring unit 207A then outputs a correlation value which corresponds to a timing accuracy changed from an oversampled-by-two to an oversampled-by-four accuracy. The high-accuracy-timing acquiring unit 207A has the same construction as the high-accuracy-timing acquiring unit 207 of FIG. 2, although they differ in the number of inputs and outputs. With respect to a correction coefficient, $G_P$ associated with power is used in order to deal with correlation power.

The output of the high-accuracy-timing acquiring unit 207A is fed to a timing control unit 243 where the timing is controlled. In the case of acquiring synchronization, the timing control unit 243 initializes itself so that one of the correlation values associated with the timings (0, ½(Tc), Tc, 3⁄2(Tc)) in the delay circuits 242A to 242C takes the greatest value, in dependence upon a synchronization-acquisition timing given by a controller. After the initialization, the timing control unit 243 performs a timing control for the maximum correlation value to be contained in one of the delay circuits 242A to 242C. Note that a clock which drives pseudo-noise code has a rate twice as high as the chip rate; therefore, the timing control unit 243 performs the clock operation every [½] Tc. The remaining precise control is implemented by changing over to amplifier outputs (S1, S3, S5, S7) or adder outputs (S2, S4, S6) of the unit 207A, which will give the greatest correlation value in the symbol demodulation.

In FIG. 8, a symbol demodulator comprises a delay circuit 244 and a high-accuracy acquiring unit 212A. The unit 212A receives outputs from the complex correlators 237B and 237C, though one of these outputs (the output from the complex correlator 237B) is delayed by the circuit 244. Note that the symbol demodulator (not shown in FIG. 8) accomplishes symbol demodulation by applying a phase compensation to the correlation symbol which is an output of the unit 212A. The unit 212A has the same construction as that shown in FIG. 2, however, inputs and outputs of the unit 212A are complex signals (an in-phase-axis signal and an orthogonal-axis signal), and the same operation is performed on each of these signals. The unit 212A selects and outputs a correlation symbol having a high timing accuracy, according to a selection signal given by the timing control unit 243.

A case where an output giving the maximum correlation value is shifting in the order of S1, S2, ... S6, S7, will be explained below. When there is a transition of the maximum correlation value from S3 to S4, the high-accuracy acquiring unit 212A is given an instruction to change the maximum correlation value to be output, from an output of the correlator 237B to an output obtained by adding outputs of the correlators 237B and 237C. When there is a shift from S4 to S5, the unit 212A instructs a selection of an amplified output of the correlator 237C. In case of a shift from S5 to S6, the timing control unit 243 controls the timing by giving an instruction to a pulse-insertion/decimation circuit 245 to perform a pulse decimation, so that the output S4 shows the maximum value. The timing control unit also instructs the unit 212A to select addition result of the outputs of the correlators 237B and 237C.

By doing such a control, it is possible to obtain demodulation characteristic and synchronization-tracking characteristic of oversampled-by-four while using a circuit which operates with a timing accuracy of oversampled-by-two. It is also possible to realize low power dissipation. Outputs S1 and S7 in FIG. 8 are not actually used for control; therefore, these outputs may be omitted. However, these outputs can be used for a surveillance to prevent plural demodulators from simultaneously receiving a reception signal having the same timing, when demodulation timings of plural symbol demodulators are close with each other in a RAKE reception. Under the above-mentioned circumstances, correlation characteristic may, in many cases, not be symmetric. In such a case, DLL construction does not guarantee the correct reception timing. Accordingly, operation of tracking the maximum value according to this embodiment provides a stable demodulation characteristic.

The construction shown in FIG. 9, which is similar to that shown in FIG. 8 (the same numerals are used to denote the same parts in FIGS. 8 and 9), does not directly keep track of the timing for obtaining the maximum value, but it is based upon construction for achieving a synchronization tracking by DLL. The DLL has the problem which has been pointed out with reference to FIG. 8; however, it is expected to avoid that problem to a certain degree by using the signal search result of a searcher unit. The construction of FIG. 9 therefore simplifies the apparatus, compared with FIG. 8.

Figure 11:
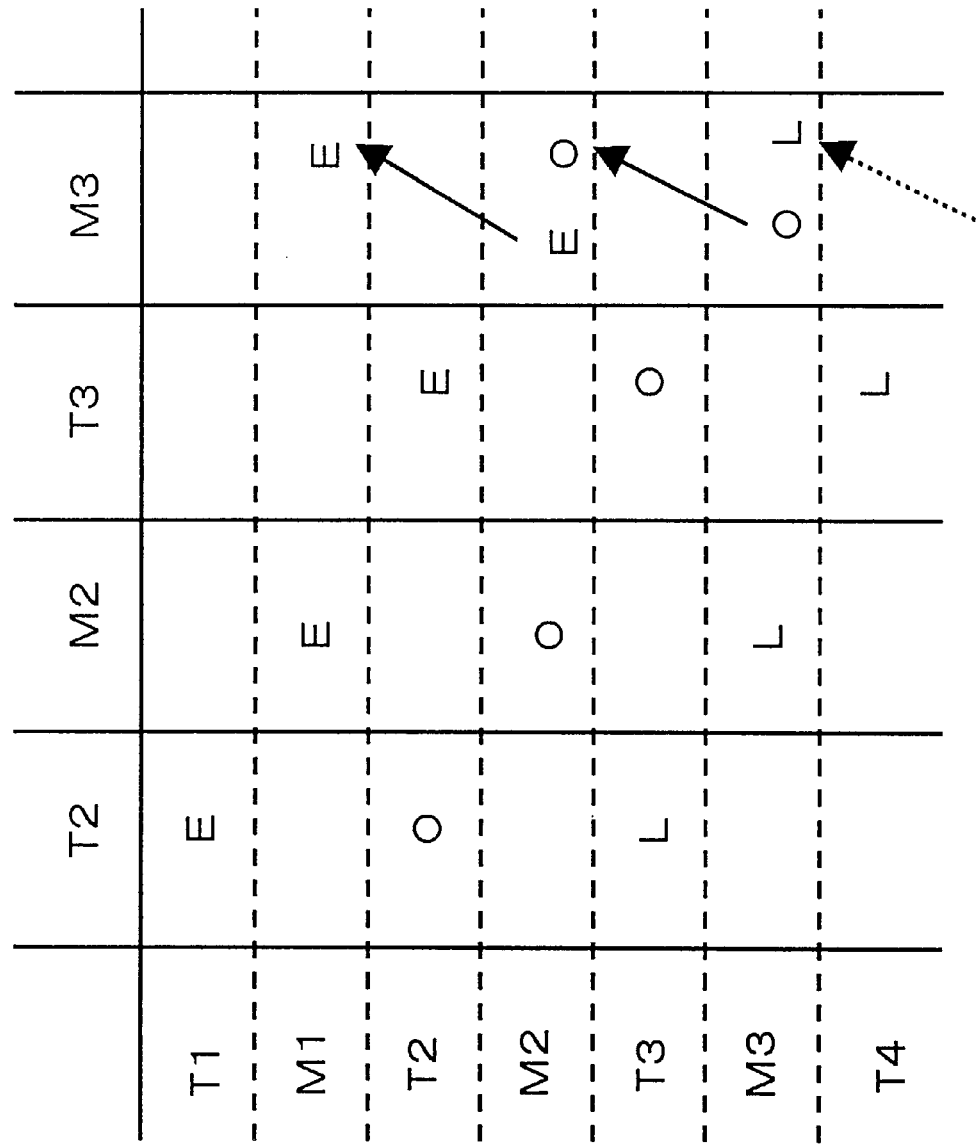
FIG. 11 is a diagram describing operation of a high-accuracy error-signal generating unit and a timing control unit, according to this invention.
Figure 27A:
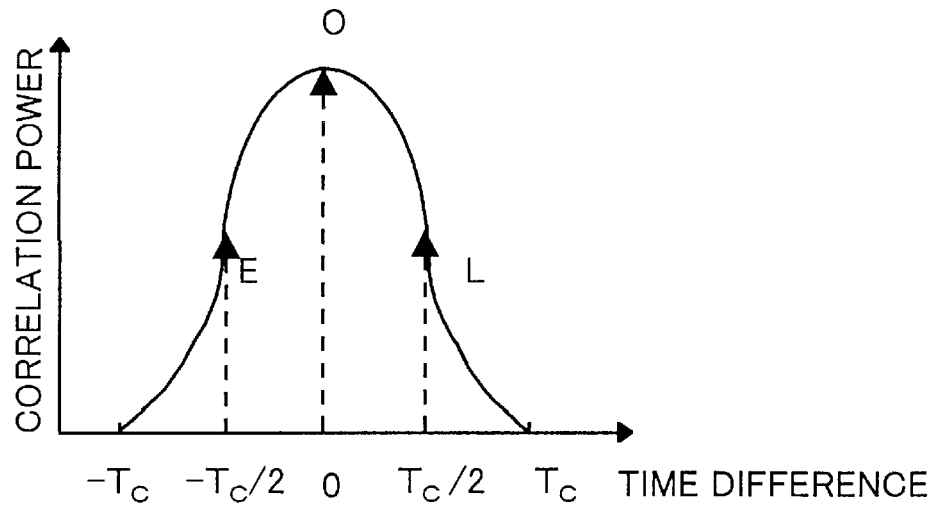
FIGS. 27A and 27B show characteristic curves illustrating a relationship between a sample timing and correlation power, and a relationship between a sample error and an error signal, used in a synchronization tracking unit.
Figure 27B:
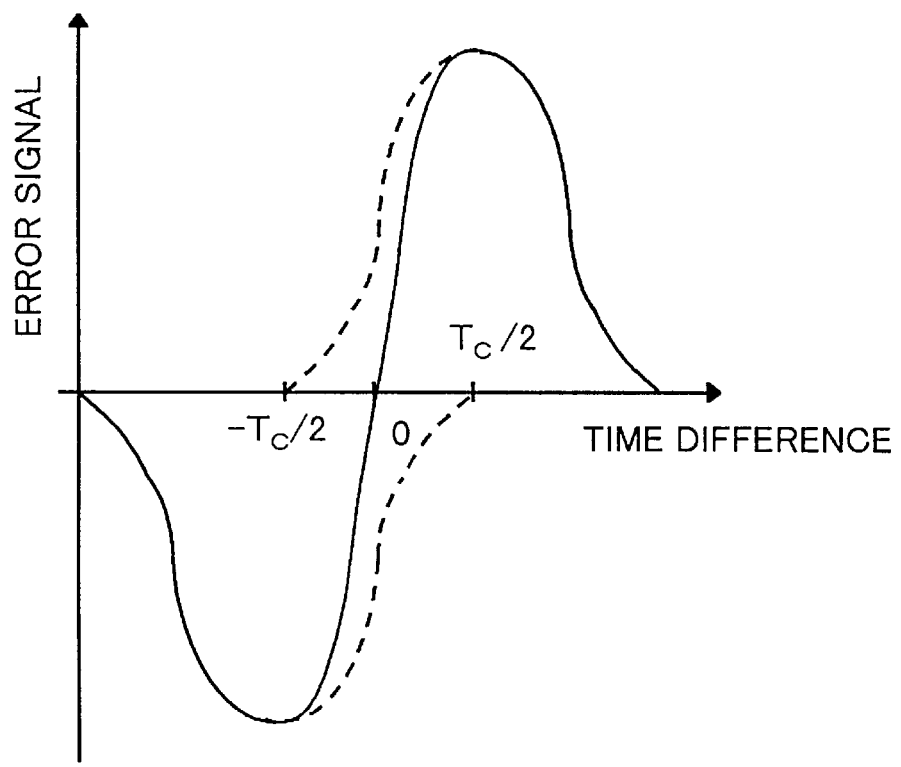
Figure 28:
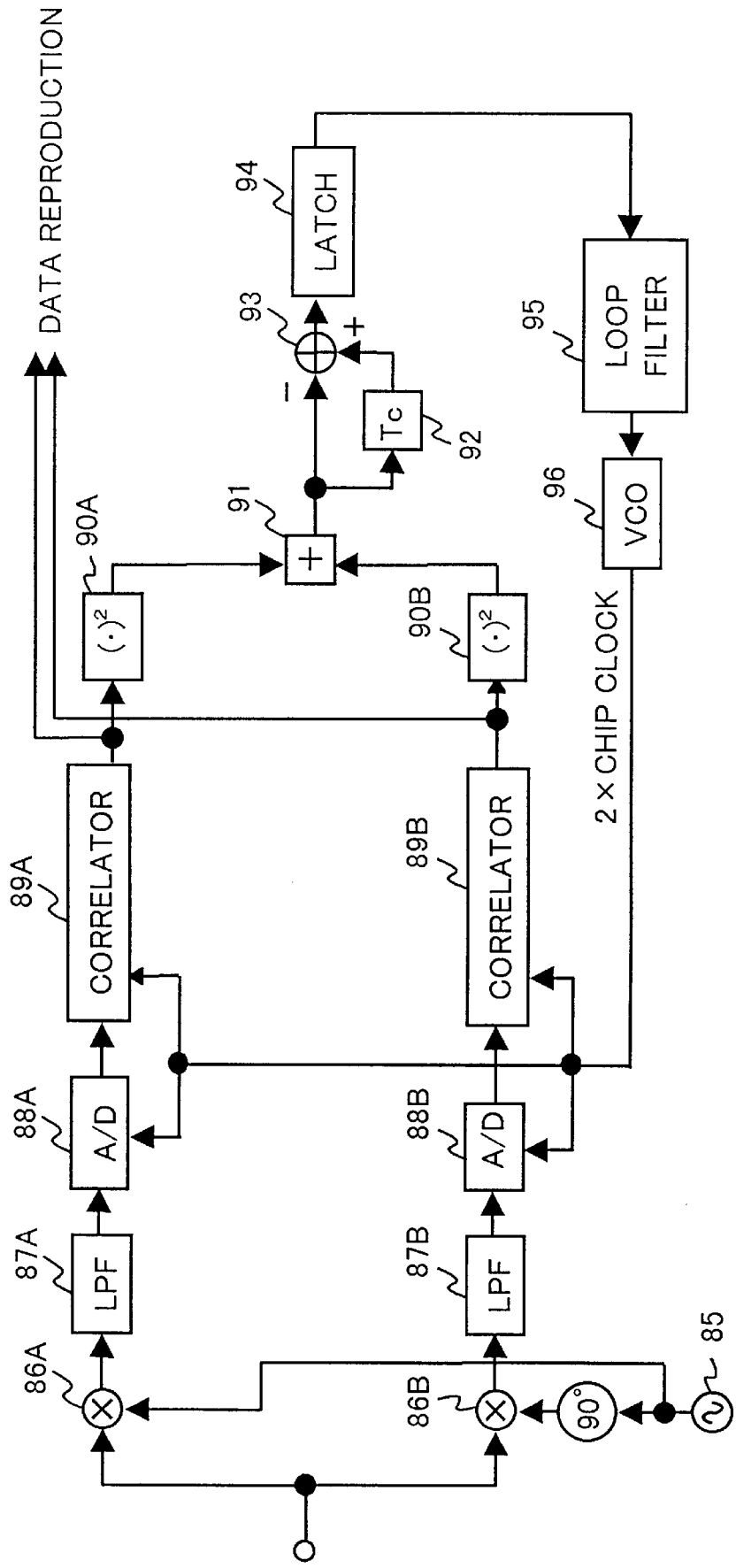
FIG. 28 is a block diagram showing a conventional symbol demodulator and a timing-tracking unit using a digital matched filter.
Figure 29:
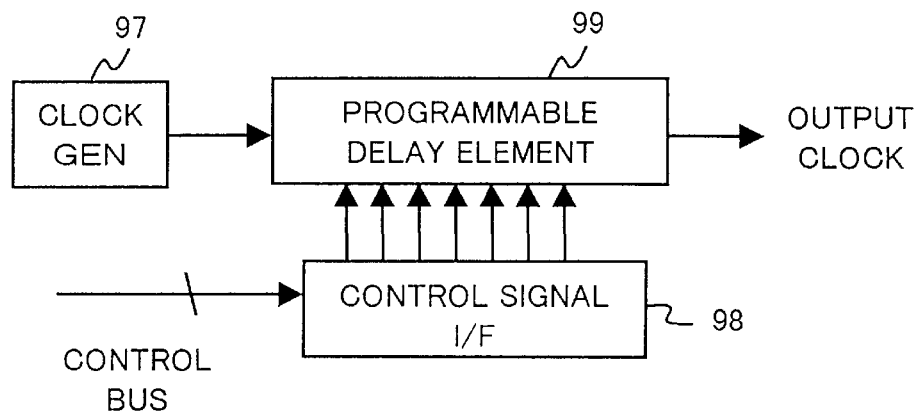
FIG. 29 is a block diagram showing a conventional timing control circuit in a synchronization tracking unit.
Figure 30:
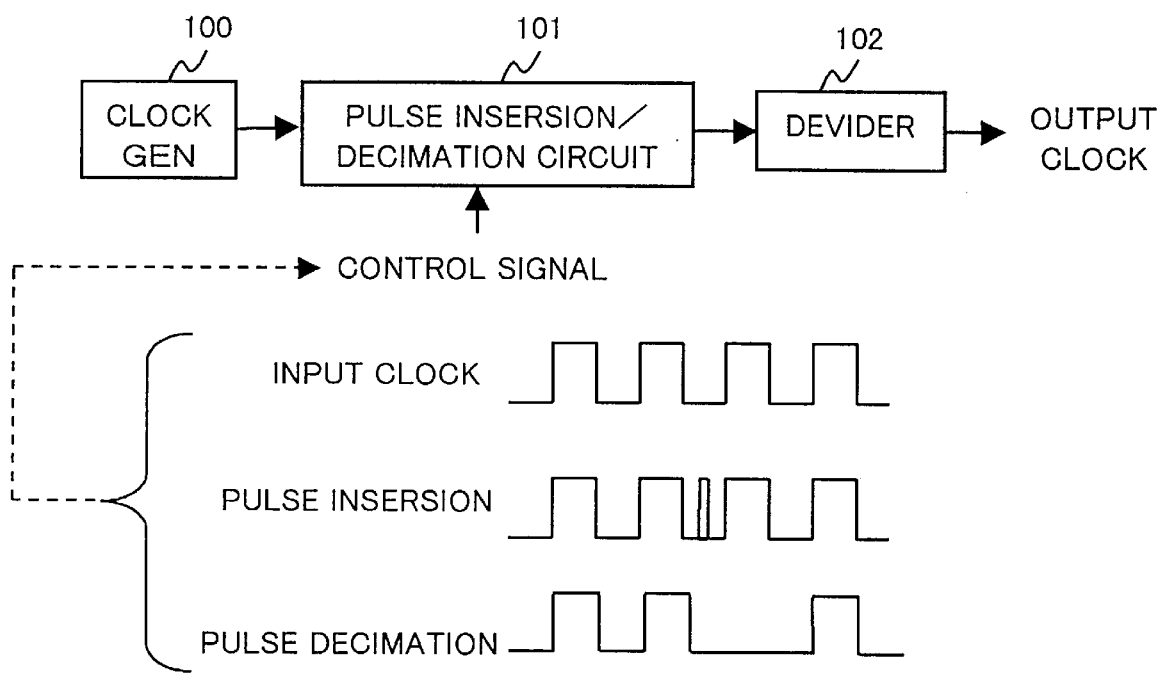
FIG. 30 is a block diagram showing another conventional timing control circuit in a synchronization tracking unit.

To perform operation in DLL fashion, it is appropriate to generate an error signal from the correlation operation results obtained at timings E and L shown in FIG. 27 and to demodulate the symbol from a correlation value obtained at the timing O. FIG. 11 shows a method of achieving the above-mentioned control. Timing should be controlled in accordance with the timing that gives the maximum average correlation power and the method of setting the timing as shown in FIG. 11, so as to perform a symbol demodulation and to generate an error signal. Note that in the DLL, the timing that gives the maximum average correlation power corresponds to the timing at which an error signal shows the smallest value.

Assuming that T1, T2, T3 and T4 of FIG. 11 respectively correspond to correlation timings associated with outputs S1, S3, S5 and S7 in FIG. 8 and M1, M2 and M3, to the midpoint timings of each correlation timing, i.e., the timings respectively associated with outputs S2, S4 and S6. If the correlation power at the timing T2 shows the maximum value, the control shown in the first column of a table of FIG. 11 is performed. In other words, a correlation value obtained at the timing T2 is output as a symbol timing O, from the high-accuracy acquiring unit, and error signals are calculated by regarding the timings E and L, which are correlation power timings for generating the error signals, as timings T1 and T3, respectively.

If a need arises, according to the obtained error signal, that the timing giving the maximum correlation power should be changed from T2 to M2, control shown in the second column is executed. That is, a symbol timing O is changed to M2, and timings E and L for generating error signals are changed to M1 and M3, respectively. However, the clock to the pseudo-noise code generator 804 is not changed. If there is a need for changing the timing for giving the maximum correlation value, i.e., a change from M2 to T3, the control given in the third column is carried out. In that case, a symbol timing O is changed to T3, and the error signal timings E and L are changed to T2 and T4, respectively. However, there is no change in the clock to the pseudo-noise code generator 804.

If there is a need, according to the obtained error signal, that the timing giving the maximum correlation power should be changed from T3 to M3, the control in the fourth column is executed. Similar to the case as described with reference to FIG. 8, it is no longer possible to get the maximum correlation value at the timings T2, M2 and T3. Then, the timing control unit 243 sends a clock control signal (in this case, it is a decimation signal) to a pulse-insertion/decimation circuit 245, so that a timing M2 gives the maximum correlation value. The pulse-insertion/decimation circuit 245 performs a pulse insertion and a pulse decimation for a clock having a rate twice as high as the chip rate, according to the control signal, thus realizing a timing control in [½] Tc unit. This control is shown by arrows in the fourth column of the table. As shown, the symbol timing O is changed from M3 to M2.

It should be noted that when the control is being updated, for example, a timing designation is changed, the updated timing designation is maintained until averaging units 241A to 241D provide an average correlation power for the new timing.

According to the construction shown in FIGS. 8 and 9, it is possible for the symbol demodulator and the synchronization-tracking unit to share correlators, and furthermore, synchronization tracking and symbol demodulation can be done with a timing accuracy of oversampled-by-four (though a rate for the timing control of pseudo-noise code is merely twice as high as the chip rate). This realizes a low power dissipation. Since processing for obtaining a high-accuracy in the synchronization-tracking unit is executed for an average correlation-power value, the amount of its calculation is very small, compared with a method which uses a high-precision sample from the beginning of its processing. The processing and control for obtaining high accuracy should be done in units of time, which is required for averaging the correlation power. Therefore, an increase in the amount of processing necessary to the high accuracy is extremely small in view of the processing amount executed by the overall hardware.

Configurations shown in FIGS. 8 and 9 bring about miniaturization of hardware scale and low power dissipation, which are suitable for a RAKE receiver comprising a plurality of such configurations. The method described with reference to FIGS. 8 and 9 can be applied to the synchronization-tracking unit and the symbol demodulator in FIG. 31 or FIG. 32. The way of applying that method follows.

Figure 10:
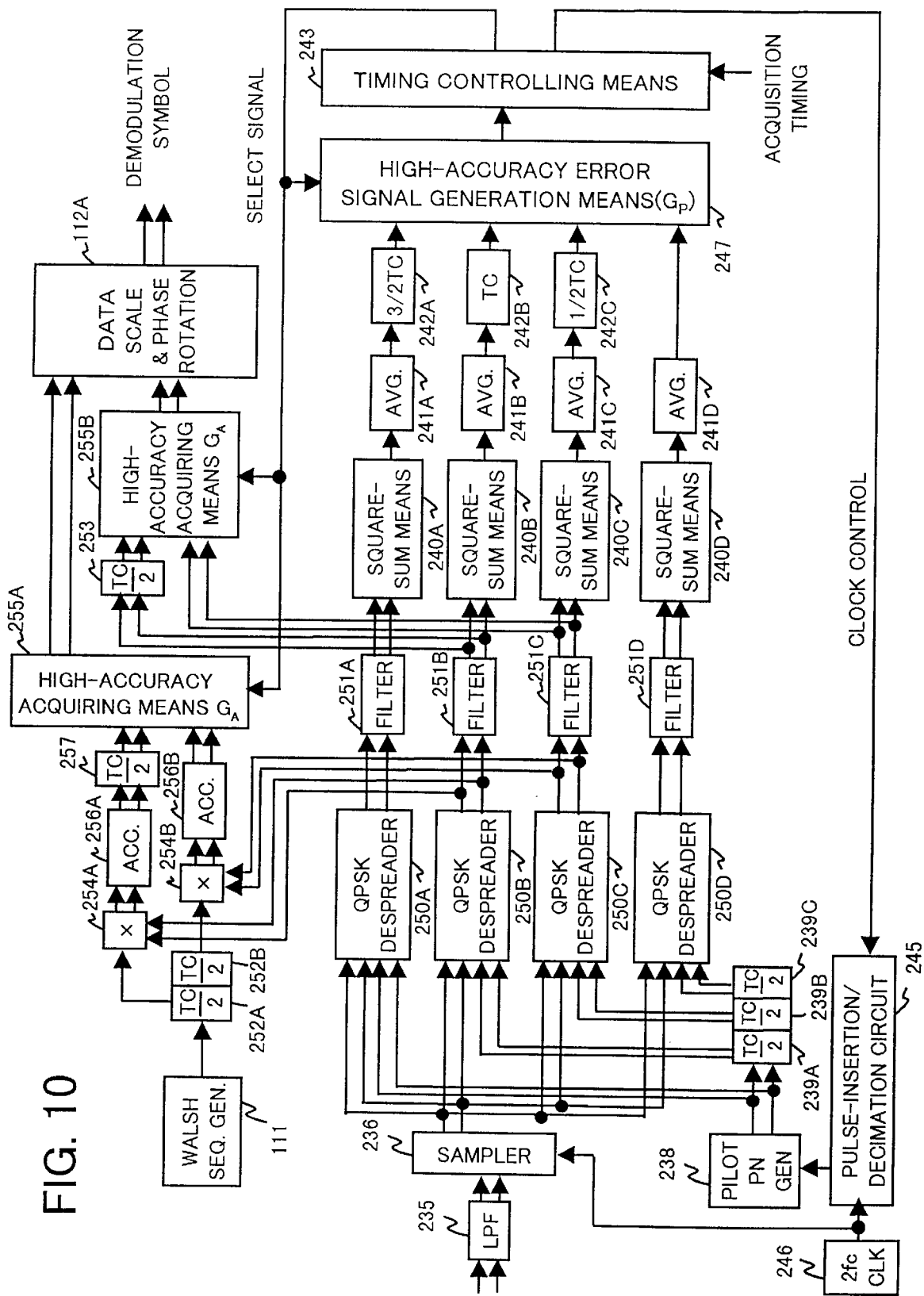
FIG. 10 is a block diagram showing construction of a symbol demodulation unit and a synchronization tracking unit of RAKE reception which performs a synchronous detection based upon a pilot signal, comprising sliding correlators according to this invention.

FIG. 10 shows an embodiment of a symbol demodulator and a synchronization-tracking unit which perform a synchronous detection by using a pilot signal, according to this invention (the same numerals as in FIG. 9 are used to denote the same parts in FIG. 10). The synchronization-tracking unit and the symbol demodulator in FIG. 10 correspond to the synchronization-tracking unit and the symbol demodulator shown in FIGS. 31 and 32.

Figure 32:
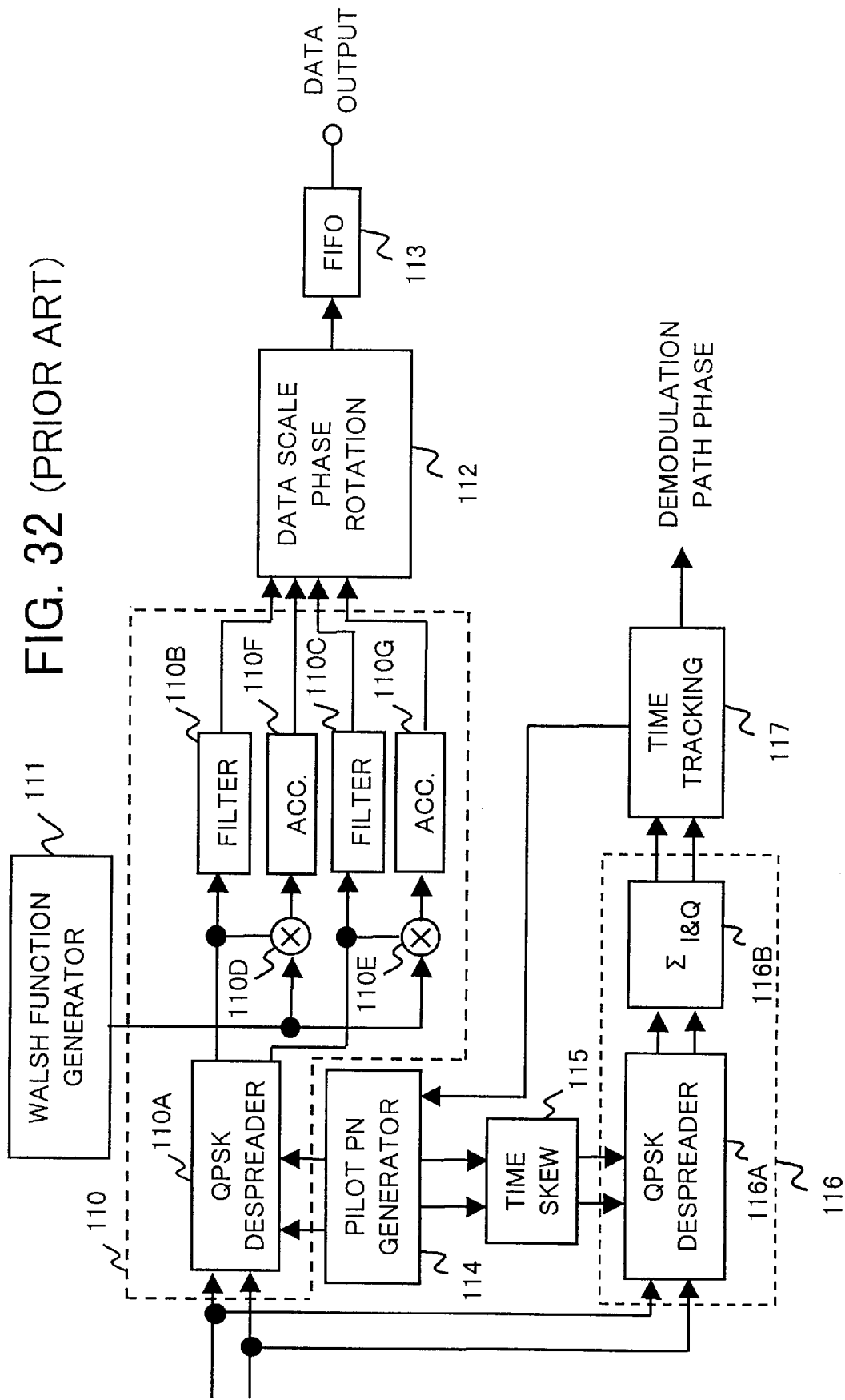
FIG. 32 is a block diagram showing a conventional symbol demodulator and synchronization tracking unit for a RAKE reception, comprising a sliding correlator.

In FIG. 32, one system of correlator is provided for symbol demodulation, and two systems of correlators are provided for error-signal generation. In this embodiment, four systems of correlators are used in common by the synchronization-tracking unit and the symbol demodulator. In FIG. 10, delay circuits 239A to 239C, 242A to 242C, 252A, 252B, 253 and 257 are used for adjusting timings in the synchronization-tracking unit and symbol demodulator. For the purpose of isolating and distinguishing information symbols which are orthogonally multiplexed, multipliers 254A and 254B commonly multiply both a received in-phase-axis signal and a received orthogonal-axis signal by a Walsh function. These signals have respectively been despreaded by QPSK despreaders 250B and 250C. High-accuracy error-signal generator 247 deals with correlation power of the pilot signal, and its correction coefficient is $G_P$. High-accuracy acquiring units 255A and 255B, correlation value, and their correction coefficients are $G_A$.

The high-accuracy error-signal generator 247 and timing control unit 243 operate in the same manner as those shown in FIGS. 8 and 9. The high-accuracy acquiring unit 255A selects and outputs the correlation-operation result obtained by applying a high-accuracy processing on an information symbol, in accordance with the timing given by the timing control unit 243. Similarly, the high-accuracy acquiring unit 255B selects and outputs correlation-operation result obtained by applying a high-accuracy processing to the pilot signal. Weighting phase-compensation unit (Data Scale Phase Rotation) 112A performs a phase compensation based upon the pilot signal and a weighting processing by a received amplitude, thus outputting a demodulated symbol.

Though it is not shown in FIG. 10, the output result is sent to the symbol combiner 107 of FIG. 31. As has been disclosed in Japanese Laid-open Publication No. 6-14008, a latch circuit holds the demodulated symbol until the demodulated symbols of all demodulators are settled without adjusting timings by using FIFO. If the symbol combiner 107 performs combining at the time when all demodulated symbols are settled, it is furthermore able to reduce FIFO scale and lower power dissipation.

According to the construction of FIG. 10, similar to those in FIGS. 8 and 9, it is possible to realize symbol demodulation characteristic and synchronization tracking characteristic having a timing accuracy of oversampled-by-four, by utilizing a timing accuracy of oversampled-by-two. Thus, it is possible to lower power dissipation with such an arrangement. Since processing for obtaining a high-accuracy in the synchronization-tracking unit is executed for an average correlation-power value, an increase in the amount of its calculation is very small in light of the whole construction. If a reduction in the FIFO is included, miniaturization of a hardware scale and low power dissipation can be provided, without deteriorating timing accuracy.

Seventh Embodiment

Figure 12:
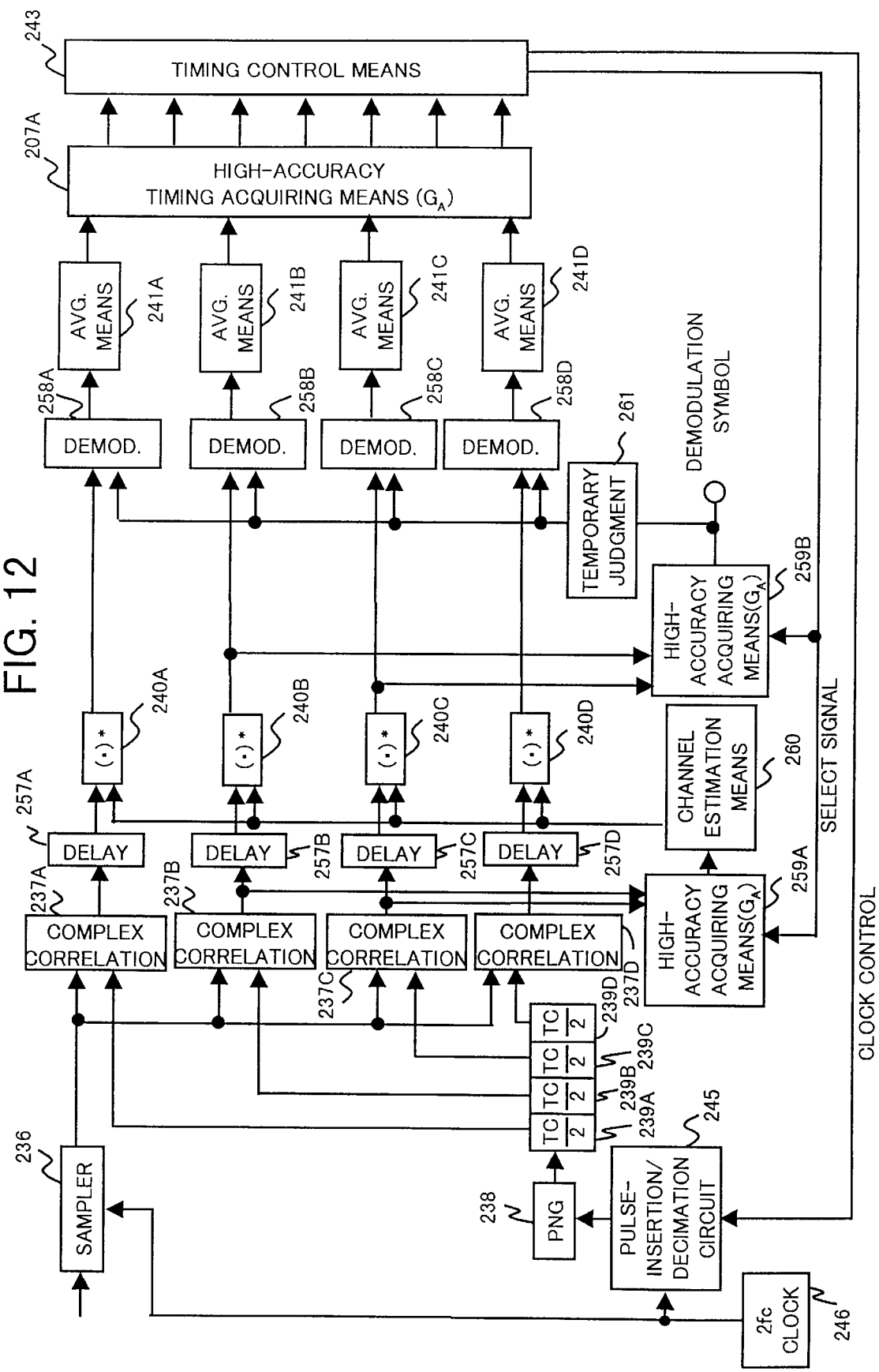
FIG. 12 is a block diagram showing construction of a symbol demodulator and a synchronous DLL of inverse-modulation type for RAKE receiver, using sliding correlators, according to this invention.
Figure 13:
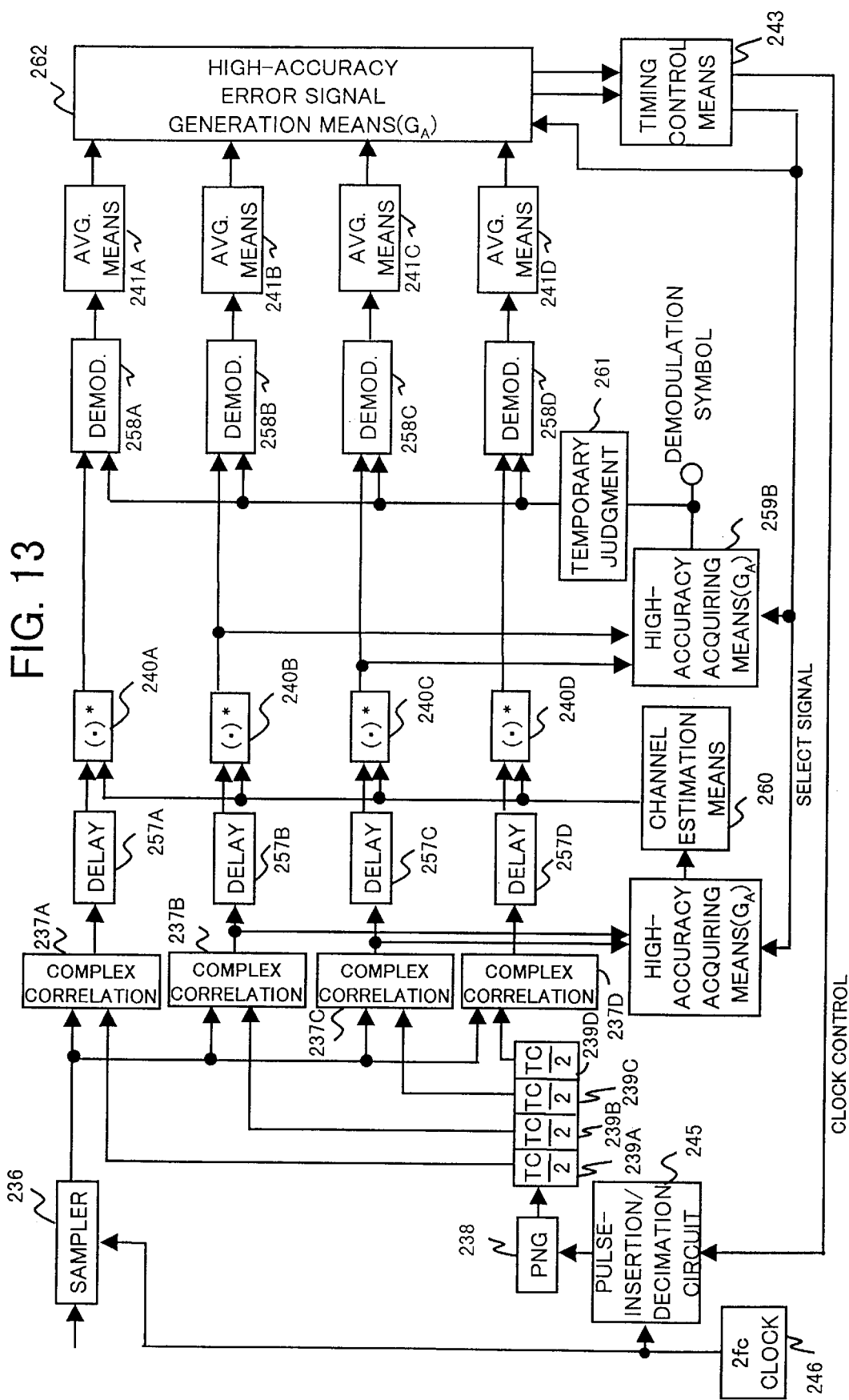
FIG. 13 is a block diagram showing another construction of a symbol demodulator and a synchronous DLL of inverse-modulation type for RAKE receiver, using sliding correlators, according to this invention.
Figure 26:
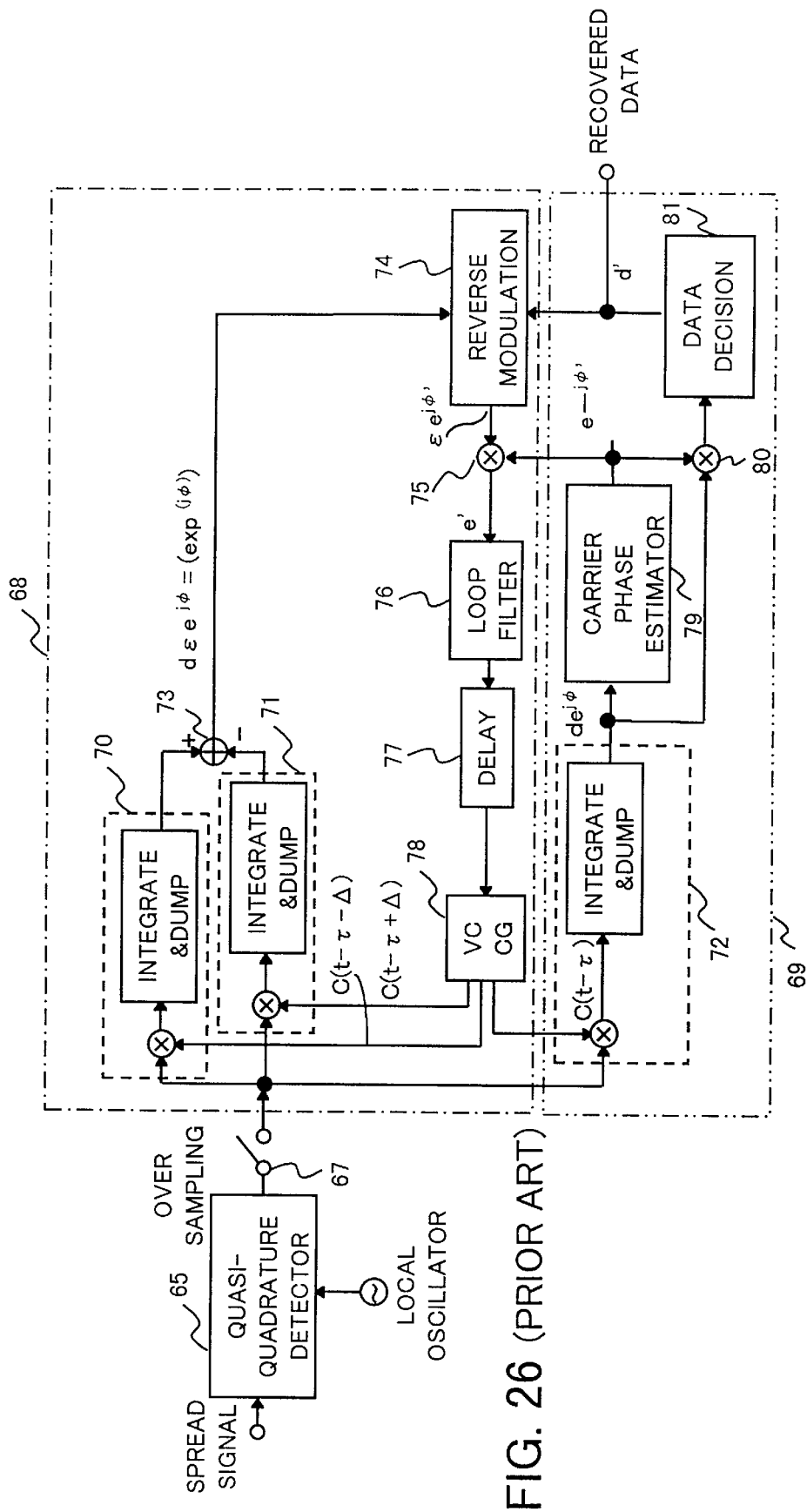
FIG. 26 is a block diagram showing configuration of a conventional symbol demodulator and an inverse-modulation-type synchronous DLL.

The constructions shown in FIGS. 12 and 13 are an example, which are obtained by expanding and applying the constructions in FIGS. 8 and 9 to a synchronous DLL of inverse-modulation type as shown in FIG. 26 (in these FIGS, the same numerals are used to denote the same parts). More precisely, FIG. 12 shows a construction in which timing control is so executed that the maximum power among seven correlation powers on which a high-accuracy processing is performed by a high-accuracy-timing acquiring unit 207A, comes within three timings at central positions. FIG. 13 depicts an example in which timing control is performed based upon an error signal obtained by applying a high-accuracy processing by a high-accuracy error-signal generation unit 262. Similar to construction shown in FIG. 26, DLL includes a channel estimation unit 260, a temporary judgment unit 261 for a demodulation symbol and inverse-modulation unit 258A to 258D, and uses the inverse-modulation result. The DLL is characterized by the processing in which four systems of correlators 237A to 237D provide a correlation value with a timing accuracy of oversampled-by-two, and a high-accuracy-timing acquiring unit 207A is used for raising that timing accuracy to one with an accuracy of oversampled-by-four.

High-accuracy acquiring units 259A and 259B are provided prior to the channel estimation unit 260 and the temporary judgment unit 261, so as to perform a channel estimation and a temporary judgment by using the correlation value with a high-accuracy timing. As a result, since the channel estimation and temporary demodulation are performed at the timing having a high accuracy, a high-accuracy symbol-demodulation characteristic and a synchronization tracking characteristic are obtained, in spite of the fact that only a correlation value having the timing accuracy of oversampled-by-two is used. In other words, compared with conventional construction, low power dissipation can be realized while still obtaining the same accuracy.

In the synchronization-tracking unit and the symbol demodulator using the sliding correlators, described with reference to FIGS. 8 to 13, the unit of control for the timing control which is equal to [½] Tc chip, results in a simplified circuit configuration and the control is relatively easy for the reason mentioned below. Timing management for constructing a RAKE receiver simply needs to distinguish either an amplified correlation value or an estimated correlation value at the midpoint. Note that the high-accuracy acquiring units 259A and 259B and the high-accuracy-timing acquiring units 207A and 262 in FIGS. 12 and 13 entirely operate for correlation values, therefore, a correction coefficient for the units is GA.

Eighth Embodiment

Figure 14:
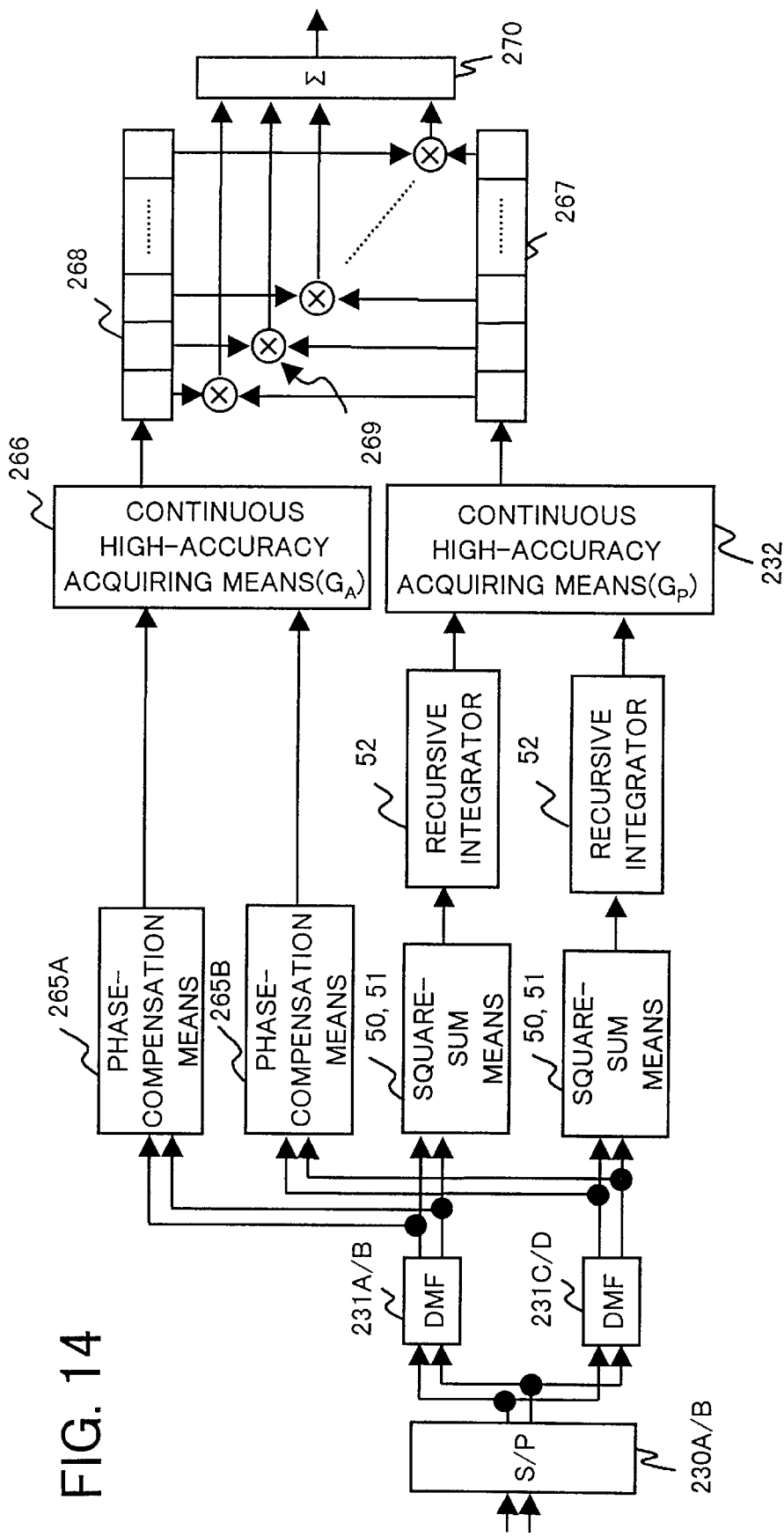
FIG. 14 is a block diagram showing construction of a RAKE receiver comprising digital matched filters, according to this invention.
Figure 15:
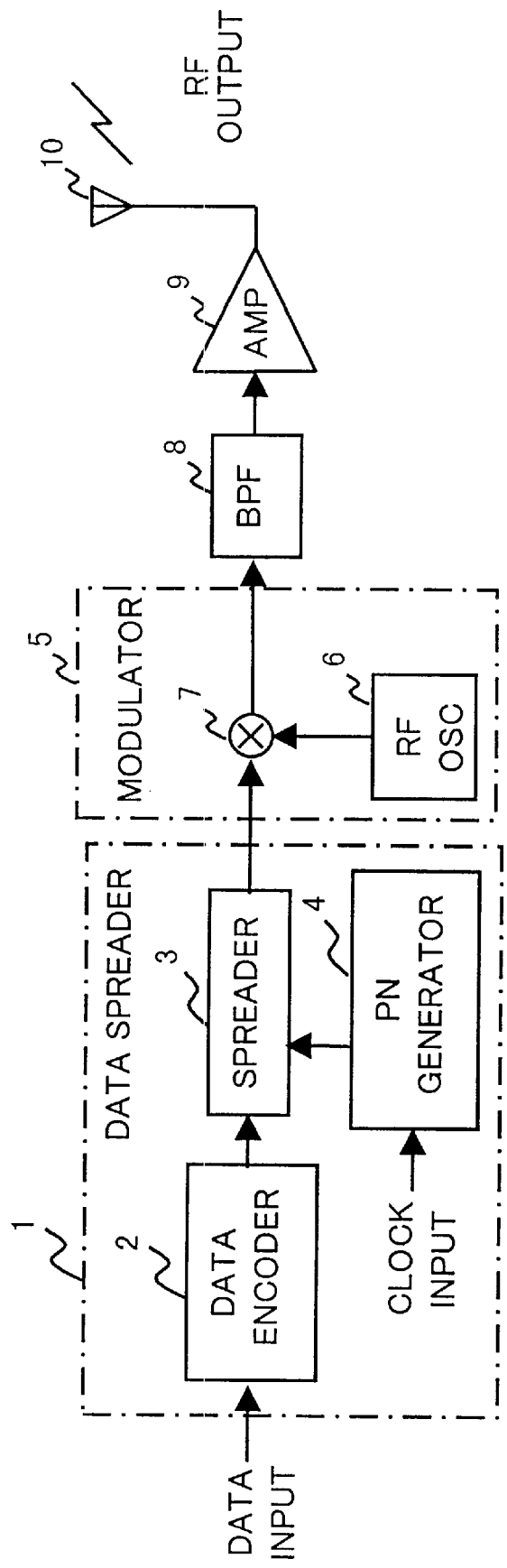
FIG. 15 is a block diagram showing conventional construction of a transmission unit of the spread spectrum signal.
Figure 16:
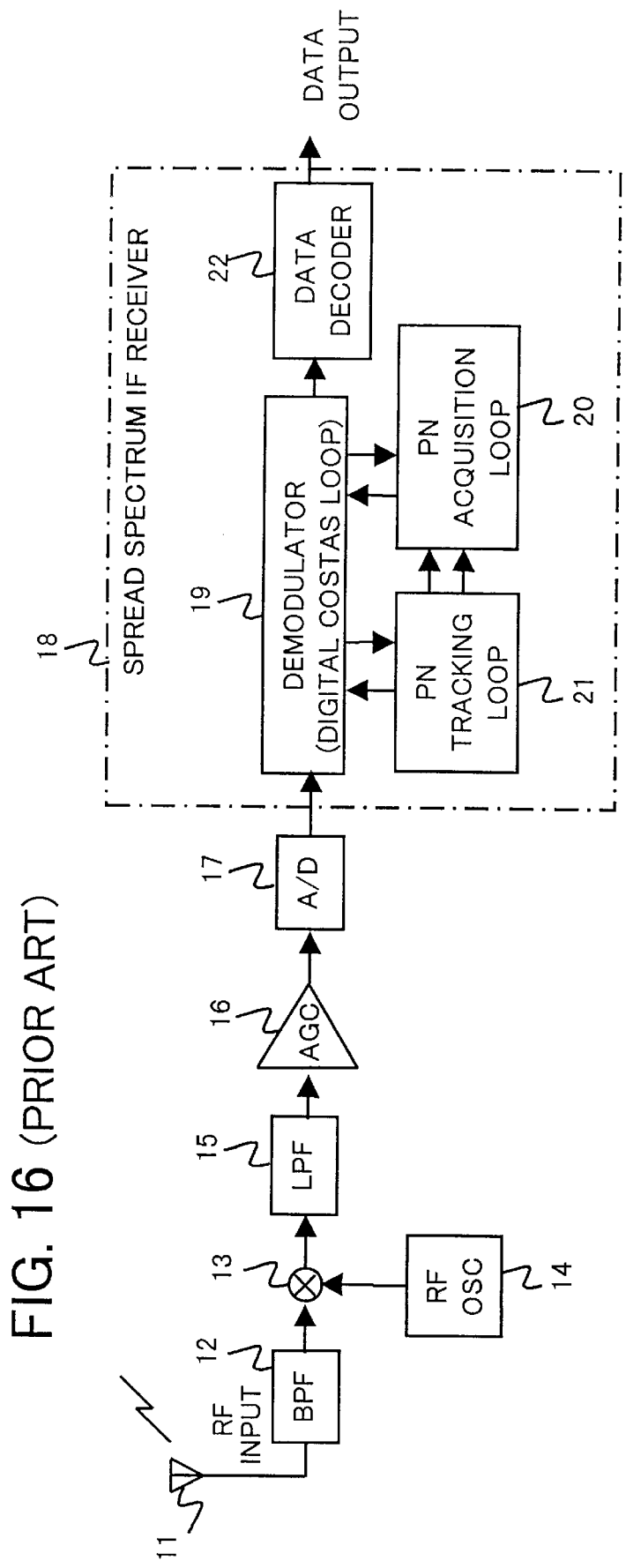
FIG. 16 is a block diagram showing conventional construction of a digital reception unit of the spread spectrum signal.
Figure 33:
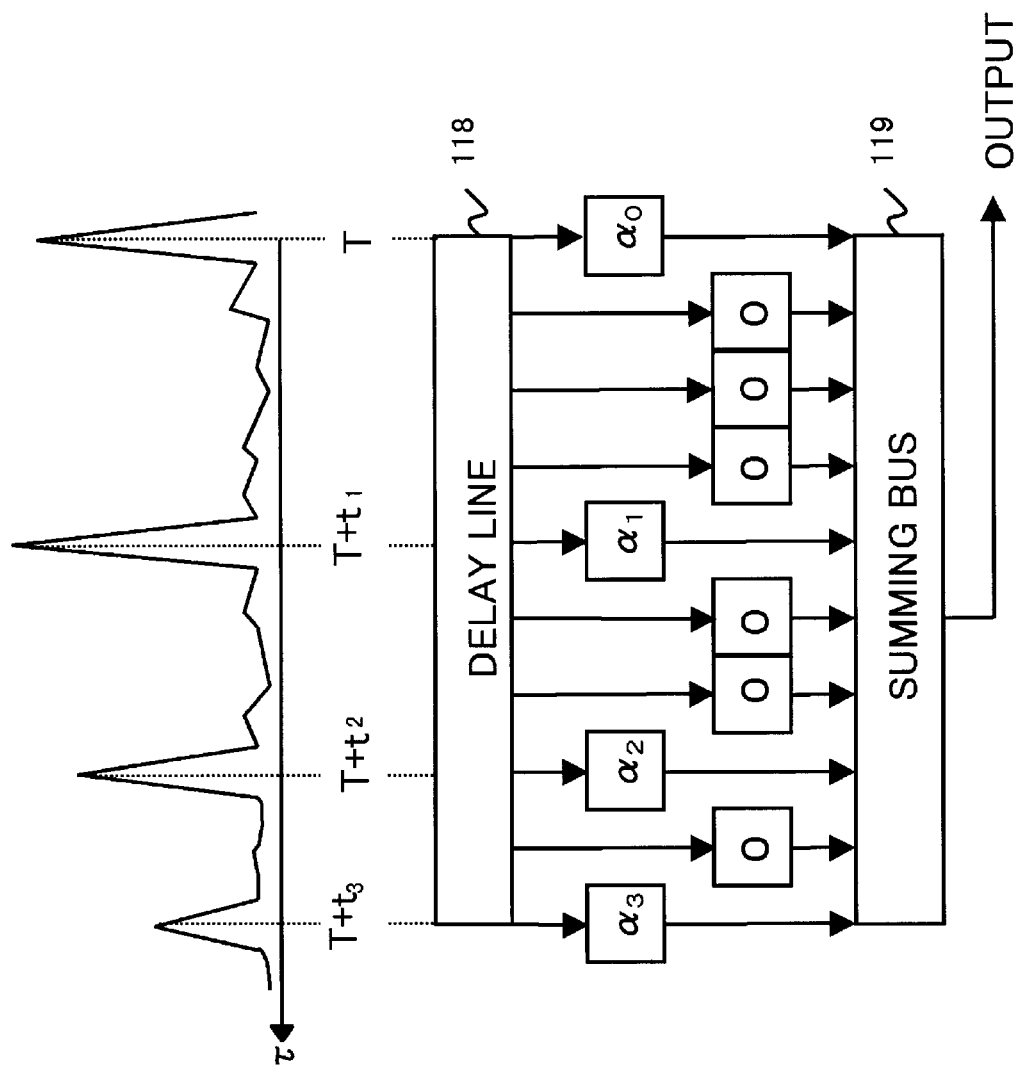
FIG. 33 is a block diagram showing a conventional construction of a RAKE compound comprising a matched filter.

FIG. 14 shows one embodiment of a RAKE receiver which uses digital matched filters, according to this invention. FIG. 14 corresponds to FIG. 33. Similar to other embodiments, correlators which operate in chip unit perform a correlation operation in parallel, with a timing accuracy of oversampled-by-two, on received samples whose timings are shifted by [½] Tc with each other. After that, continuous high-accuracy acquiring units 620 and 1403 execute processing for obtaining a high accuracy of oversampled-by-four.

In FIG. 14, a portion in which correlation power of a multi-path received signal is detected and averaged can be realized by the same construction as that shown in FIG. 6. In FIG. 14, portions which are substantially the same as those shown in FIG. 6 are designated by like reference numerals. However, while these portions in FIG. 6 are intended for synchronization acquisition or signal detection, those in FIG. 14 are for determining signal strength for a RAKE reception. Accordingly, the parameters of recursive integrators 52 (e.g., weightings in a recursive adder), the number of recursive additions and the like are different. In FIG. 14, the output from a continuous high-accuracy acquiring unit 232 is a weighting coefficient stored in a shift register 267 and used for a RAKE combining, until the next recursive-addition result is obtained.

As for a symbol demodulation system, phase compensation units 265A and 265B perform phase compensation on outputs of digital matched filters for synchronization detection, thus a demodulated symbol is obtained. A method of the phase compensation is not shown in FIG. 14, however, it can be realized by a method described in FIGS. 26 and 32, or by using a general digital Costas Loop and the like. Timing delays generated in the process of the phase compensation are dealt with by a timing adjustment unit, which is not shown in FIG. 14, so that they match a timing of output of the continuous high-accuracy acquiring unit 266. This timing adjustment unit is contained in the phase compensation units 265A and 265B. The continuous high-accuracy acquiring units 266 then performs processing with an oversampled-by-four accuracy by using a correction coefficient for a correlation value. Results of this processing are stored in a shift register 268 at every symbol interval. The processed results stored in the register 268 and weightings associated with each timing which are stored in a shift register 267, are multiplied respectively by multipliers 269, then added by an adder 270, thus a RAKE compound is obtained.

As shown in the above embodiment, even in a case where the digital matched filters are used, it is capable of providing the RAKE compound with a oversampled-by-four accuracy by using the correlation operation result with a double-oversample-accuracy. Accordingly, it is possible to reduce hardware scale and realize low power dissipation. The constructions shown in FIGS. 14 and 6 have many parts in common, therefore, efficient combination of these constructions produces further miniaturization of a hardware scale and much lower power dissipation.

It is also possible to reduce a hardware scale by limiting the number of stages of the shift registers 267 and 268 in accordance with delay profile characteristic. In that case, it is necessary to control input-sampling timings, so that the received samples could be stored in the limited number of shift registers. This control method is disclosed, for example, in Japanese Laid-open Publication No. 4-347944. The method disclosed is accomplished by the correlation operation result with a timing accuracy of oversampled-by-two. However, by using the correlation value obtained by the method shown in this embodiment, in which the correlation value is processed to have a oversampled-by-four, it is possible to construct a DLL and make a control in accordance with an average error signal.

In the first embodiment through the eighth embodiment, construction using the sliding correlators and that using the digital matched filters are separately shown, however, construction mixed with both of these constructions operates effectively. For example, a RAKE receiver comprising a searcher unit (using digital matched filters) and a symbol demodulator and a synchronization tracking unit (using sliding correlators) can be combined using the methods disclosed in these embodiments.

In the third and eighth embodiments, the matched filters are shown as digital matched filters. In a case where analog matched filters are used, the method disclosed in this invention finds application, because a sample rate is limited when sampling the correlation operation result after it is A/D converted.

In the second, sixth and seventh embodiments, the amplified correlation operation result is always output from the high-accuracy acquiring units used in the symbol demodulator, when estimation values other than those at the center point are selected. This is required for unifying reliability of an estimation correlation value and an amplified correlation value, and to unify the number of bits of a digital processing, when weighting at a RAKE reception.

In the first embodiment through the eighth embodiment, mainly described is an estimation method as a method of estimating timing points at which no correlation value is directly obtained. In the estimation method, the addition result of correlation values at adjacent points is used to estimate a value at the center point. However, since there are various kinds of estimation methods, correlation values at the points excluding the center point can be easily estimated, by applying these various methods. If symbol demodulation, synchronization tracking, synchronization acquisition and the like are performed by using the estimation results, a similar effect can be obtained. By way of example, there are Nyquist interpolation, Hermite interpolation, secondary interpolation and the like, as methods of estimation. The Nyquist interpolation is an interpolation which is based upon the Nyquist sampling theorem.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A spread-spectrum signal receiving method in which a correlation operation is performed for obtaining a correlation between a base-band component of a received spread-spectrum signal and a spread code, so as to demodulate the received signal, said method comprising:

a first correlation operation step for performing a correlation operation between the spread code and the base-band component;

a second correlation operation step for performing a correlation operation at a timing equal to a timing difference between the spread code and the base-band component in said first correlation operation step, said timing difference being ½ of a spread-code interval; and an estimation step for estimating, based on results obtained in said first and second correlation operation steps, a correlation operation result at the timing point where a timing difference between the spread code and the base-band component is less than ½ of the spread-code interval.

2. The spread-spectrum signal receiving method according to claim 1, said method further comprising:

a demodulation step for demodulating the spread-spectrum signal by using results obtained in said first and second correlation operation steps, and the estimation result of said estimation step performed at the timing point which is less than ½ of the spread-code interval.

3. The spread-spectrum signal receiving method according to claim 1, said method further comprising:

a synchronization acquisition step for performing synchronization acquisition of the spread-spectrum signal by using results obtained in said first and second correlation operation steps, and the estimation result of said estimation step at the timing point which is less than ½ of the spread-code interval.

4. The spread-spectrum signal receiving method according to claim 1, said method further comprising:

a synchronization tracking step for performing synchronization tracking of the spread-spectrum signal by using results obtained in said first and second correlation operation steps, and the estimation result of said estimation step at the timing point which is less than ½ of the spread-code interval.

5. A spread-spectrum signal receiving method in which a correlation operation is performed for obtaining a correlation between a base-band component of a received spread-spectrum signal and a spread code, so as to demodulate the received signal, said method comprising:

a first correlation operation step for performing a correlation operation on the spread code and the base-band component;

a second correlation operation step for performing a correlation operation on the base-band component and a spread-code which has been offset by ½ of a spread-code interval of said spread code;

an estimation step for estimating a correlation operation result at the center point of two timings where said first and second correlation operations have been performed, by adding the results of said first and second correlation steps;

a first weighting step for weighting the result of said first correlation operation step with a first predetermined weight;

a second weighting step for weighting the result of said second correlation operation step with a second predetermined weight; and a high-accuracy acquiring step for acquiring a highly accurate correlation timing in accordance with results of said estimation step and said first and second weighting steps.

6. A spread-spectrum signal receiving method in which a correlation operation is performed for obtaining a correlation between a base-band component of a received spread-spectrum signal and a spread code, so as to demodulate the received signal, said method comprising:

a first correlation operation step for performing a correlation operation on the spread code and the base-band component;

a second correlation operation step for performing a correlation operation on the base-band component and a spread-code which has been offset by ½ of a spread-code interval of said spread code;

an estimation step for estimating a correlation operation result at the center point of two timings where said first and second correlation operations have been performed, by adding the results of said first and second correlation steps;

a first weighting step for weighting the result of said first correlation operation step with a first predetermined weight;

a second weighting step for weighting the result of said second correlation operation step with a second predetermined weight; and an optimum-timing selection step for selecting a correlation operation result or an estimation result at an optimum timing, in accordance with results of said estimation step, and said first and second weighting steps.

7. A spread-spectrum signal receiving method in which a correlation operation is performed for obtaining a correlation between a base-band component of a received spread-spectrum signal and a spread code, so as to demodulate the received signal, said method comprising:

a first correlation operation step for performing a correlation operation on the spread code and the base-band component when synchronization acquisition is executed by a correlation operation with a spread code which is assumed to be a base-band component of the received spread-spectrum signal;

a second correlation operation step for performing a correlation operation on the base-band component and a spread-code which has been offset by ½ of a spread-code interval of said spread code;

a first power calculation step for calculating correlation power from the result of said first correlation operation step;

a second power calculation step for calculating correlation power from the result of said second correlation operation step;

a first average-correlation-power calculation step for calculating first average correlation power, by performing an averaging operation on the calculation result of said first power calculation step;

a second average-correlation-power calculation step for calculating second average correlation power, by performing an averaging operation on the calculation result of said second power calculation step;

an average-power estimation step for estimating average correlation power at the center point of two timings where said first and second average correlation power have been calculated, by adding the results of said first and second average-correlation-power calculation steps;

a first weighting step for weighting the calculation result of said first average-correlation-power calculation step with a first predetermined weight;

a second weighting step for weighting the calculation result of said second average-correlation-power calculation step with a second predetermined weight; and a synchronization-acquisition detection step for executing a synchronization-acquisition detection by using the calculation result of said average-power estimation step and weighting results of said first and second weighting steps.

8. A spread-spectrum signal receiving method in which a correlation operation is performed for obtaining a correlation between a base-band component of a received spread-spectrum signal and a spread code, so as to demodulate the received signal, said method comprising:

a first code-interval shifting step for shifting a spread code by ½ times a code interval when synchronization tracking is executed by a correlation operation with a spread code which is assumed to be a base-band component of the received spread-spectrum signal;

a second code-interval shifting step for shifting a spread code by one code interval when synchronization tracking is executed by a correlation operation with a spread code which is assumed to be a base-band component of the received spread-spectrum signal;

a third code-interval shifting step for shifting a spread code by 3/2 times the code interval when synchronization tracking is executed by a correlation operation with a spread code which is assumed to be a base-band component of the received spread-spectrum signal;

a correlation operation step for performing a correlation operation on the spread code and the base-band component;

a first shift-correlation calculation step for performing a correlation operation on the spread code obtained in said first code-interval shifting step and said base-band component;

a second shift-correlation calculation step for performing a correlation operation on the spread code obtained in said second code-interval shifting step and said base-band component;

a third shift-correlation calculation step for performing a correlation operation on the spread code obtained in said third code-interval shifting step and said base-band component;

a first correlation-power calculation step for calculating a first correlation power from result of said correlation operation step;

a second correlation-power calculation step for calculating a second correlation power from correlation operation result of said first shift-correlation calculation step;

a third correlation-power calculation step for calculating a third correlation power from correlation operation result of said second shift-correlation calculation step;

a fourth correlation-power calculation step for calculating a fourth correlation power from correlation operation result of said third shift-correlation calculation step;

a first average-correlation-power calculation step for calculating an average correlation power by performing an averaging operation on said first correlation power obtained in said first correlation-power calculation step;

a second average-correlation-power calculation step for calculating an average correlation power by performing an averaging operation on said second correlation power obtained in said second correlation-power calculation step;

a third average-correlation-power calculation step for calculating an average correlation power by performing an averaging operation on said third correlation power obtained in said third correlation-power calculation step;

a fourth average-correlation-power calculation step for calculating an average correlation power by performing an averaging operation on said correlation power obtained in said fourth correlation-power calculation step;

a first estimated-average-correlation-power calculating step for estimating an average correlation power at the midpoint of timings where said average correlation power calculations have been obtained, by adding calculation results of said first and second average-correlation-power calculation steps;

a second estimated-average-correlation-power calculating step for estimating an average correlation power at the midpoint of timings where said average correlation power calulations have been obtained, by adding calculation results of said second and third average-correlation-power calculation steps;

a third estimated-average-correlation-power calculating step for estimating an average correlation power at the midpoint of timings where said average correlation power calculations have been obtained, by adding calculation results of said third and fourth averagecorrelation-power calculation steps; and a synchronization tracking step for performing synchronization tracking by using calculation results of said first, second, third and fourth average-correlation-power calculation steps and calculation results of said first, second and third estimatedaverage-correlation-power calculating steps.

9. A spread-spectrum signal receiving apparatus in which a correlation operation is performed for obtaining a correlation between a base-band component of a received spread-spectrum signal and a spread code, so as to demodulate the received signal, said apparatus comprising:

spread-code generation means for generating spread codes;

delay means for delaying the spread codes generated by said spread-code generation means and outputting the delayed spread-codes;

first correlation-operation means for performing a correlation operation between said spread codes and said base-band component;

second correlation-operation means for performing a correlation operation between said delayed spread-codes and said base-band component;

timing adjustment means for adjusting output timings of said first and second correlation-operation means;

high-accuracy-timing acquiring means for obtaining a correlation-operation result at the midpoint of said output timings, from results of said first and second correlation-operation means whose output timings have been adjusted; and selection means for outputting a correlation value designated by the correlation-operation result which has acquired the high-accuracy-timing.

10. The spread-spectrum signal receiving apparatus according to claim 9, wherein a weighting associated with said high-accuracy-timing acquiring means is determined by a calculation based on the shape of a reception chip.

11. A spread-spectrum signal receiving apparatus in which a correlation operation is performed for obtaining a correlation between a base-band component of a received spread-spectrum signal and a spread code, so as to demodulate the received signal, said apparatus comprising:

spread-code generation means for generating spread codes;

delay means for delaying the spread codes generated by said spread-code generation means and outputting the delayed spread-codes;

first correlation-operation means for performing a correlation operation between said spread codes and said base-band component;

second correlation-operation means for performing a correlation operation between said delayed spread-codes and said base-band component;

square-sum calculation means for calculating respective correlation powers from correlation-operation results of said first and second correlation-operation means;

averaging means for obtaining average correlation power by respectively averaging said respective correlation powers;

high-accuracy-timing acquiring means for estimating average correlation power at the midpoint of timings which correspond to said respectively obtained average correlation power, from said respectively obtained average correlation power; and a controller for performing a synchronization-acquisition detection by comparing output of said high-accuracy-timing acquiring means and a predetermined threshold level.

12. The spread-spectrum signal receiving apparatus according to claim 11, wherein a weighting associated with said high-accuracy-timing acquiring means is determined by a calculation based on the shape of a reception chip.

13. A spread-spectrum signal receiving apparatus in which a correlation operation is performed for obtaining a correlation between a base-band component of a received spread-spectrum signal and a spread code, so as to demodulate the received signal, said apparatus comprising:

serial/parallel conversion means for converting said base-band component, which has been input at a rate twice as high as a chip rate, into first and second parallel output signals having the same rate as the chip rate;

a first matched filter for inputting the first output signal of said serial/parallel conversion means and outputting at said chip rate a correlation value between said base-band component and the first output signal;

a second matched filter for inputting the second output signal of said serial/parallel conversion means and outputting at said chip rate a correlation value between said base-band component and the second output signal;

square-sum calculation means for calculating first and second correlation powers from correlation values of said first and second matched filters, respectively;

averaging means for respectively averaging said first and second correlation powers and outputting first and second averaged correlation powers;

continuous high-accuracy acquiring means for estimating an average correlation power at the midpoint of timings which correspond to said first and second averaged correlation powers and time-sequentially outputting the estimated average correlation power; and reception-path detection means for detecting the timing of a received signal by observing an output level of said continuous high-accuracy acquiring means and performing synchronization acquisition.

14. The spread-spectrum signal receiving apparatus according to claim 13, wherein a weighting associated with said continuous high-accuracy acquiring means is determined by a calculation based on the shape of a reception chip.

15. A spread-spectrum signal receiving apparatus in which a correlation operation is performed for obtaining a correlation between a base-band component of a received spread-spectrum signal and a spread code, so as to demodulate the received signal, said apparatus comprising:

spread-code generation means for generating spread codes;

delay means for delaying the spread codes in plural stages;

a plurality of correlation operation means for performing a correlation operation on said base-band component, said generated spread codes and said spread codes delayed in plural stages;

a plurality of square-sum calculation means for calculating respective correlation powers from correlation-operation results of said correlation operation means;

a plurality of averaging means for obtaining average correlation power by respectively averaging said calculated respective correlation powers;

timing adjustment means for adjusting timings for obtaining said plurality of average correlation powers;

first high-accuracy-timing acquiring means for estimating average correlation power at the midpoint of timings which correspond to said average correlation power, timing control means for performing a timing control based on said estimated average correlation power, by using said plurality of average correlation power whose timings have been adjusted;

clock control means for controlling a spread-code clock in accordance with a control result of said timing control means; and second high-accuracy-timing acquiring means for selectively outputting the maximum correlation operation result from among a plurality of correlation operation results and estimated correlation-operation values at the midpoint timing, said values having been estimated from said operation results, in accordance with the control result of said timing control means.

16. The spread-spectrum signal receiving apparatus according to claim 15, wherein said timing control means performs a control of tracking the maximum correlation power from among a plurality of average correlation powers and a plurality of estimated average correlation powers.

17. The spread-spectrum signal receiving apparatus according to claim 15, wherein said timing control means performs a delay-locked-loop control by selecting two correlation powers for generating an error signal, from among a plurality of average correlation powers and a plurality of estimated average correlation powers.

18. The spread-spectrum signal receiving apparatus according to claim 15, wherein a weighting associated with said first and second high-accuracy-timing acquiring means is determined by a calculation based on the shape of a reception chip.

19. A spread-spectrum signal receiving apparatus in which a correlation operation is performed on a base-band component of the received spread-spectrum signal and a spread code, so as to demodulate the received signal, said apparatus comprising:

pilot spread-code generation means for generating pilot spread codes;

delay means for delaying said pilot spread codes in plural stages;

a plurality of correlation operation means for performing a correlation operation on said base-band component, said pilot spread codes and said spread codes delayed in plural stages;

a plurality of square-sum calculation means for calculating respective correlation power from correlation-operation results of said correlation operation means;

a plurality of averaging means for obtaining average correlation power by respectively averaging said calculated respective correlation powers;

timing adjustment means for adjusting timings for obtaining said plurality of average correlation powers;

first high-accuracy-timing acquiring means for estimating average correlation power at the midpoint of timings which correspond to said average correlation power;

timing control means for performing a timing control based on said estimated average correlation power, by using said plurality of average correlation power whose timings have been adjusted;

clock control means for controlling a spread-code clock in accordance with control result of said timing control means;

second high-accuracy-timing acquiring means for selectively outputting a maximum correlation operation result from among a plurality of correlation operation results and estimated correlation-operation values at the midpoint timing, said values have been estimated from said operation results, in accordance with the control result of said timing control means; and synchronization detection means for performing a channel estimation and a phase compensation by using outputs from said second high-accuracy-timing acquiring means.

20. The spread-spectrum signal receiving apparatus according to claim 19, wherein a weighting associated with said first and second high-accuracy-timing acquiring means is determined by a calculation based on the shape of a reception chip.

21. A spread-spectrum signal receiving apparatus in which a correlation operation is performed for obtaining a correlation between a base-band component of a received spread-spectrum signal and a spread code, so as to demodulate the received signal, said apparatus comprising:

spread-code generation means for generating spread codes;

delay means for delaying the spread codes in plural stages;

a plurality of correlation operation means for performing a correlation operation on said base-band component, said generated spread codes and said spread codes delayed in plural stages;

a plurality of delay means for respectively delaying said plurality of correlation-operation results by the time required for a channel estimation;

a plurality of synchronization detection means for respectively performing a phase compensation and a weighting by using values associated with said channel estimation;

a plurality of inverse modulation means for respectively performing an inverse modulation by using data which has temporarily been judged for said synchronization detection means;

averaging means for performing an averaging operation on said plurality of inverse-modulated results;

first high-accuracy-timing acquiring means for estimating average correlation-operation result at the midpoint of timings which correspond to said average correlation-operation results, by using said plurality of average correlation-operation results whose timings have been adjusted;

timing control means for performing a timing control based on said estimated average correlation-operation result;

clock control means for controlling a spread-code clock in accordance with the control result of said timing control means;

second high-accuracy-timing acquiring means for selectively outputting the maximum correlation operation result from among a plurality of correlation operation results and estimated correlation-operation values at the midpoint timing, said values have been estimated from said operation results, in accordance with the control result of said timing control means;

channel estimation means for estimating a channel by using correlation-operation results given by said second high-accuracy-timing acquiring means; and third high-accuracy-timing acquiring means for selectively outputting synchronization-detection result by which a maximum synchronization detection level is obtained, from among a plurality of synchronization-detection results and estimated synchronization detection values at the midpoint timing, said values have been estimated from said synchronization-detection results, in accordance with the control result of said timing control means.

22. The spread-spectrum signal receiving apparatus according to claim 21, wherein said timing control means performs a control of tracking the maximum correlation power from among a plurality of average correlation powers and a plurality of estimated average correlation powers.

23. The spread-spectrum signal receiving apparatus according to claim 21, wherein said timing control means performs a delay-locked-loop control by selecting two correlation powers for generating an error signal, from among a plurality of average correlation powers and a plurality of estimated average correlation powers.

24. The spread-spectrum signal receiving apparatus according to claim 21, wherein a weighting associated with said first, second and third high-accuracy-timing acquiring means is determined by a calculation based on the shape of a reception chip.

25. A spread-spectrum signal receiving apparatus in which a correlation operation is performed for obtaining a correlation between a base-band component of a received spread-spectrum signal and a spread code, so as to demodulate the received signal, said apparatus comprising:

seria/parallel conversion means for converting said base-band component, which has been input at a rate twice as high as a chip rate, into first and second parallel output signals having the same rate as the chip rate;

a first matched filter for inputting the first output signal of said serial/parallel conversion means and outputting at said chip rate a correlation value between said base-band component and the first output signal;

a second matched filter for inputting the second output signal of said serial/parallel conversion means and outputting at said chip rate a correlation value between said base-band component and the second output signal;

square-sum calculation means for calculating first and second correlation powers from correlation values of said first and second matched filters, respectively;

averaging means for averaging said first and second correlation powers and outputting first and second averaged correlation power, respectively;

first continuous high-accuracy acquiring means for estimating an average correlation power at the midpoint of timings which correspond to said first and second averaged correlation powers and time-sequentially outputting the estimated average correlation power;

phase compensation means for phase-compensating outputs of said first and second matched filters;

second continuous high-accuracy acquiring means for estimating a synchronization-detection signal at the midpoint of timings from said phase-compensated synchronization-detection signals and time-sequentially outputting the estimated synchronization-detection signals; and RAKE synthesizing means for multiplying and synthesizing outputs of said first continuous high-accuracy acquiring means weighted by the average correlation power and outputs of said second continuous high-accuracy acquiring means.

26. The spread-spectrum signal receiving apparatus according to claim 25, wherein a weighting associated with said first and second continuous high-accuracy acquiring means is determined by a calculation based on the shape of a reception chip.

* * * * *